(12) United States Patent
Sumiya et al.

(10) Patent No.: US 10,166,946 B2
(45) Date of Patent: *Jan. 1, 2019

(54) VEHICULAR AIRBAG DEVICE

(71) Applicant: Autoliv Development AB, Vårgårda (SE)

(72) Inventors: Tomohiro Sumiya, Yokohama (JP); Kai Maenishi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 108 days.

This patent is subject to a terminal disclaimer.

(21) Appl. No.: 15/301,209

(22) PCT Filed: Mar. 30, 2015

(86) PCT No.: PCT/JP2015/059876
§ 371 (c)(1),
(2) Date: Sep. 30, 2016

(87) PCT Pub. No.: WO2015/152137
PCT Pub. Date: Oct. 8, 2015

(65) Prior Publication Data
US 2017/0021794 A1      Jan. 26, 2017

(30) Foreign Application Priority Data

Mar. 31, 2014  (JP) ................................ 2014-071437
Apr. 28, 2014  (JP) ................................ 2014-092331
Jun. 10, 2014  (JP) ................................ 2014-119916

(51) Int. Cl.
*B60R 21/205*     (2011.01)
*B60R 21/231*     (2011.01)
(Continued)

(52) U.S. Cl.
CPC .......... *B60R 21/233* (2013.01); *B60R 21/205* (2013.01); *B60R 21/231* (2013.01);
(Continued)

(58) Field of Classification Search
CPC ... B60R 21/205; B60R 21/231; B60R 21/233; B60R 2021/0009; B60R 2021/0044;
(Continued)

(56) References Cited

U.S. PATENT DOCUMENTS 4,262,931 A      4/1981   Strasser et al.
6,834,886 B2 *  12/2004   Hasebe ................. B60R 21/233
                                                              280/743.1
(Continued)

FOREIGN PATENT DOCUMENTS

CA     1 160 657     1/1984
CA     2 584 099     10/2007
(Continued)

OTHER PUBLICATIONS

PCT International Search Report—dated Apr. 7, 2015.
PCT International Search Report—dated Oct. 6, 2015.
PCT International Search—dated Jun. 15, 2015.

*Primary Examiner* — Laura Freedman
(74) *Attorney, Agent, or Firm* — Brinks Gilson & Lione

(57) ABSTRACT

A vehicular airbag device capable of improving reduction of an occupant obstruction value during a diagonal collision. A vehicular airbag device opens an airbag door on an instrument panel. The outer shape of the airbag when fully deployed and expanded is line-symmetrical with respect to a center line (a line X-X) of the opening in a vehicle left-right width direction, and a width dimension WB in the vehicle width direction at a position of a rear edge 2b of the instrument panel in the vehicle longitudinal direction is greater than a width dimension WC in the vehicle width direction at a position of a center Z1 of the opening in the (Continued)

vehicle longitudinal direction which is more forward in the vehicle longitudinal direction than the rear edge position of the instrument panel.

5 Claims, 70 Drawing Sheets

(51) Int. Cl.
*B60R 21/233* (2006.01)
*B60R 21/00* (2006.01)

(52) U.S. Cl.
CPC .......... B60R 2021/0009 (2013.01); B60R 2021/0044 (2013.01); B60R 2021/0048 (2013.01); B60R 2021/23107 (2013.01); B60R 2021/23308 (2013.01); B60R 2021/23324 (2013.01)

(58) Field of Classification Search
CPC .. B60R 2021/0048; B60R 2021/23107; B60R 2021/23308; B60R 2021/23324
See application file for complete search history.

(56) References Cited

U.S. PATENT DOCUMENTS

| | | | |
|---|---|---|---|
| 7,152,880 B1 | 12/2006 | Pang et al. | |
| 7,448,648 B2* | 11/2008 | Thomas | B60R 21/205 280/743.2 |
| 8,226,119 B2* | 7/2012 | Dong | B60R 21/2338 280/743.2 |
| 8,500,166 B2* | 8/2013 | Inuzuka | B23D 15/145 280/743.2 |
| 8,544,882 B2* | 10/2013 | Gulde | B60R 21/231 280/732 |
| 8,882,138 B1 | 11/2014 | Hicken et al. | |
| 9,150,186 B1* | 10/2015 | Belwafa | B60R 21/233 |
| 9,162,645 B2* | 10/2015 | Cho | B60R 21/205 |
| 9,248,799 B2* | 2/2016 | Schneider | B60R 21/205 |
| 9,272,684 B1* | 3/2016 | Keyser | B60R 21/237 |
| 9,333,940 B2 | 5/2016 | Hicken | B60R 21/33 |
| 9,376,084 B2* | 6/2016 | Choi | B60R 21/233 |
| 9,561,774 B2* | 2/2017 | Cheng | B60R 21/203 |
| 9,573,555 B2* | 2/2017 | Jang | B60R 21/233 |
| 9,580,039 B2* | 2/2017 | Schneider | B60R 21/233 |
| 2002/0135164 A1 | 9/2002 | Thomas | |
| 2003/0116945 A1 | 6/2003 | Abe | |
| 2003/0218325 A1 | 11/2003 | Hasebe et al. | |
| 2004/0051285 A1 | 3/2004 | Fischer | |
| 2005/0029779 A1 | 2/2005 | Bito et al. | |
| 2005/0184489 A1* | 8/2005 | Kobayashi | B60R 21/231 280/729 |
| 2005/0230945 A1 | 10/2005 | Watanabe | |
| 2006/0186656 A1 | 8/2006 | Kumagai | |
| 2007/0057498 A1* | 3/2007 | Koh | B60R 21/205 280/743.1 |
| 2010/0090445 A1 | 4/2010 | Williams et al. | |
| 2013/0001934 A1 | 1/2013 | Nagasawa et al. | |
| 2014/0361521 A1 | 12/2014 | Fukawatase | |
| 2017/0129439 A1* | 5/2017 | Taguchi | B60R 21/205 |
| 2017/0217397 A1* | 8/2017 | Sumiya | B60R 21/233 |
| 2018/0015902 A1* | 1/2018 | Maenishi | B60R 21/233 |
| 2018/0056920 A1* | 3/2018 | Paxton | B60R 21/233 |
| 2018/0065583 A1* | 3/2018 | Tabushi | B60R 21/205 |
| 2018/0065587 A1* | 3/2018 | Maenishi | B60R 21/231 |

FOREIGN PATENT DOCUMENTS

| | | |
|---|---|---|
| CN | 1459394 A | 12/2003 |
| CN | 1824548 A | 8/2006 |
| CN | 1951732 A | 4/2007 |
| CN | 200985009 Y | 12/2007 |
| CN | 200985010 Y | 12/2007 |
| CN | 102849017 A | 6/2011 |
| CN | 102186702 A1 | 9/2011 |
| DE | 602 04 277 T2 | 11/2005 |
| DE | 10 2007 032 763 A1 | 1/2008 |
| DE | 10 2012 018 450 A1 | 3/2014 |
| EP | 1 364 838 A2 | 5/2003 |
| EP | 1 398 228 A2 | 3/2004 |
| EP | 1 498 320 A2 | 1/2005 |
| EP | 1 775 176 A1 | 4/2007 |
| EP | 1 775 177 A1 | 4/2007 |
| EP | 1 842 742 A2 | 10/2007 |
| EP | 1 693 256 B1 | 8/2008 |
| EP | 2 799 292 A1 | 11/2014 |
| JP | 56-67649 | 6/1981 |
| JP | 3-32956 | 2/1991 |
| JP | 4-55141 | 2/1992 |
| JP | 5-65706 | 8/1993 |
| JP | 6-72276 | 3/1994 |
| JP | 6-80057 | 3/1994 |
| JP | 8-72661 | 3/1996 |
| JP | 8-268204 | 10/1996 |
| JP | 10-71920 | 3/1998 |
| JP | 2000-280845 | 10/2000 |
| JP | 2003-182500 | 7/2003 |
| JP | 2003-335203 | 11/2003 |
| JP | 2004-262432 | 9/2004 |
| JP | 2005-88681 | 4/2005 |
| JP | 2005-247118 | 9/2005 |
| JP | 2006-88856 | 4/2006 |
| JP | 2006-256508 | 9/2006 |
| JP | 2006-327505 | 12/2006 |
| JP | 2007-112427 | 5/2007 |
| JP | 2007-112430 | 5/2007 |
| JP | 2007-216733 | 8/2007 |
| JP | 2007-276771 | 10/2007 |
| JP | 2008-44594 | 2/2008 |
| JP | 2008-114615 | 5/2008 |
| JP | 2008-179173 | 8/2008 |
| JP | 2009-227180 | 3/2009 |
| JP | 2009-120114 | 6/2009 |
| JP | 2010-201980 | 9/2010 |
| JP | 2012-56371 | 3/2012 |
| JP | 2012-505783 | 3/2012 |
| JP | 2012179952 A * | 9/2012 |
| JP | 2013-14176 | 1/2013 |
| JP | 2013-35473 | 2/2013 |
| JP | 2013-112276 | 6/2013 |
| JP | 2014-121965 | 7/2014 |
| KR | 2007-0042093 | 4/2007 |
| KR | 2007-0052192 | 5/2007 |
| KR | 2011-0071076 | 6/2011 |
| MX | 2007003946 A | 11/2008 |
| WO | WO 2010/045040 A1 | 10/2009 |
| WO | WO 2013/099036 A1 | 7/2013 |

* cited by examiner

VEHICLE WIDTH
DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICLE WIDTH DIRECTION

VEHICULAR AIRBAG DEVICE

CROSS REFERENCE TO RELATED APPLICATIONS

This application claims priority to Japanese Patent Application Nos. 2014-071437, filed on Mar. 31, 2014; 2014-092331, filed on Apr. 28, 2014; 2014-119916, filed on Jun. 10, 2014, and PCT/JP2015/059876, filed on Mar. 30, 2015.

FIELD OF THE INVENTION

The present invention relates to a vehicular airbag device capable of improving reduction of an occupant obstruction value during a diagonal collision.

BACKGROUND

Japanese Patent Application No. 2000-280845 is known as an example of an airbag device installed to a front seat of a vehicle such as an automobile. In Japanese Patent Application No. 2000-280845, an airbag of an assist airbag device is formed in an outer dimension which enables an occupant sitting on a front window seat and an occupant sitting on a center seat to be restrained. A partition is provided in the airbag to divide the airbag into an airbag for a center seat occupant which is deployed in front of the center seat and an airbag for a front window seat occupant which is deployed in front of the front window seat. An inflator is connected to the airbag for a center seat occupant. A communication hole which allows communication between the inside of the airbag for a center seat occupant and the inside of the airbag for a front window seat occupant is opened on the partition and an exhaust hole which communicates with the outside is opened in a side portion of the airbag for a front window seat occupant.

In recent years, regarding occupant protection by a vehicular airbag device, measures against diagonal collisions which is one of the collision modes of vehicles are being considered. A diagonal collision is an intermediate collision mode between a head-on collision and a side collision. In a diagonal collision, an end part in a vehicle width direction in a front part of a vehicle in a longitudinal direction (a front right corner or a front left corner) is the point of collision and the vehicle turns around this collision point. In a head-on collision, the body of an occupant moves forward in the vehicle longitudinal direction from a seat. In a side collision, the body of an occupant moves rightward or leftward in the vehicle width direction. In the case of a diagonal collision in which a turning force acts on the vehicle, an occupant is subjected to forces in both the vehicle longitudinal direction and the vehicle width direction. Therefore, an occupant moves diagonally forward in the vehicle longitudinal direction from a seat. In addition to a force that causes a diagonally-forward movement, the body of the occupant is also subjected to a rotating force in a similar manner to the vehicle subjected to a turning force. Therefore, the body of the occupant rotates while tilting diagonally with respect to the vehicle longitudinal direction. In doing so, the head of the occupant also rotates left and right with the neck as an axis.

As indicated by a dotted line in FIG. 70 appended to this specification, a conventional vehicular front seat airbag #a is configured so as to deploy and expand rearward in a vehicle longitudinal direction toward an occupant 101 sitting on a front seat of a vehicle from an opening 104 of an instrument panel 102. Conventionally, an outer shape of the airbag #a when fully deployed and expanded as viewed downward from above the vehicle is a triangular shape or a fan-like shape in which an occupant restraining surface #b that catches and restrains the occupant 101 is wide in a vehicle width direction and a front end #c in the vehicle longitudinal direction on the side of the opening 104 tapers off and is narrow in the vehicle width direction.

In the case of the conventional vehicular front seat airbag #a, even when attempting to restrain the occupant 101 moving diagonally forward in the vehicle longitudinal direction due to a diagonal collision with the occupant restraining surface #b, the airbag #a ends up rotating around the front end #c in the vehicle longitudinal direction together with the body of the occupant 101 which rotates so as to tilt diagonally while moving. Therefore, the body of the occupant 101 escapes to a side of the airbag #a to create a problem in that the body of the occupant 101 cannot be appropriately restrained by the occupant restraining surface #b or, in other words, there is no surface for restraining the occupant 101. In addition, since the body of the occupant 101 cannot be appropriately restrained, there is also a problem that a rotation of the head 101a of the occupant 101 around the neck cannot be suppressed and, accordingly, a head obstruction value of the occupant 101 is also high.

The present invention has been devised in consideration of the conventional problems described above and an object thereof is to provide a vehicular airbag device capable of improving reduction of an occupant obstruction value during a diagonal collision.

SUMMARY AND INTRODUCTORY DESCRIPTION OF INVENTION

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which restrains the occupant while being supported by the instrument panel, wherein an outer shape of the airbag when fully deployed and expanded is line-symmetrical with respect to a center line of the opening in a vehicle left-right width direction, and a width dimension in the vehicle width direction at a rear edge position of the instrument panel in the vehicle longitudinal direction is greater than a width dimension in the vehicle width direction at a center position of the opening in the vehicle longitudinal direction which is more forward in the vehicle longitudinal direction than the rear edge position of the instrument panel.

Favorably, the width dimension in the vehicle width direction at the rear edge position of the instrument panel and the width dimension in the vehicle width direction at the center position of the opening in the vehicle longitudinal direction which is more forward in the vehicle longitudinal direction than the rear edge position of the instrument panel are both greater than a maximum width dimension in the vehicle width direction at a vertical section including an apex position of the airbag which is more rearward in the vehicle longitudinal direction than the rear edge position of the instrument panel.

Desirably, the airbag when fully deployed and expanded includes a main airbag section positioned at center and a pair of left and right sub airbag sections positioned on both left and right sides of the main airbag section in the vehicle width direction, the main airbag section and the pair of sub airbag sections are integrally formed and the main airbag section and each sub airbag section are allowed to communicate with each other by a communication hole, and the sub airbag sections are deployed and expanded while being supported by the instrument panel in order to support an opening periphery of the main airbag section.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which catches the occupant while being supported by the instrument panel, wherein an outer shape of the airbag when fully deployed and expanded is line-symmetrical with respect to a center line of the opening in a vehicle left-right width direction, and a width dimension in the vehicle width direction at a center position of the opening in the vehicle longitudinal direction is greater than a width dimension in the vehicle width direction at a rear edge position of the instrument panel which is more rearward in the vehicle longitudinal direction in the vehicle longitudinal direction than the center position of the opening.

Favorably, the width dimension in the vehicle width direction at the center position of the opening in the vehicle longitudinal direction and the width dimension in the vehicle width direction at the rear edge position of the instrument panel which is more rearward in the vehicle longitudinal direction than the center position of the opening in the vehicle longitudinal direction are both greater than a maximum width dimension in the vehicle width direction at a vertical section including an apex position of the airbag which is more rearward in the vehicle longitudinal direction than the rear edge position of the instrument panel.

Desirably, the airbag when fully deployed and expanded includes a main airbag section positioned at center and a pair of left and right sub airbag sections positioned on both left and right sides of the main airbag section in the vehicle width direction, the main airbag section and the pair of sub airbag sections are integrally formed and the main airbag section and each sub airbag section are allowed to communicate with each other by a communication hole, and the sub airbag sections are deployed and expanded while being supported by the instrument panel in order to support an opening periphery of the main airbag section.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which restrains the occupant while being supported by the instrument panel, wherein an outer shape of the airbag when fully deployed and expanded is line-symmetrical with respect to a center line of the opening in a vehicle left-right width direction and has a size which protrudes in the vehicle width direction from a reference longitudinal direction vertical plane which passes in the vehicle longitudinal direction through a shoulder of the occupant sitting on the front seat, and a protrusion dimension of the airbag in the vehicle width direction at a rear edge position of the instrument panel is greater than a protrusion dimension in the vehicle width direction at a center position of the opening in the vehicle longitudinal direction which is more forward in the vehicle longitudinal direction than the rear edge position of the instrument panel.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which restrains the occupant while being supported by the instrument panel, wherein an outer shape of the airbag when fully deployed and expanded is line-symmetrical with respect to a center line of the opening in a vehicle left-right width direction and has a size which protrudes in the vehicle width direction from a reference longitudinal direction vertical plane which passes in the vehicle longitudinal direction through a shoulder of the occupant sitting on the front seat, and a protrusion dimension of the airbag in the vehicle width direction at a center position of the opening in the vehicle longitudinal direction is greater than a protrusion dimension in the vehicle width direction at a rear edge position of the instrument panel which is more rearward in the vehicle longitudinal direction in the vehicle longitudinal direction than the center position of the opening.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which restrains the occupant while being supported by the instrument panel, wherein an outer shape of the airbag when fully deployed and expanded is line-symmetrical with respect to a center line of the opening in a vehicle left-right width direction and includes, between a first vehicle width direction vertical plane which passes through a center position of the opening in the vehicle longitudinal direction and a second vehicle width direction vertical plane which passes through a rear edge position of the instrument panel, a region which comes into contact with the instrument panel more outward in the vehicle width direction than a second longitudinal direction vertical plane which passes through an end edge of the airbag in contact with the instrument panel at the center position of the opening in the vehicle longitudinal direction, the second longitudinal direction vertical plane being more outside than a first longitudinal direction vertical plane which passes in the vehicle longitudinal direction through a shoulder of the occupant sitting on the front seat.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which catches the occupant while being supported by the instrument panel, wherein an outer shape of the airbag when fully deployed and expanded is line-symmetrical with respect to a center line of the opening in a vehicle left-right width direction and includes, between a first vehicle width direction vertical plane which passes through a center position of the opening in the vehicle longitudinal direction and a second vehicle width direction vertical plane which passes through a rear edge position of the instrument panel, a region which comes into contact with the instrument panel more outward in the vehicle width direction than a second longitudinal direction vertical plane which passes through an end edge of the airbag in contact with the instrument panel at the rear edge position of the instrument panel, the second longitudinal direction vertical plane being more outside than a first longitudinal direction vertical plane which passes in the vehicle longitudinal direction through a shoulder of the occupant sitting on the front seat.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which restrains the occupant while being supported by the instrument panel, wherein the vehicular airbag device further includes: an additional opening which is formed positioned at a side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel.

Favorably, outer shapes of the airbag and the additional airbag when the airbag and the additional airbag are fully deployed and expanded have a width dimension in the vehicle width direction at a rear edge position of the instrument panel in the vehicle longitudinal direction which is greater than in a case where only the airbag is provided.

Desirably, an outer shape of the additional airbag when the airbag and the additional airbag are fully deployed and expanded has a size such that a part is positioned overlapped between the instrument panel and the airbag at a rear edge position of the instrument panel in the vehicle longitudinal direction and the remaining part protrudes outward from the airbag in the vehicle width direction.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on a front seat of a vehicle, and which catches the occupant while being supported by the instrument panel, wherein when the airbag is fully deployed and expanded, with respect to a center line of the opening in a vehicle left-right width direction as a reference, an outer shape of the airbag on a vehicle interior side of the center line has a dimension in the vehicle width direction from the center line at a rear edge position of the instrument panel in the vehicle longitudinal direction which is greater than a dimension in the vehicle width direction from the center line at a center position of the opening in the vehicle longitudinal direction which is more forward in the vehicle longitudinal direction than the rear edge position of the instrument panel.

Desirably, the dimension in the vehicle width direction at the rear edge position of the instrument panel and the dimension in the vehicle width direction at the center position of the opening in the vehicle longitudinal direction which is more forward in the vehicle longitudinal direction than the rear edge position of the instrument panel are both greater than a maximum dimension in the vehicle width direction from the center line on a vehicle interior side of the center line at a vertical section including an apex position of the airbag which is more rearward in the vehicle longitudinal direction than the rear edge position of the instrument panel.

Favorably, the airbag when fully deployed and expanded includes a main airbag section positioned directly opposing the opening and a sub airbag section positioned on a vehicle interior side in the vehicle width direction with respect to the main airbag section, the main airbag section and the sub airbag section are integrally formed and the main airbag section and the sub airbag section are allowed to communicate with each other by a communication hole, and the sub airbag section is deployed and expanded while being supported by the instrument panel in order to support an opening periphery of the main airbag section.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which catches the occupant while being supported by the instrument panel, wherein when the airbag is fully deployed and expanded, with respect to a center line of the opening in a vehicle left-right width direction as a reference, an outer shape of the airbag on a vehicle interior side of the center line has a dimension in the vehicle width direction from the center line at a center position of the opening in the vehicle longitudinal direction which is greater than a dimension in the vehicle width direction from the center line at a rear edge position of the instrument panel which is more rearward in the vehicle longitudinal direction than the center position of the opening in the vehicle longitudinal direction.

Desirably, the dimension in the vehicle width direction at the center position of the opening in the vehicle longitudinal direction and the dimension in the vehicle width direction at the rear edge position of the instrument panel which is more rearward in the vehicle longitudinal direction than the center position of the opening in the vehicle longitudinal direction are both greater than a maximum dimension in the vehicle width direction from the center line on a vehicle interior side of the center line at a vertical section including an apex position of the airbag which is more rearward in the vehicle longitudinal direction than the rear edge position of the instrument panel.

Favorably, the airbag when fully deployed and expanded includes a main airbag section positioned directly opposing the opening and a sub airbag section positioned on a vehicle interior side in the vehicle width direction with respect to the main airbag section, the main airbag section and the sub airbag section are integrally formed and the main airbag section and the sub airbag section are allowed to communicate with each other by a communication hole, and the sub airbag section is deployed and expanded while being supported by the instrument panel in order to support an opening periphery of the main airbag section.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which catches the occupant while being supported by the instrument panel, wherein when the airbag is fully deployed and expanded, with respect to a center line of the opening in a vehicle left-right width direction as a reference, an outer shape of the airbag on a vehicle interior side of the center line has a size which protrudes toward the vehicle interior side in the vehicle width direction from a longitudinal direction vertical plane passing in the vehicle longitudinal direction through a shoulder positioned on the vehicle interior side of the occupant sitting on the front seat, and a protrusion dimension of the airbag in the vehicle width direction at a rear edge position of the instrument panel is greater than a protrusion dimension in the vehicle width direction at a center position of the opening in the vehicle longitudinal direction which is more forward in the vehicle longitudinal direction than the rear edge position of the instrument panel.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein when the airbag is fully deployed and expanded, with respect to a center line of the opening in a vehicle left-right width direction as a reference, an outer shape of the airbag on a vehicle interior side of the center line has a size which protrudes toward the vehicle interior side in the vehicle width direction from a longitudinal direction vertical plane passing in the vehicle longitudinal direction through a shoulder positioned on the vehicle interior side of the occupant sitting on the front seat, and a protrusion dimension of the airbag in the vehicle width direction at a center position of the opening in the vehicle longitudinal direction is greater than a protrusion dimension in the vehicle width direction at a rear edge position of the instrument panel which is more rearward in the vehicle longitudinal direction than the center position of the opening in the vehicle longitudinal direction.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein when the airbag is fully deployed and expanded, with respect to a center line of the opening in a vehicle left-right width direction as a reference, an outer shape of the airbag on a vehicle interior side of the center line includes, between a first vehicle width direction vertical plane which passes through a center position of the opening in the vehicle longitudinal direction and a second vehicle width direction vertical plane which passes through a rear edge position of the instrument panel, a region which comes into contact with the instrument panel more to the vehicle interior side in the vehicle width direction than a second longitudinal direction vertical plane which passes through an end edge of the airbag in contact with the instrument panel at the center position of the opening in the vehicle longitudinal direction, the second longitudinal direction vertical plane being on the vehicle interior side of a first longitudinal direction vertical plane which passes in the vehicle longitudinal direction through a shoulder positioned on the vehicle interior side of the occupant sitting on the front seat.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein when the airbag is fully deployed and expanded, with respect to a center line of the opening in a vehicle left-right width direction as a reference, an outer shape of the airbag on a vehicle interior side of the center line includes, between a first vehicle width direction vertical plane which passes through a center position of the opening in the vehicle longitudinal direction and a second vehicle width direction vertical plane which passes through a rear edge position of the instrument panel, a region which comes into contact with the instrument panel more to the vehicle interior side in the vehicle width direction than a second longitudinal direction vertical plane which passes through an end edge of the airbag in contact with the instrument panel at the rear edge position of the instrument panel, the second longitudinal direction vertical plane being on the vehicle interior side of a first longitudinal direction vertical plane which passes in the vehicle longitudinal direction through a shoulder positioned on the vehicle interior side of the occupant sitting on the front seat.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which catches the occupant while being supported by the instrument panel, wherein the vehicular airbag device further includes: an additional opening which is formed positioned on a vehicle interior side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel, when the airbag and the additional airbag are fully deployed and expanded, with respect to a center line of the opening in a vehicle left-right width direction as a reference, an outer shape formed by a combination of the airbag and the additional airbag on a vehicle interior side of the center line has a dimension in the vehicle width direction from the center line at a rear edge position of the instrument panel in the vehicle longitudinal direction which is greater than a dimension in the vehicle width direction from the center line at a center position of the opening in the vehicle longitudinal direction which is more forward in the vehicle longitudinal direction than the rear edge position of the instrument panel.

Desirably, the dimension in the vehicle width direction at the rear edge position of the instrument panel and the dimension in the vehicle width direction at the center position of the opening in the vehicle longitudinal direction which is more forward in the vehicle longitudinal direction than the rear edge position of the instrument panel are both greater than a maximum dimension in the vehicle width direction from the center line on a vehicle interior side of the center line at a vertical section including an apex position of the airbag which is more rearward in the vehicle longitudinal direction than the rear edge position of the instrument panel.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein the vehicular airbag device further includes: an additional opening which is formed positioned on a vehicle interior side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel, when the airbag and the additional airbag are fully deployed and expanded, with respect to a center line of the opening in a vehicle left-right width direction as a reference, an outer shape formed by a combination of the airbag and the additional airbag on a vehicle interior side of the center line has a dimension in the vehicle width direction from the center line at a center position of the opening in the vehicle longitudinal direction which is greater than a dimension in the vehicle width direction from the center line at a rear edge position of the instrument panel which is more rearward in the vehicle longitudinal direction than the center position of the opening in the vehicle longitudinal direction.

Desirably, the dimension in the vehicle width direction at the center position of the opening in the vehicle longitudinal direction and the dimension in the vehicle width direction at the rear edge position of the instrument panel which is more rearward in the vehicle longitudinal direction than the center position of the opening in the vehicle longitudinal direction are both greater than a maximum dimension in the vehicle width direction from the center line on a vehicle interior side of the center line at a vertical section including an apex position of the airbag which is more rearward in the vehicle longitudinal direction than the rear edge position of the instrument panel.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein the vehicular airbag device further includes: an additional opening which is formed positioned on a vehicle interior side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel, when the airbag and the additional airbag are fully deployed and expanded, with respect to a center line of the opening in a vehicle left-right width direction as a reference, an outer shape formed by a combination of the airbag and the additional airbag on a vehicle interior side of the center line has a size which protrudes toward the vehicle interior side in the vehicle width direction from a longitudinal direction vertical plane passing in the vehicle longitudinal direction through a shoulder positioned on the vehicle interior side of the occupant sitting on the front seat, and a protrusion dimension in the vehicle width direction of the additional airbag at a rear edge position of the instrument panel is greater than a protrusion dimension in the vehicle width direction at a center position of the opening in the vehicle longitudinal direction which is more forward in the vehicle longitudinal direction than the rear edge position of the instrument panel.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein the vehicular airbag device further includes: an additional opening which is formed positioned on a vehicle interior side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel, when the airbag and the additional airbag are fully deployed and expanded, with respect to a center line of the opening in a vehicle left-right width direction as a reference, an outer shape formed by a combination of the airbag and the additional airbag on a vehicle interior side of the center line has a size which protrudes toward the vehicle interior side in the vehicle width direction from a longitudinal direction vertical plane passing in the vehicle longitudinal direction through a shoulder positioned on the vehicle interior side of the occupant sitting on the front seat, and a protrusion dimension of the additional airbag in the vehicle width direction at a center position of the opening in the vehicle longitudinal direction is greater than a protrusion dimension in the vehicle width direction at a rear edge position of the instrument panel which is more rearward in the vehicle longitudinal direction than the center position of the opening in the vehicle longitudinal direction.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein the vehicular airbag device further includes: an additional opening which is formed positioned on a vehicle interior side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel, when the airbag and the additional airbag are fully deployed and expanded, with respect to a center line of the opening in a vehicle left-right width direction as a reference, an outer shape formed by a combination of the airbag and the additional airbag on a vehicle interior side of the center line includes, between a first vehicle width direction vertical plane which passes through a center position of the opening in the vehicle longitudinal direction and a second vehicle width direction vertical plane which passes through a rear edge position of the instrument panel, a region which comes into contact with the instrument panel more to the vehicle interior side in the vehicle width direction than a second longitudinal direction vertical plane which passes through an end edge of the additional airbag in contact with the instrument panel at the center position of the opening in the vehicle longitudinal direction, the second longitudinal direction vertical plane being on the vehicle interior side of a first longitudinal direction vertical plane which passes in the vehicle longitudinal direction through a shoulder positioned more to the vehicle interior side of the occupant sitting on the front seat.

A vehicular airbag device according to the present invention is a vehicular airbag device including an airbag which opens an airbag door openably sealing an opening formed on an instrument panel, which deploys and expands rearward in a vehicle longitudinal direction from the opening toward an occupant sitting on the front seat, and which restrains the occupant while being supported by the instrument panel, wherein the vehicular airbag device further includes: an additional opening which is formed positioned on a vehicle interior side of the opening in the vehicle width direction on the instrument panel and which is openably opened by an additional airbag door; and an additional airbag which opens the additional airbag door, which deploys and expands rearward in the vehicle longitudinal direction from the additional opening, and which supports an opening periphery of the airbag while being supported by the instrument panel, when the airbag and the additional airbag are fully deployed and expanded, with respect to a center line of the opening in a vehicle left-right width direction as a reference, an outer shape formed by a combination of the airbag and the additional airbag on a vehicle interior side of the center line includes, between a first vehicle width direction vertical plane which passes through a center position of the opening in the vehicle longitudinal direction and a second vehicle width direction vertical plane which passes through a rear edge position of the instrument panel, a region which comes into contact with the instrument panel more to the vehicle interior side in the vehicle width direction than a second longitudinal direction vertical plane which passes through an end edge of the additional airbag in contact with the instrument panel at the rear edge position of the instrument panel, the second longitudinal direction vertical plane being on the vehicle interior side of a first longitudinal direction vertical plane which passes in the vehicle longitudinal direction through a shoulder positioned on the vehicle interior side of the occupant sitting on the front seat.

A vehicular airbag device according to the present invention is capable of improving reduction of an occupant obstruction value during a diagonal collision.

DETAILED DESCRIPTION

Hereinafter, preferred embodiments of a vehicular airbag device according to the present invention will be described in detail with reference to the accompanying drawings.

Figure 1:
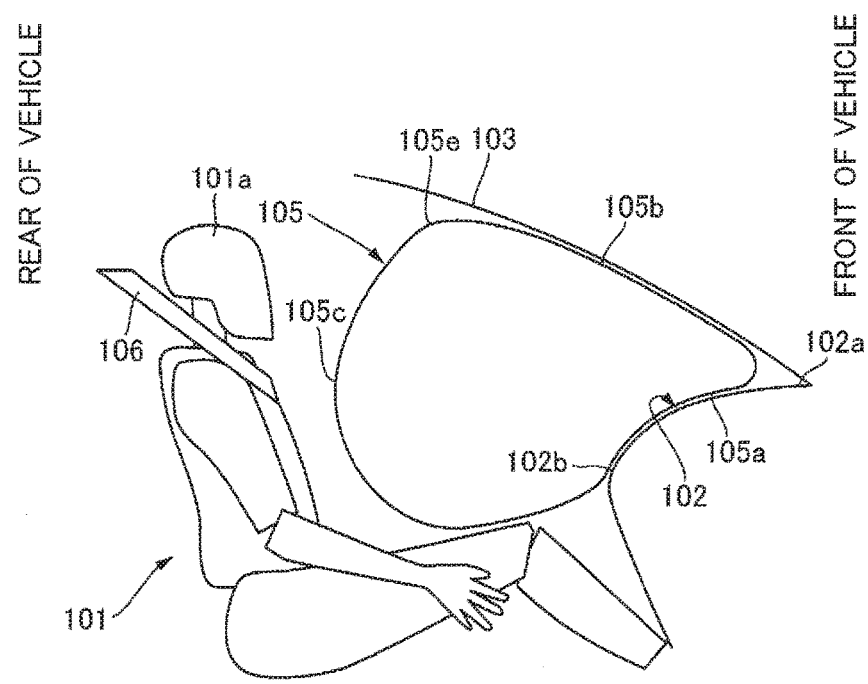
FIG. 1 is a schematic side view of a periphery of a front seat of a vehicle to which a vehicular airbag device according to the present invention is mounted in relation to first to seventh embodiments.
Figure 2:
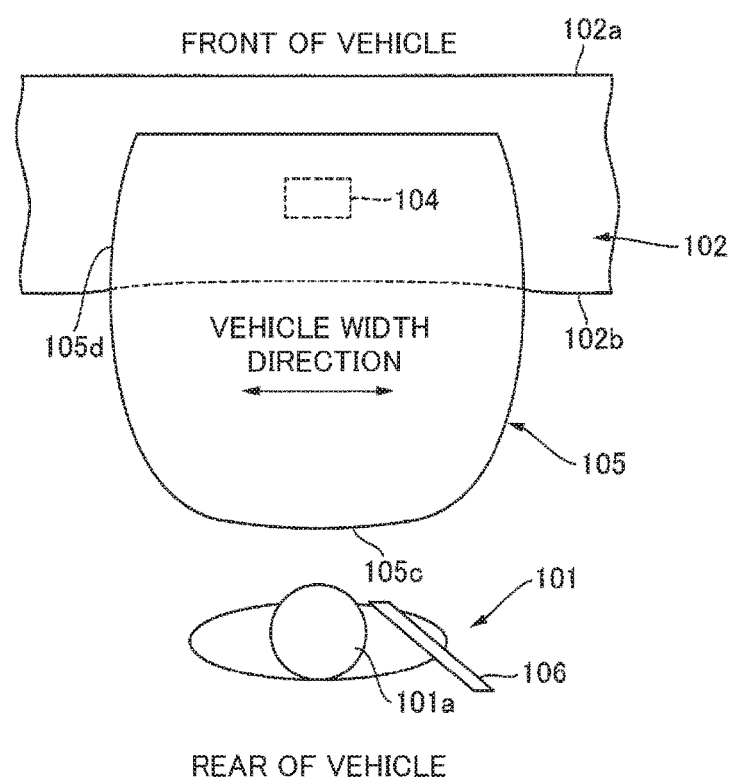
FIG. 2 is a schematic plan view of the periphery of the front seat of the vehicle shown in FIG. 1.
Figure 3:
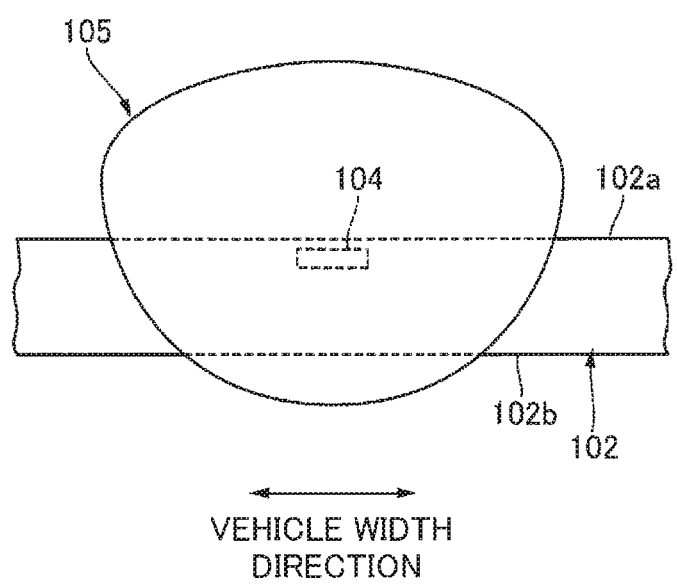
FIG. 3 is a schematic front view of the periphery of the front seat of the vehicle shown in FIG. 1 when viewing forward from rearward in a longitudinal direction of the vehicle.

FIG. 1 is a schematic side view of a periphery of a front seat of a vehicle to which a vehicular airbag device according to the present invention is mounted in relation to first to seventh embodiments that concern a line-symmetrical airbag, FIG. 2 is a schematic plan view of the periphery of the front seat of the vehicle shown in FIG. 1, and FIG. 3 is a schematic front view of the periphery of the front seat shown in FIG. 1 when viewing forward from rearward in a longitudinal direction of the vehicle.

An instrument panel 102 is installed in front in a vehicle longitudinal direction of an occupant 101 (represented by a dummy in the drawing) sitting on a front seat of a vehicle so as to face the occupant 101. A front end 102a in the vehicle longitudinal direction of the instrument panel 102 is positioned farthest from the occupant 101 while a rear end 102b in the vehicle longitudinal direction is positioned nearest to the occupant 101.

As shown in FIG. 1, generally, a side section of the instrument panel 102 is formed by a curved surface that gently declines from the front end 102a toward the rear end 102b. The instrument panel 102 is formed in a vehicle width direction so as to spread leftward and rightward in a band shape. A front windshield 103 is installed between A pillars of the vehicle so as to gradually rise from a periphery of the front end 102a of the instrument panel 102 toward the rear in the vehicle longitudinal direction.

An opening 104 is formed on the instrument panel 102 and arranged so as to oppose the front seat occupant 101. The opening 104 is sealed by an openable airbag door (not shown). An airbag 105 is housed inside the instrument panel 102.

When a collision impact is generated, the airbag 105 is inflated by inflator gas that is generated by an inflator. When inflated, the airbag 105 opens the airbag door and deploys and expands rearward in a vehicle longitudinal direction from the opening 104 toward the occupant 101 sitting on the front seat of the vehicle.

In the event the airbag 105 having burst out from the opening 104, a downward-facing surface 105a deploys and expands toward the occupant 101 along the instrument panel 102 while an upward-facing surface 105b deploys and expands toward the occupant 101 along the front windshield 103. A rearward surface in the vehicle longitudinal direction of the airbag 105 is to constitute an occupant restraining surface 105c.

When restraining the occupant 101 with the occupant restraining surface 105c, the downward-facing surface 105a of the airbag 105 abuts the instrument panel 102. Accordingly, the airbag 105 is supported by the instrument panel 102. At the same time, the upward-facing surface 105b of the airbag 105 abuts the front windshield 103 and, accordingly, the airbag 105 is supported by the front windshield 103.

The airbag 105 is configured such that, by being supported by the instrument panel 102 and the front windshield 103, the airbag 105 receives supporting reaction forces therefrom and contacts and restrains the body of the occupant 101. In the drawing, reference numeral 106 denotes a seatbelt.

The vehicular airbag device according to the present invention is basically formed such that, when looking downward from above the vehicle, an outer shape of the fully deployed and expanded airbag 105 in a vehicle width direction is wider on a side of a front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction.

Figure 4:
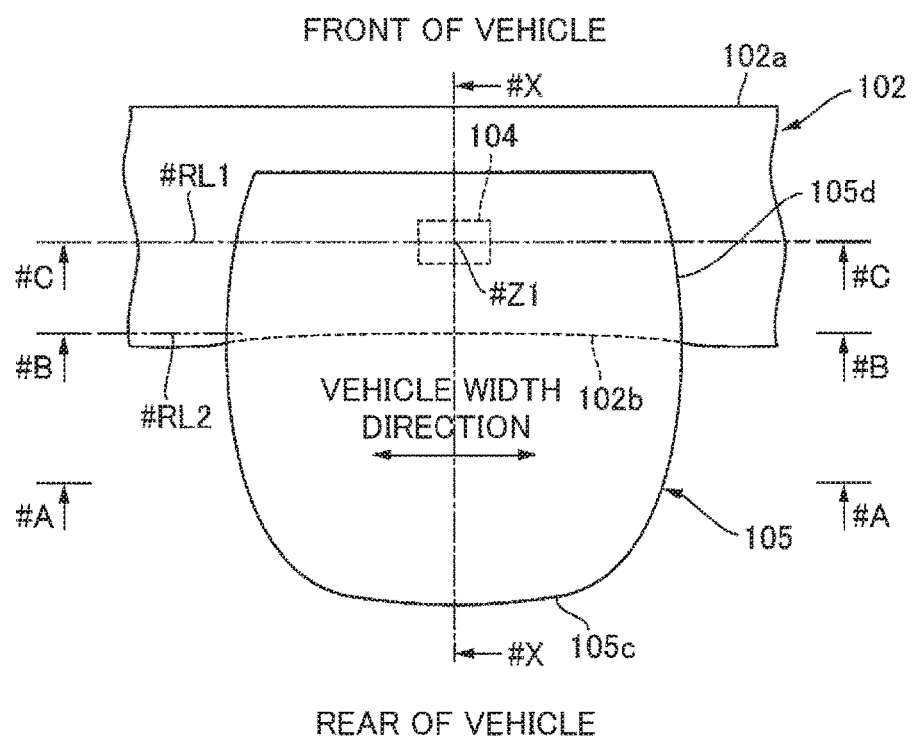
FIG. 4 is a plan view of an airbag representing a first embodiment of a vehicular airbag device according to the present invention.
Figure 5:
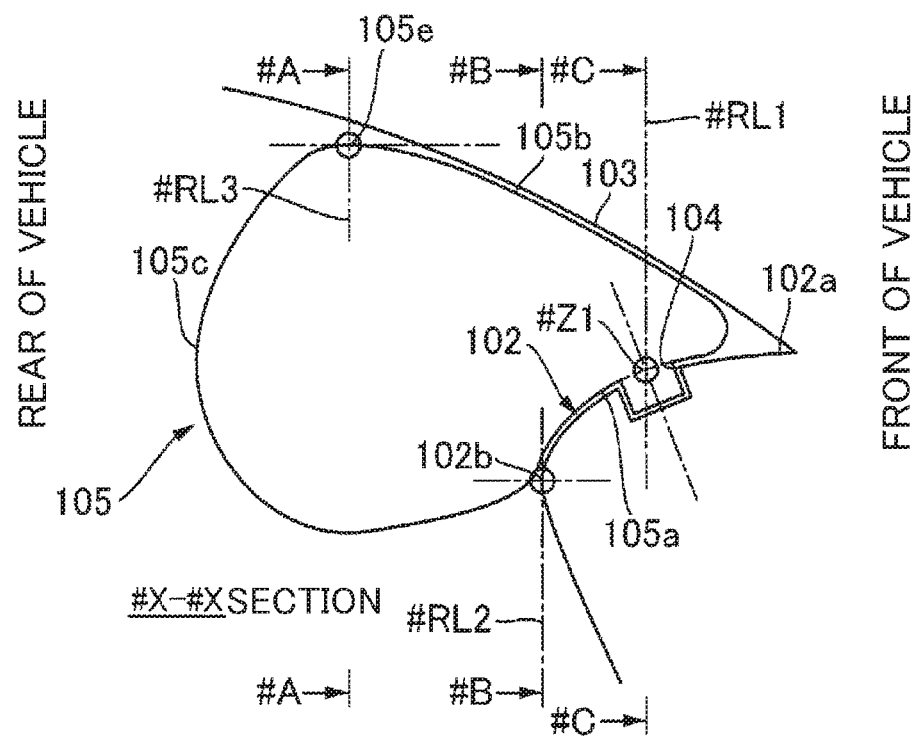
FIG. 5 is a sectional view taken along line X-X in FIG. 4.
Figure 6:
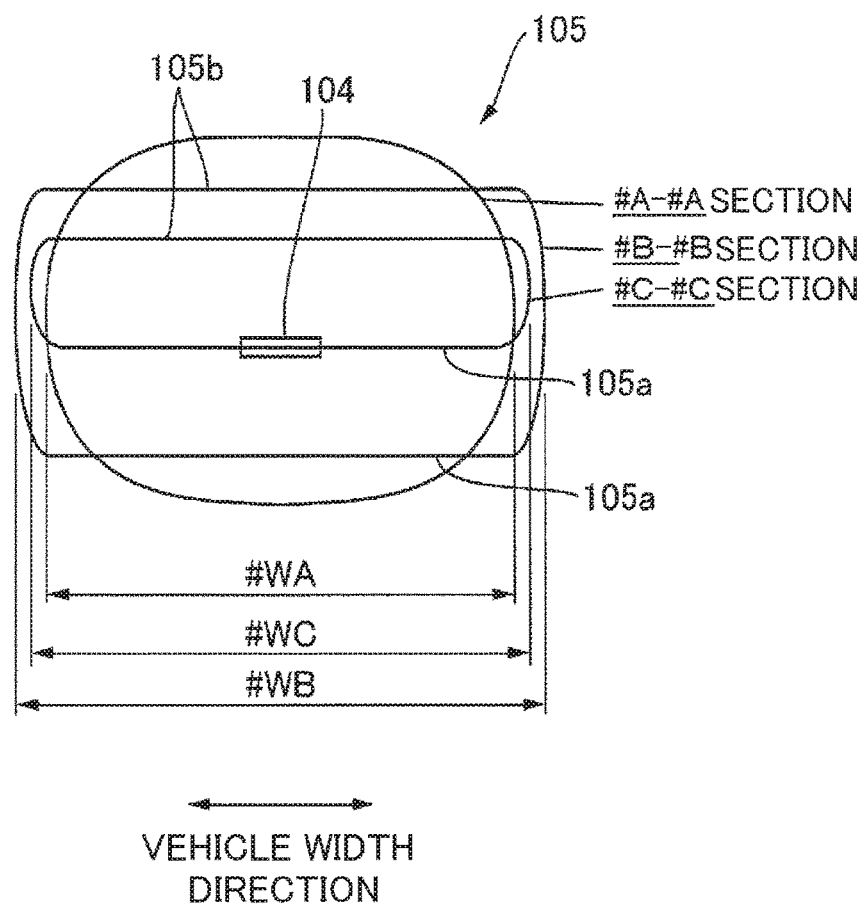
FIG. 6 is an explanatory diagram depicting sections of an airbag at the respective positions illustrated in FIGS. 4 and 5 in an overlapping manner when viewing forward from rearward in the vehicle longitudinal direction.

FIGS. 4 to 6 show the airbag 105 of the vehicular airbag device according to the first embodiment. FIG. 4 is a plan view of the airbag 105, FIG. 5 is a sectional view taken along line X-X in FIG. 4, and FIG. 6 is an explanatory diagram depicting sections of the airbag 105 at the respective positions illustrated in FIGS. 4 and 5 in an overlapping manner when viewing forward from rearward in the vehicle longitudinal direction.

The line X-X is a center line oriented in the vehicle longitudinal direction of the opening 104 in the vehicle left-right width direction. A line C-C is a center line oriented in the vehicle left-right width direction of the opening 104 in the vehicle longitudinal direction and indicates a center position Z1 of the opening 104 in the vehicle longitudinal direction (hereinafter, referred to as a line C-C position). In addition, a section taken along the line C-C is a first vehicle width direction vertical plane RL1 which passes through the center position Z1 of the opening 104 in the vehicle longitudinal direction (which includes the center position Z1 of the opening 104 in the vehicle longitudinal direction).

A line B-B is oriented in the vehicle left-right width direction and indicates a position of a rear edge 102b of the instrument panel 102 in the vehicle longitudinal direction (hereinafter, referred to as a line B-B position). In addition, a section taken along the line B-B is a second vehicle width direction vertical plane RL2 which passes through the position of the rear edge 102b of the instrument panel 102 in the vehicle longitudinal direction (which includes the position of the rear edge 102b of the instrument panel 102 in the vehicle longitudinal direction). In the illustrated example, a position most forward in the vehicle when looking down on the instrument panel 102 from above the vehicle is set as the position of the rear edge 102b of the instrument panel 102 in the vehicle longitudinal direction.

A line A-A is oriented in the vehicle left-right width direction and indicates a position of an apex 105e of the fully deployed and expanded airbag 105 (hereinafter, referred to as a line A-A position). In addition, a section taken along the line A-A is a vertical section RL3 which includes the position of the apex 105e of the airbag 105. The line C-C position is more forward in the vehicle longitudinal direction than the line B-B position. The line A-A position is more rearward in the vehicle longitudinal direction than the line B-B position and the line C-C position.

Regarding an outer shape of the fully deployed and expanded airbag 105, as shown in FIG. 4 which is a plan view of the airbag 105, the airbag 105 is formed so as to be line-symmetrical with respect to the center line of the opening 104 in the vehicle left-right width direction (the X-X line). In addition, in the outer shape of the airbag 105, as shown in FIG. 6, a width dimension WB in the vehicle width direction at the line B-B position is set greater than a width dimension WC in the vehicle width direction at the line C-C position which is more forward in the vehicle longitudinal direction than the line B-B position.

Furthermore, both the width dimension WB in the vehicle width direction at the line B-B position and the width dimension WC in the vehicle width direction at the line C-C position which is more forward in the vehicle longitudinal direction than the line B-B position are set greater than a maximum width dimension WA in the vehicle width direction on the vertical section RL3 at the line A-A position which is more rearward in the vehicle longitudinal direction than the line B-B position. In the illustrated example, a planar shape of the airbag 105 is formed in an approximately square shape.

Figure 70:
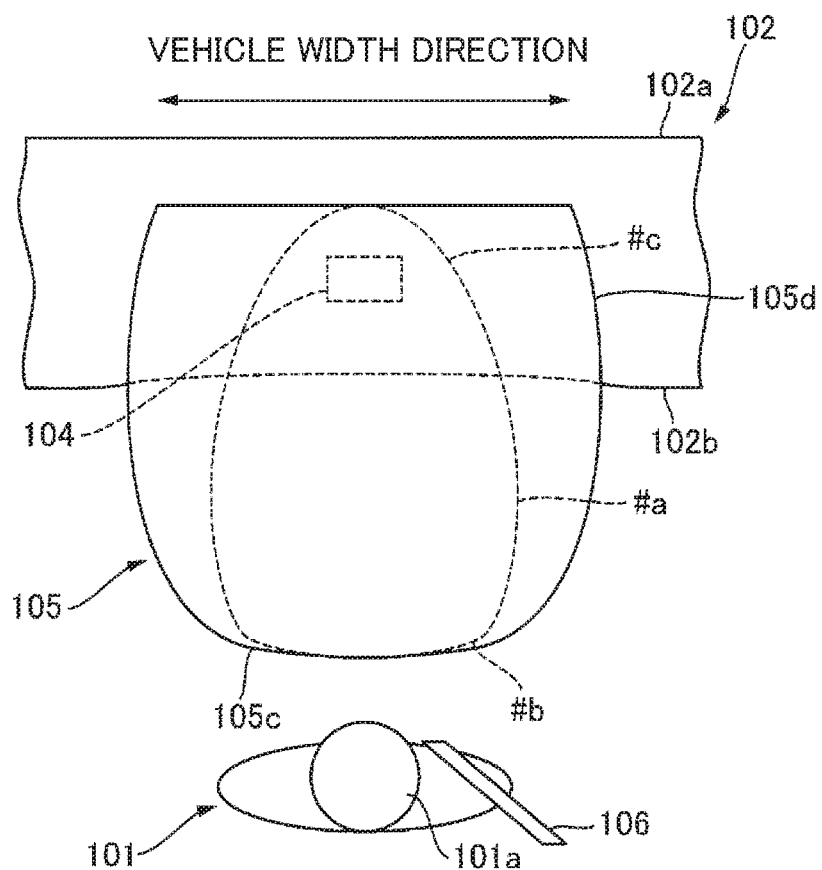
FIG. 70 is an explanatory diagram illustrating, by comparison, an airbag in accordance with conventional art and an airbag according to the first embodiment.

Accordingly, as demonstrated by a comparison with background art (dotted line #a) in FIG. 70, when looking downward from above the vehicle, the outer shape of the fully deployed and expanded airbag 105 is formed so as to be wider in the vehicle width direction on a side of the front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction.

Figure 7:
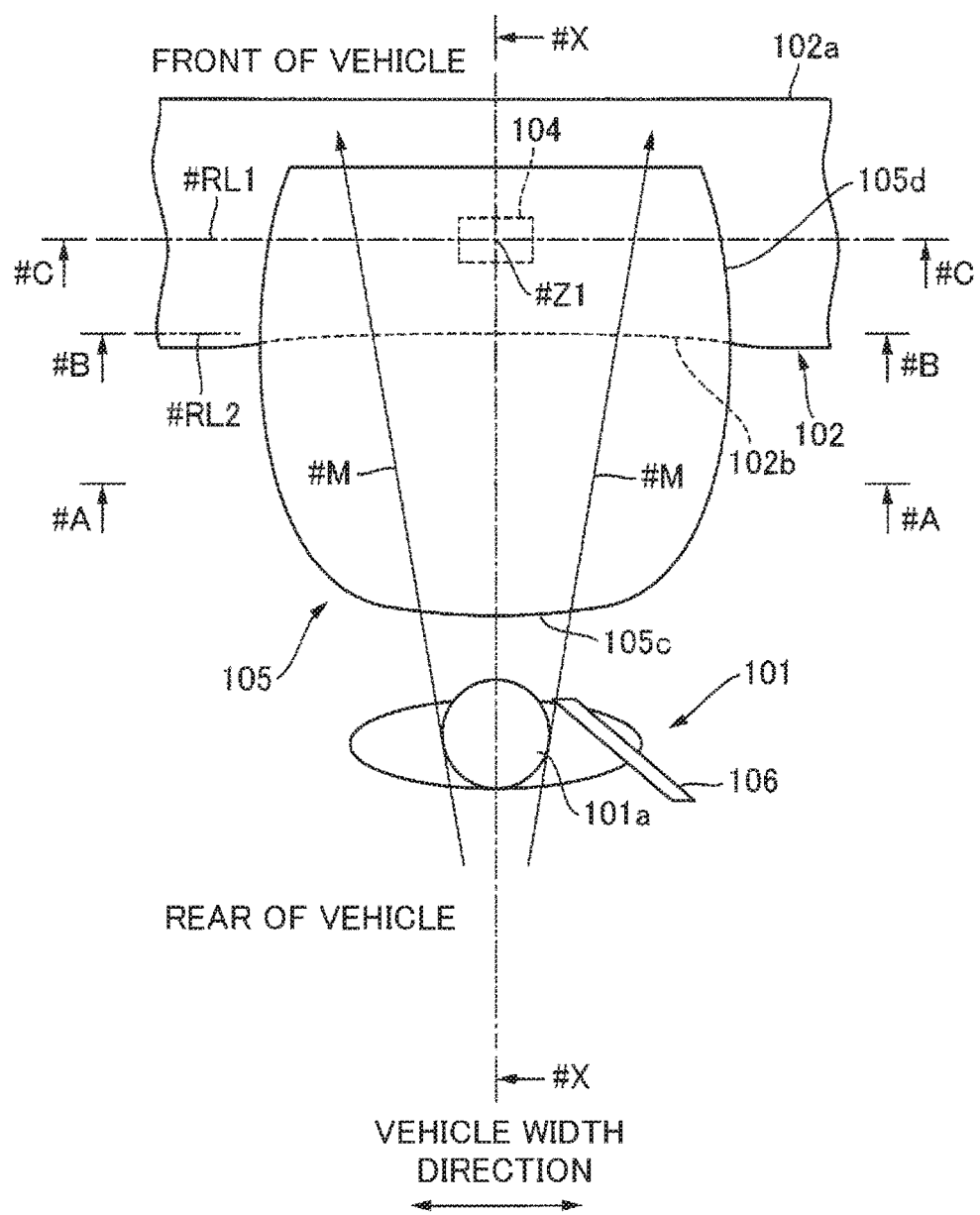
FIG. 7 is a plan view showing a relationship between a direction in which an occupant moves during a diagonal collision and an outer shape of a fully deployed and expanded airbag in relation to a vehicular airbag device according to the present invention.
Figure 8:
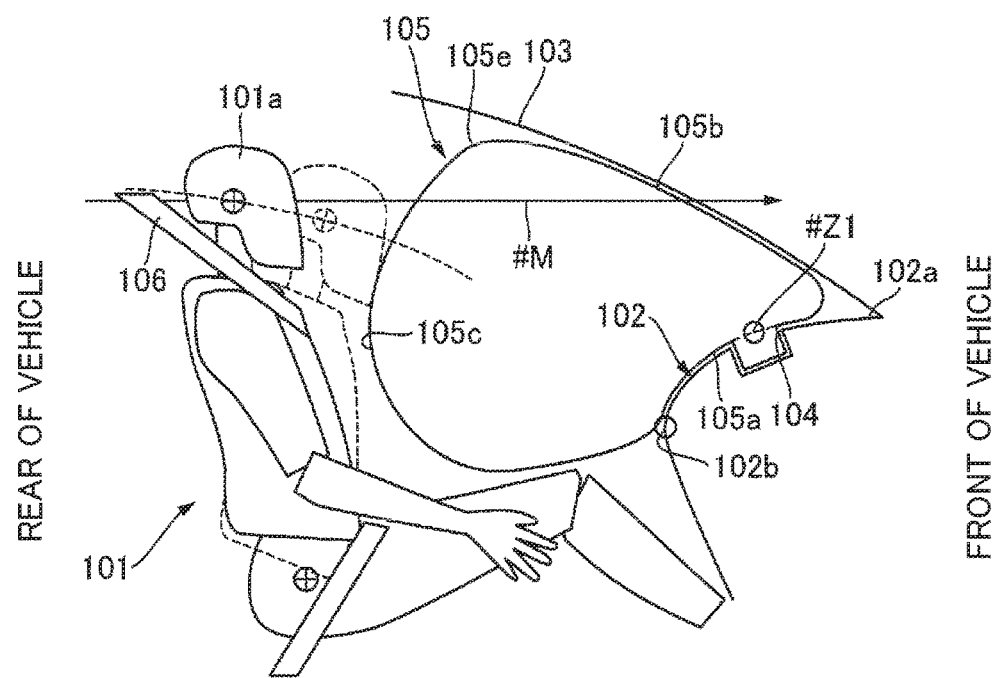
FIG. 8 is a side view showing a relationship between a direction in which an occupant moves during a diagonal collision and an outer shape of a fully deployed and expanded airbag in relation to a vehicular airbag device according to the present invention.
Figure 9:
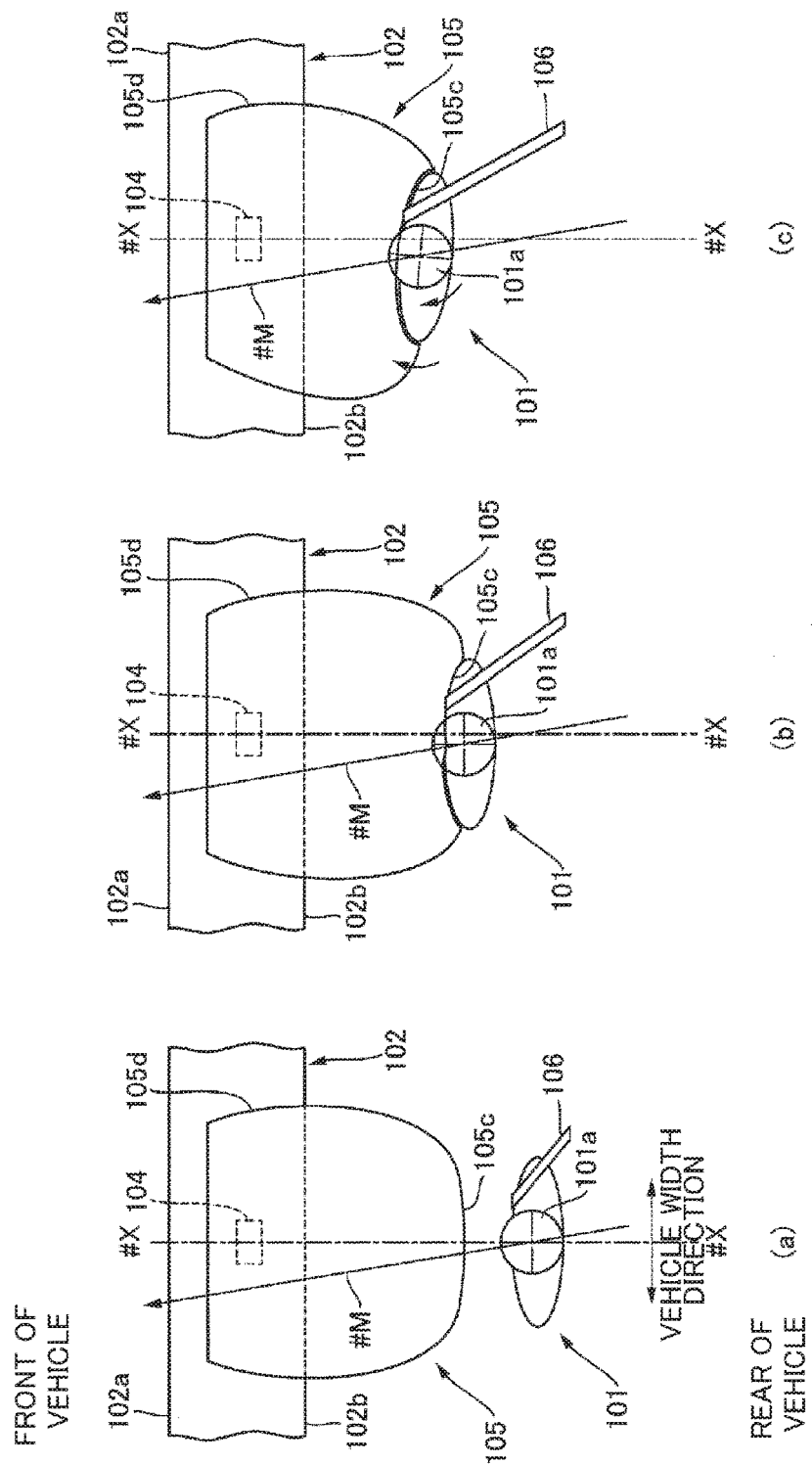
FIGS. 9(a), (b) and (c) are explanatory diagrams illustrating how the airbag of the vehicular airbag device shown in FIG. 4 restrains an occupant during a diagonal collision.

Next, workings of the vehicular airbag device according to the first embodiment will be described. FIG. 7 is a plan view showing a relationship between a direction M in which the occupant 101 moves during a diagonal collision and an outer shape of the fully deployed and expanded airbag 105, FIG. 8 is a side view thereof, and FIG. 9 is an explanatory diagram illustrating how the airbag 105 of the vehicular airbag device according to the first embodiment restrains the occupant 101 during a diagonal collision.

During a diagonal collision, a force causing a diagonally forward movement in the vehicle longitudinal direction (a direction M) acts on the occupant 101. In the first embodiment, the width dimension in the vehicle width direction which defines the outer shape of the airbag 105 is set greater than the maximum width dimension WA in the vehicle width direction on the vertical section RL3 at the line A-A position and, at the same time, greater at the line B-B position than at the line C-C position (WB>WC).

Due to this configuration, a range in which the airbag 105 is supported by the instrument panel 102 and the front windshield 103 to generate a supporting reaction force of the occupant 101 can be secured such that the range is wider than the occupant restraining surface 105c.

Therefore, as shown in FIG. 9(b), when the occupant 101 moves diagonally forward in the vehicle longitudinal direction while rotating so that the body of the occupant 101 tilts diagonally or when a rotation of the body of the occupant 101 occurs due to being caught by the occupant restraining surface 105c, the configuration of the outer shape of the airbag 105 described above enables a rotating action in which the airbag 105 attempts to rotate together with the movement of the occupant 101 to be appropriately prevented by receiving a supporting reaction force from the instrument panel 102 and the like.

Accordingly, as shown in FIG. 9(c), the airbag 105 can restrain the body of the occupant 101 from moving diagonally forward and, at the same time, prevent the body of the occupant 101 from rotating while tilting diagonally. As a result, the occupant 101 can be appropriately restrained and an occupant injury value can be reduced. Furthermore, since the body of the occupant 101 can be prevented from rotating, rotation of the head 101a of the occupant 101 around the neck can also be suppressed. Therefore, injury values of the head 101a and the neck of the occupant 101 can also be reduced.

It is needless to say that the vehicular airbag device according to the first embodiment is capable of demonstrating occupant protection performance comparable to that of conventional devices with respect to head-on collisions in addition to diagonal collisions.

Figure 10:
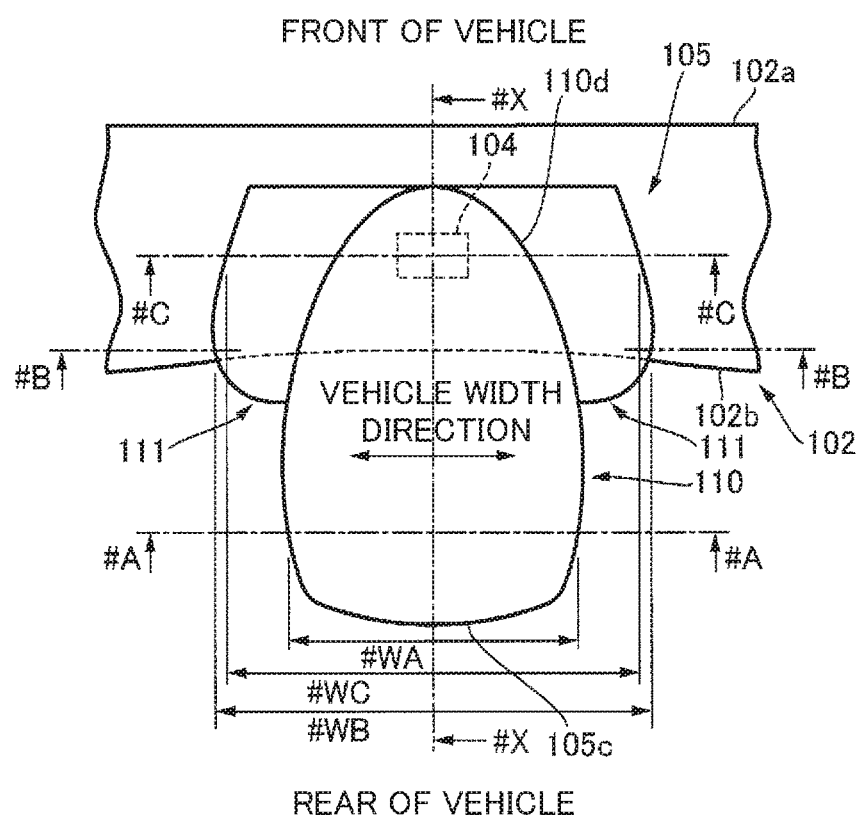
FIG. 10 is a plan view of an airbag in a periphery of a front seat of a vehicle which represents a modification of the first embodiment of a vehicular airbag device according to the present invention.
Figure 11:
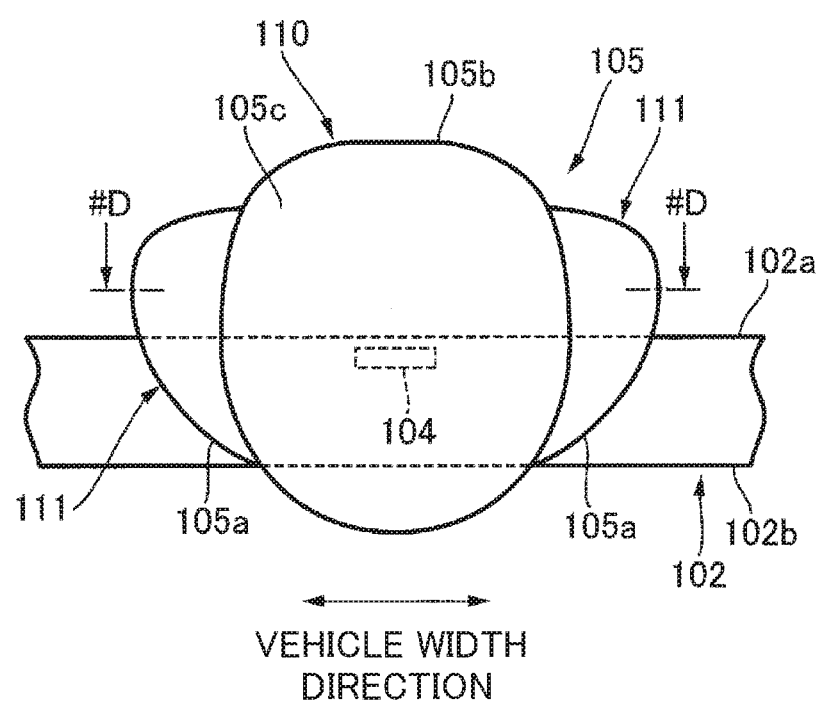
FIG. 11 is a schematic front view of the periphery of the front seat shown in FIG. 10 when viewing forward from rearward in a longitudinal direction of the vehicle.
Figure 12:
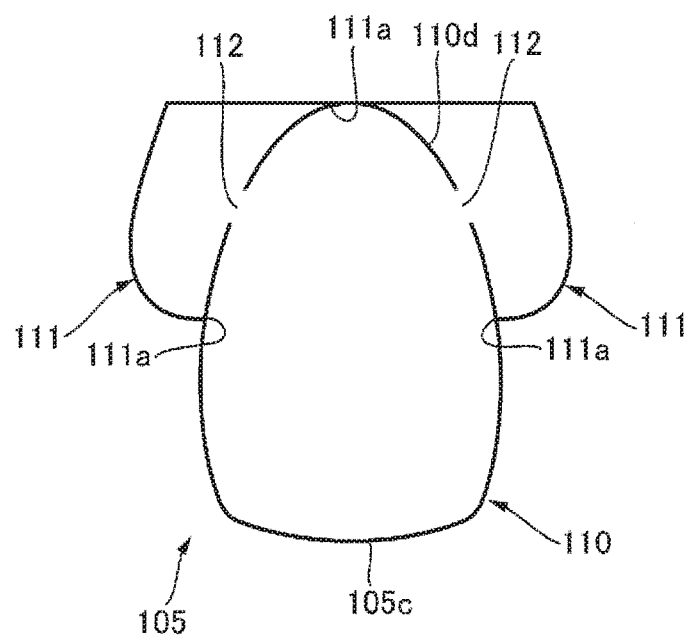
FIG. 12 is a sagittal sectional view taken along line D-D in FIG. 11.

FIGS. 10 to 12 show a modification of the vehicular airbag device according to the first embodiment. FIG. 10 is a plan view of an airbag in a periphery of a front seat of a vehicle, FIG. 11 is a schematic front view of the periphery of the front seat shown in FIG. 10 when viewing forward from rearward in a longitudinal direction of the vehicle, and FIG. 12 is a sagittal sectional view taken along line D-D in FIG. 11.

In this modification, as shown in FIGS. 10 to 12, the airbag 105 when fully deployed and expanded is configured to include a main airbag section 110 positioned at center and a pair of left and right sub airbag sections 111 positioned on both left and right sides of the main airbag section 110 in the vehicle width direction. The main airbag section 110 and the sub airbag sections 111 are deployed and expanded by inflator gas.

When the airbag 105 catches and restrains the occupant 101 with the occupant restraining surface 105c, the downward-facing surface 105a of the airbag 105 constituted by the main airbag section 110 and the sub airbag sections 111 abuts the instrument panel 102. Accordingly, the airbag 105 is supported by the instrument panel 102. At the same time, the upward-facing surface 105b of the airbag 105 abuts the front windshield 103 and, accordingly, the airbag 105 is supported by the front windshield 103.

A capacity of the main airbag section 110 is set larger than a capacity of each sub airbag section 111. Each sub airbag section 111 is a bag body having an annular opening and is provided such that a peripheral edge 111a of the annular opening is joined to an outer surface of the main airbag section 110 by various joining means such as sewing. Accordingly, the sub airbag sections 111 are integrally formed with the main airbag section 110 so as to partially cover the outer surface of the main airbag section 110.

As shown in FIG. 12, the main airbag section 110 and each sub airbag section 111 are allowed to communicate with each other by a communication hole 112 formed in a portion of the main airbag section 110 which is covered by the sub airbag section 111. Inflator gas is first introduced into the main airbag section 110 and subsequently flows into the sub airbag sections 111 through the communication hole 112 from the main airbag section 110. The inflow of inflator gas causes the main airbag section 110 to deploy and expand and, in addition, each sub airbag section 111 deploys and expands so as to bulge outward from the outer surface of the expanded main airbag section 110.

In a similar manner to the conventional airbag (the dotted line #a in FIG. 70) described in background art, an outer shape of the main airbag section 110 when fully deployed and expanded as viewed downward from above the vehicle is formed in a triangular shape or a fan-like shape in which an occupant restraining surface #b that catches and restrains the occupant 101 is wide in a vehicle width direction and a front end 110d in the vehicle longitudinal direction on the side of the opening 104 tapers off and is narrow in the vehicle width direction.

The pair of sub airbag sections 111 is formed in a same shape. As shown in FIG. 10, when viewed downward from above the vehicle, a planar outer shape of each sub airbag section 111 when fully deployed and expanded is formed wide in the vehicle width direction so as to expand a width dimension in the vehicle left-right width direction with respect to the main airbag section 110 on the instrument panel 102 where the front end 110d of the main airbag section 110 in the vehicle longitudinal direction is positioned. In other words, with the airbag 105 as a whole, a dimension in the vehicle left-right width direction is formed wider than conventional airbags.

In the illustrated example, the sub airbag sections 111 are formed so as to slightly protrude toward the rear of the vehicle from the position of the rear edge 102b of the instrument panel 102 in the vehicle longitudinal direction. The sub airbag sections 111 may be formed so as not to protrude toward the rear of the vehicle from the position of the rear edge 102b of the instrument panel 102 in the vehicle longitudinal direction.

As described below, the airbag 105 as a whole which is constituted by the main airbag section 110 and the pair of left and right sub airbag sections 111 is configured in a similar manner to the first embodiment described above.

Specifically, when fully deployed and expanded, an outer shape is formed which is line-symmetrical with respect to the center line of the opening 104 in the vehicle left-right width direction (the X-X line).

In addition, as shown in FIG. 10, with the outer shape of the airbag 105 as a whole, the width dimension WB in the vehicle width direction at the line B-B position is set greater than the width dimension WC in the vehicle width direction at the line C-C position which is more forward in the vehicle longitudinal direction than the line B-B position.

Furthermore, both the width dimension WB in the vehicle width direction at the line B-B position and the width dimension WC in the vehicle width direction at the line C-C position which is more forward in the vehicle longitudinal direction than the line B-B position are set greater than a maximum width dimension WA in the vehicle width direction on the vertical section RL3 at the line A-A position which is more rearward in the vehicle longitudinal direction than the line B-B position.

Accordingly, even in the present modification, in a similar manner to the first embodiment described earlier, the outer shape of the fully deployed and expanded airbag 105 when looking downward from above the vehicle is formed so as to be wider in the vehicle width direction on a side of the opening 104 or, in other words, near the rear end 102b of the instrument panel 102 or near the opening 104 than the occupant restraining surface 105c which is to the rear in the vehicle longitudinal direction.

The sub airbag sections 111 of the airbag 105 configured as described above are deployed and expanded while abutting the instrument panel 102 and, accordingly, supported by the instrument panel 102. As a result, a periphery of the opening 104 of the main airbag section 111 is supported by the pair of left and right sub airbag sections 111.

Even in the present modification, a range in which a supporting reaction force of the occupant 101 is created which is wider than the occupant restraining surface 105c can be secured. In addition, when the occupant 101 moves diagonally forward in the vehicle longitudinal direction while rotating so that the body of the occupant 101 tilts diagonally or when a rotation of the body of the occupant 101 occurs due to being caught by the occupant restraining surface 105c, a rotating action in which the airbag 105 attempts to rotate together with the movement of the occupant 101 can be appropriately prevented by receiving a supporting reaction force from the instrument panel 102 and the like with the sub airbag sections 111. As a result, even in the present modification, a similar working effect to the first embodiment described earlier can be secured.

Figure 13:
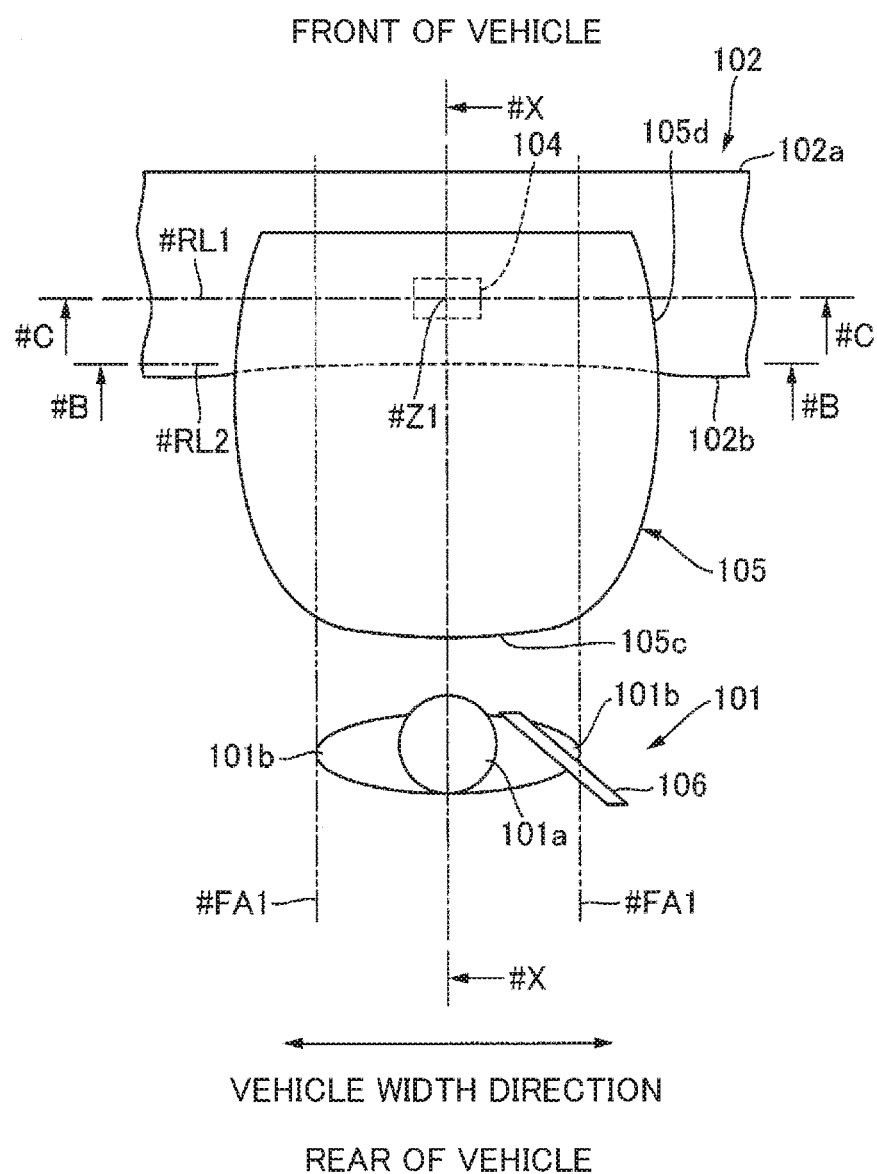
FIG. 13 is a plan view of an airbag representing a second embodiment of a vehicular airbag device according to the present invention.
Figure 14:
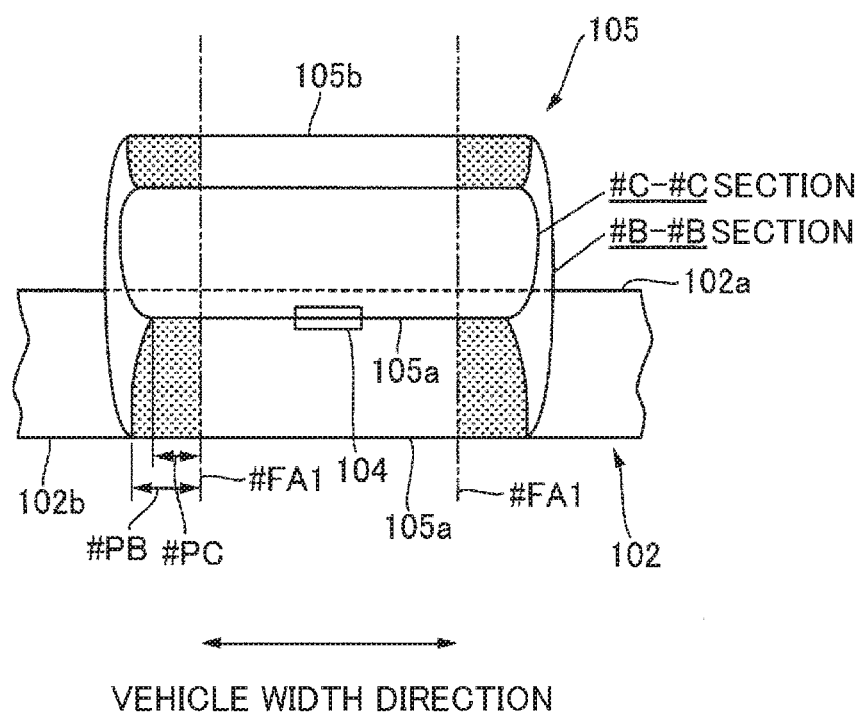
FIG. 14 is an explanatory diagram depicting sections of the airbag shown in FIG. 13 at respective positions including a position of line B-B and a position of line C-C illustrated in FIGS. 4 and 5 in an overlapping manner when viewing forward from rearward in the vehicle longitudinal direction.

FIGS. 13 and 14 show the airbag 105 of a vehicular airbag device according to the second embodiment. Regarding an outer shape of the airbag 105, the fact that (1) a width dimension of the outer shape in the vehicle width direction is greatest at the line B-B position, smaller at the line C-C position, and smallest at the line A-A position (WB>WC>WA) and that (2) the outer shape is formed so as to be line-symmetrical with respect to the center line of the opening 104 in the vehicle left-right width direction (the X-X line) is similar to the airbag 105 of the vehicular airbag device described in the first embodiment.

FIG. 13 is a plan view of the airbag 105, and FIG. 14 is an explanatory diagram depicting sections of the airbag 105 at the respective positions including the line B-B position and the line C-C position illustrated earlier in FIGS. 4 and 5 in an overlapping manner when viewing forward from rearward in the vehicle longitudinal direction.

In the second embodiment, a first longitudinal direction vertical plane FA1 which passes in the vehicle longitudinal direction through a shoulder 101b of the occupant 101 sitting on a front seat is used as a reference. The plan view in FIG. 13 shows a pair of left and right first longitudinal direction vertical planes FA1 in correspondence with a right shoulder 101b and a left shoulder 101b of the occupant 101. Since the occupant 101 may have various physiques which cannot be specified, a dummy is assumed as the occupant 101. A position anticipating a prescribed tissue thickness on an outer side of a joint bolt (which corresponds to a shoulder joint) that is implanted at a tip of a collar bone of the dummy is assumed to be a position of the shoulder 101b.

Regarding the outer shape of the fully deployed and expanded airbag 105, as shown in FIG. 14, the airbag 105 is formed with a size which protrudes more outward than the occupant 101 in the vehicle width direction from the first longitudinal direction vertical plane FA1 at least at the line B-B position and the line C-C position. A protrusion dimension PB in the vehicle width direction at the line B-B position is set greater than a protrusion dimension PC in the vehicle width direction at the line C-C position which is more forward in the vehicle longitudinal direction than the line B-B position.

Accordingly, when looking downward from above the vehicle, the outer shape of the fully deployed and expanded airbag 105 is formed so as to be wider in the vehicle width direction on a side of the front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction.

In the second embodiment, the outer shape of the airbag 105 is formed with a size which protrudes more outward than the occupant 101 in the vehicle width direction from the first longitudinal direction vertical plane FA1 at least at the line B-B position and the line C-C position. In addition, the protrusion dimension PB in the vehicle width direction at the line B-B position is set greater than the protrusion dimension PC in the vehicle width direction at the line C-C position. Due to such a configuration, even in the second embodiment, a similar working effect to the first embodiment can be secured.

Figure 15:
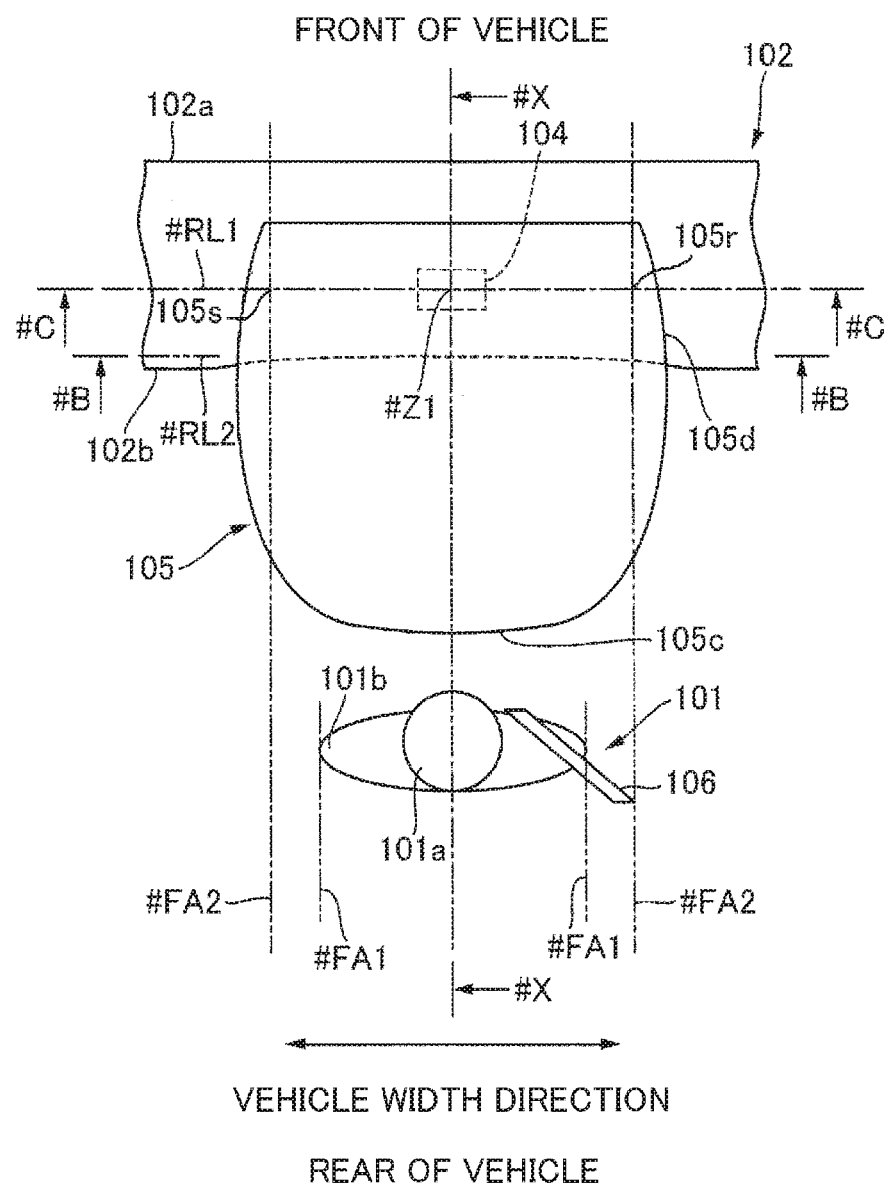
FIG. 15 is a plan view of an airbag representing a third embodiment of a vehicular airbag device according to the present invention.
Figure 16:
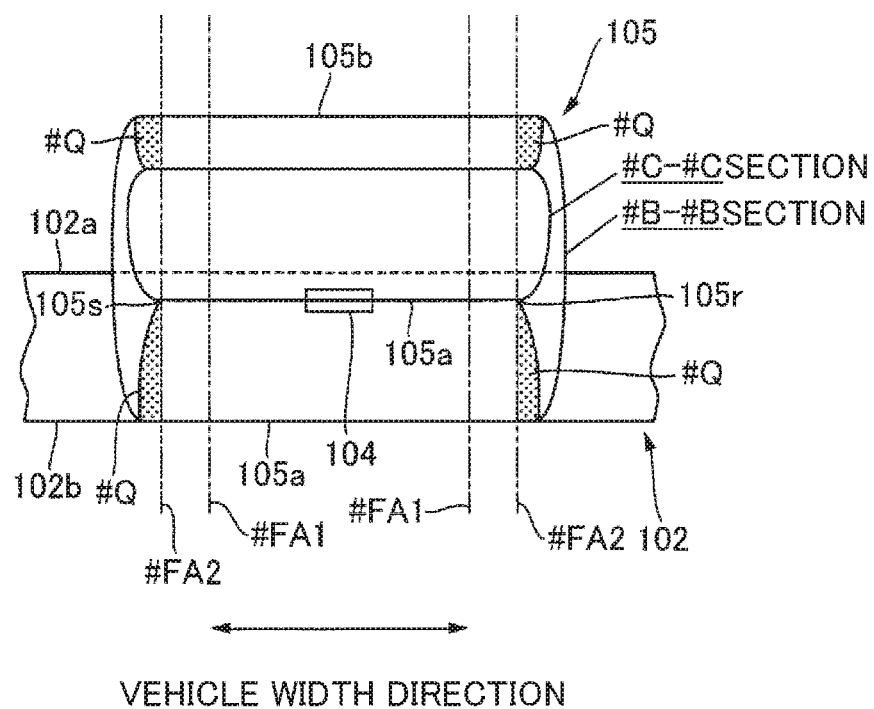
FIG. 16 is an explanatory diagram depicting sections of the airbag shown in FIG. 15 at the respective positions including the position of line B-B and the position of line C-C illustrated in FIGS. 4 and 5 in an overlapping manner when viewing forward from rearward in the vehicle longitudinal direction.

FIGS. 15 and 16 show the airbag 105 of a vehicular airbag device according to the third embodiment. Regarding an outer shape of the airbag 105, the fact that a width dimension of the outer shape in the vehicle width direction is greatest at the line B-B position, smaller at the line C-C position, and smallest at the line A-A position (WB>WC>WA) and that the outer shape is formed so as to be line-symmetrical with respect to the center line of the opening 104 in the vehicle left-right width direction (the X-X line) is similar to the airbags 105 according to the first and second embodiments.

FIG. 15 is a plan view of the airbag 105, and FIG. 16 is an explanatory diagram depicting sections of the airbag 105 at the respective positions including the line B-B position and the line C-C position illustrated earlier in FIGS. 4 and 5 in an overlapping manner when viewing forward from rearward in the vehicle longitudinal direction.

In the third embodiment, an outer shape of the airbag 105 when fully deployed and expanded is configured so as to include, between a first vehicle width direction vertical plane RL1 at the line C-C position which passes through a center position Z1 of the opening 104 in the vehicle longitudinal direction and a second vehicle width direction vertical plane RL2 at the line B-B position which passes through the position of the rear edge 102b of the instrument panel 102, a region Q which comes into contact with the instrument panel 102 more outward in the vehicle width direction than a second longitudinal direction vertical plane FA2 which is on an outer side of a first longitudinal direction vertical plane FA1. In the illustrated example, the region Q is also configured with respect to the front windshield 103.

The second longitudinal direction vertical plane FA2 is a vertical plane in the vehicle longitudinal direction which passes through an end edge in the vehicle width direction of the airbag 105 in contact with the instrument panel 102 at the line C-C position. The end edge of the airbag 105 in the vehicle width direction refers to a right end 105r or a left end 105s of an outer contour of the airbag 105 at the line C-C position. The first longitudinal direction vertical plane FA1 is as described earlier in the second embodiment.

Regarding the outer shape of the fully deployed and expanded airbag 105, as shown in FIG. 16, the airbag 105 includes the region Q which protrudes outward in the vehicle width direction from the second longitudinal direction vertical plane FA2 and which comes into contact with the instrument panel 102 at least between the line B-B position and the line C-C position. The airbag 105 protrudes farther in the vehicle width direction at the line B-B position than at the line C-C position.

Accordingly, when looking downward from above the vehicle, the outer shape of the fully deployed and expanded airbag 105 is formed so as to be wider in the vehicle width direction on a side of the front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction.

In the third embodiment, the outer shape of the airbag 105 includes the region Q which protrudes outward in the vehicle width direction from the second longitudinal direction vertical plane FA2 and which comes into contact with the instrument panel 102 at least between the line B-B position and the line C-C position. In addition, the airbag 105 protrudes farther in the vehicle width direction at the line B-B position than at the line C-C position. Accordingly, even in the third embodiment, a similar working effect to the first embodiment can be secured.

It is needless to say that the second and third embodiments described above can also be implemented using the airbag according to the modification shown in FIGS. 10 to 12.

Figure 17:
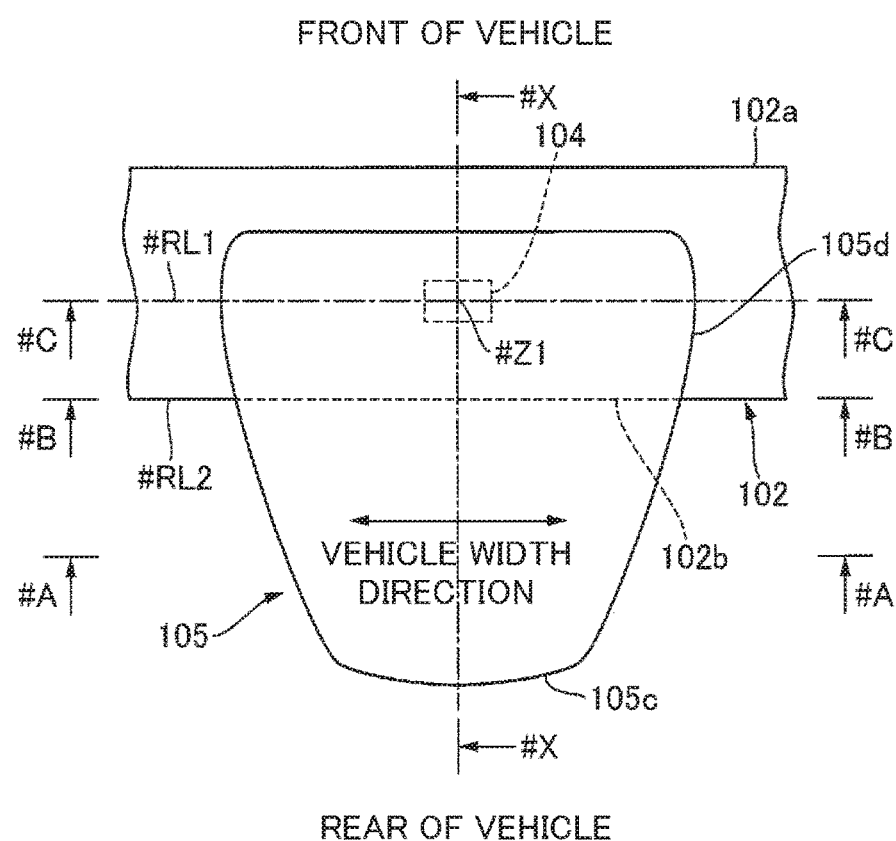
FIG. 17 is a plan view of an airbag representing a fourth embodiment of a vehicular airbag device according to the present invention.
Figure 18:
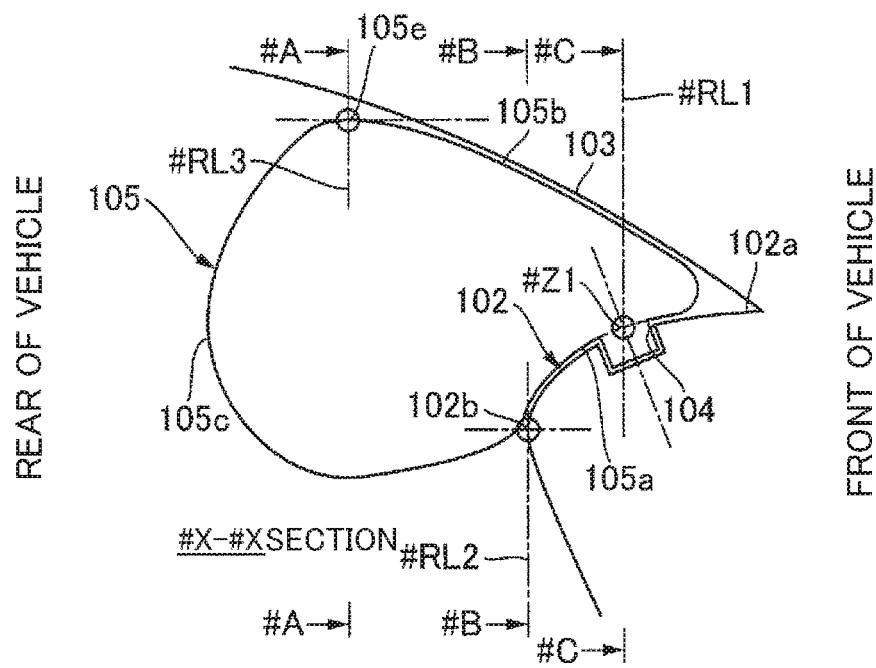
FIG. 18 is a sectional view taken along line X-X in FIG. 17.
Figure 19:
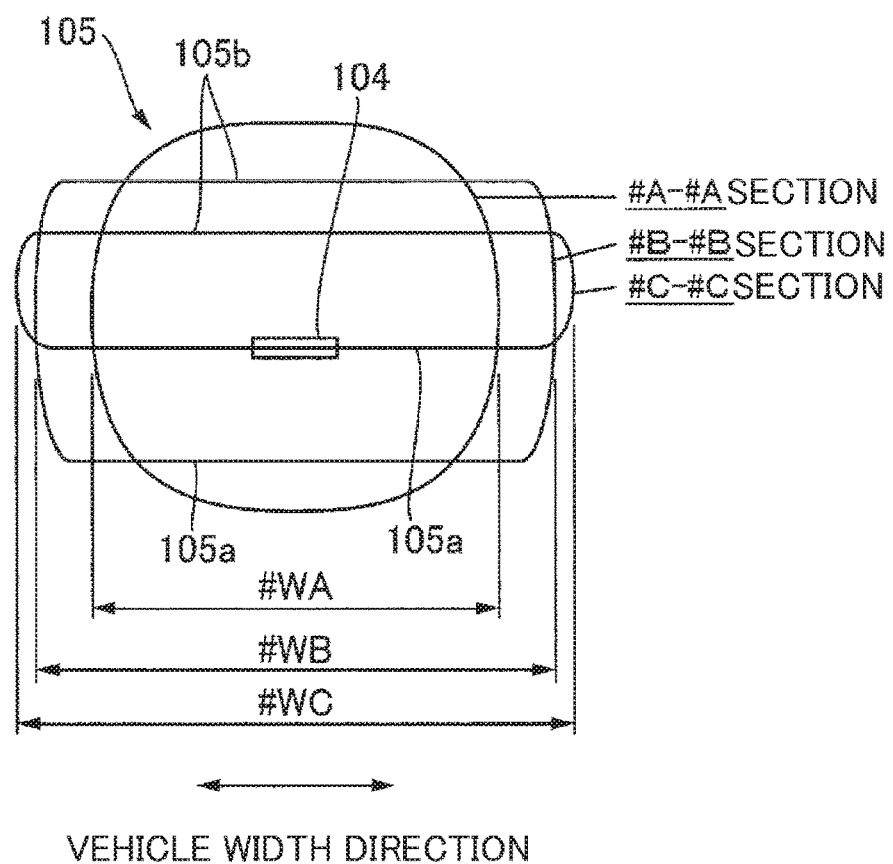
FIG. 19 is an explanatory diagram depicting sections of an airbag at respective positions illustrated in FIGS. 17 and 18 in an overlapping manner when viewing forward from rearward in the vehicle longitudinal direction.

FIGS. 17 to 19 show the airbag 105 of a vehicular airbag device according to the fourth embodiment. FIG. 17 is a plan view of the airbag 105, FIG. 18 is a sectional view taken along line X-X in FIG. 17, and FIG. 19 is an explanatory diagram depicting sections of the airbag 105 at the respective positions illustrated in FIGS. 17 and 18 in an overlapping manner when viewing forward from rearward in the vehicle longitudinal direction. The line X-X, the line A-A, the line B-B, and the line C-C in the drawings are similar to those in FIGS. 4 and 5 described above in the first to third embodiments.

Regarding an outer shape of the fully deployed and expanded airbag 105, as shown in FIG. 17 which is a plan view of the airbag 105, the airbag 105 is formed so as to be line-symmetrical with respect to the center line of the opening 104 in the vehicle left-right width direction (the X-X line). In addition, in the outer shape of the airbag 105, as shown in FIG. 19, the width dimension WC in the vehicle width direction at the line C-C position is set greater than the width dimension WB in the vehicle width direction at the line B-B position which is more rearward in the vehicle longitudinal direction than the line C-C position.

Furthermore, both the width dimension WC in the vehicle width direction at the line C-C position and the width dimension WB in the vehicle width direction at the line B-B position which is more rearward in the vehicle longitudinal direction than the line C-C position are set greater than the maximum width dimension WA in the vehicle width direction on the vertical section RL3 at the line A-A position which is more rearward in the vehicle longitudinal direction than the line B-B position.

Accordingly, when looking downward from above the vehicle, the outer shape of the fully deployed and expanded airbag 105 is formed so as to be wider in the vehicle width direction on a side of the front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction. In the illustrated example, a planar shape of the airbag 105 is formed in an approximately trapezoidal shape which is wider toward the front and narrower toward the rear in the vehicle longitudinal direction.

In the fourth embodiment, the width dimension in the vehicle width direction which defines the outer shape of the airbag 105 is set greater than the maximum width dimension WA in the vehicle width direction on the vertical section RL3 at the line A-A position and, at the same time, greater at the line C-C position than at the line B-B position (WC>WB). Due to this configuration, a range in which the airbag 105 is supported by the instrument panel 102 and the front windshield 103 to generate a supporting reaction force of the occupant 101 can be secured such that the range is wider than the occupant restraining surface 105c and a similar working effect to the first embodiment can be secured.

Figure 20:
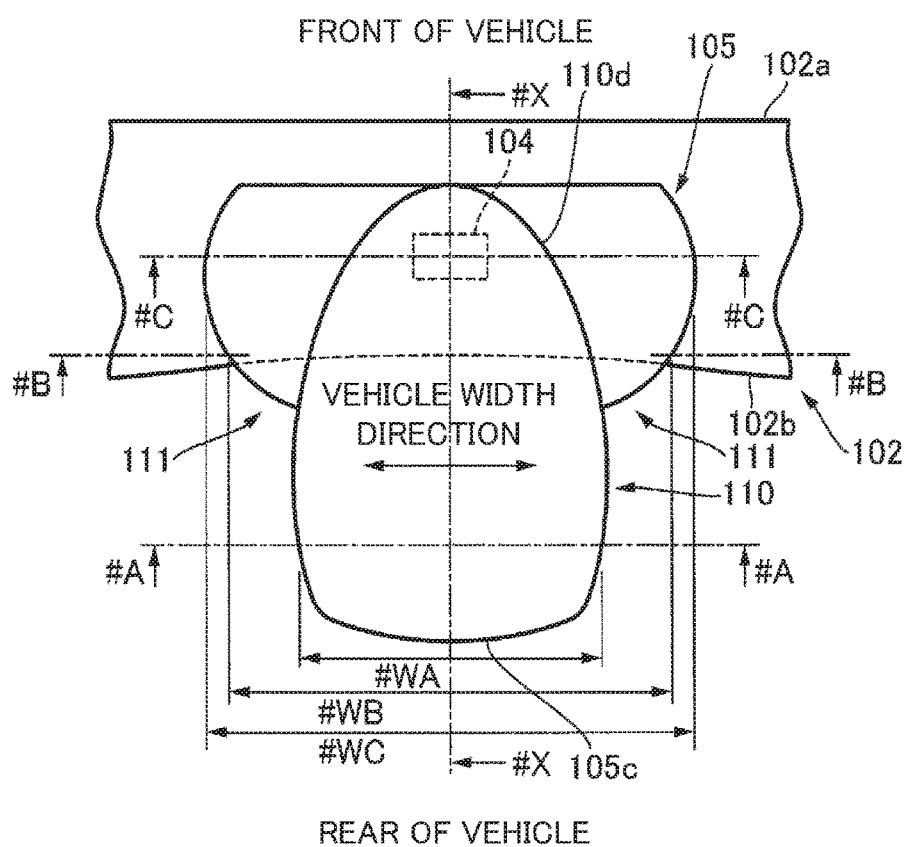
FIG. 20 is a plan view of an airbag in a periphery of a front seat of a vehicle which represents a modification of the fourth embodiment of a vehicular airbag device according to the present invention.
Figure 21:
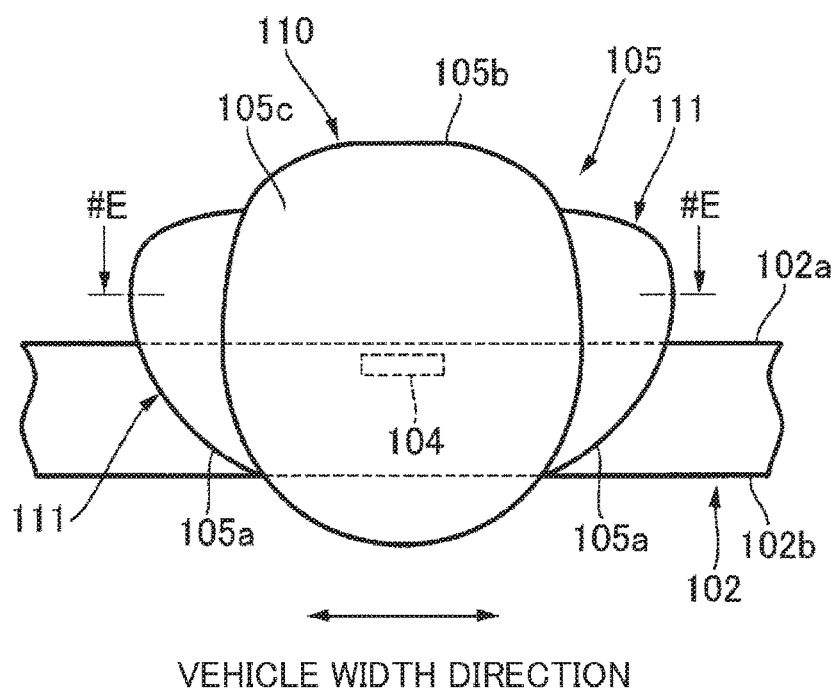
FIG. 21 is a schematic front view of the periphery of the front seat shown in FIG. 20 when viewing forward from rearward in a longitudinal direction of the vehicle.
Figure 22:
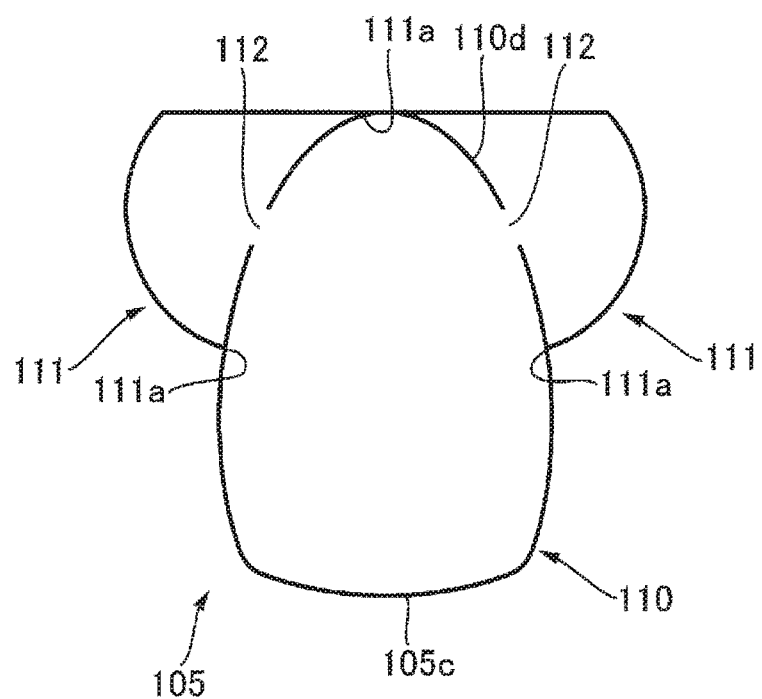
FIG. 22 is a sagittal sectional view taken along line E-E in FIG. 21.

FIGS. 20 to 22 show a modification of the vehicular airbag device according to the fourth embodiment. FIG. 20 is a plan view of an airbag in a periphery of a front seat of a vehicle, FIG. 21 is a schematic front view of the periphery of the front seat shown in FIG. 20 when viewing forward from rearward in a longitudinal direction of the vehicle, and FIG. 22 is a sagittal sectional view taken along line E-E in FIG. 21.

This modification is basically similar to the modification of the first embodiment described earlier. As shown in FIG. 22, the main airbag section 110 and each sub airbag section 111 are allowed to communicate with each other by a communication hole 112 formed in a portion of the main airbag section 110 which is covered by the sub airbag section 111.

The present modification differs from the modification shown in FIGS. 10 to 12 in that, in the present modification, as shown in FIG. 20, the outer shape of the airbag 105 is configured such that the width dimension WC in the vehicle width direction at the line C-C position is greater than the width dimension WB in the vehicle width direction at the line B-B position which is more rearward in the vehicle longitudinal direction than the line C-C position.

Furthermore, both the width dimension WC in the vehicle width direction at the line C-C position and the width dimension WB in the vehicle width direction at the line B-B position which is more rearward in the vehicle longitudinal direction than the line C-C position are set greater than the maximum width dimension WA in the vehicle width direction on the vertical section RL3 at the line A-A position which is more rearward in the vehicle longitudinal direction than the line B-B position.

Accordingly, even in the present modification, in a similar manner to the fourth embodiment described above, the outer shape of the fully deployed and expanded airbag 105 when looking downward from above the vehicle is formed so as to be wider in the vehicle width direction on a side of the opening 104 or, in other words, near the rear end 102b of the instrument panel 102 or near the opening 104 than the occupant restraining surface 105c which is to the rear in the vehicle longitudinal direction.

The sub airbag sections 111 of the airbag 105 configured as described above are deployed and expanded while abutting the instrument panel 102 and, accordingly, supported by the instrument panel 102. As a result, a periphery of the opening 104 of the main airbag section 111 is supported by the pair of left and right sub airbag sections 111.

Even in the present modification, a range in which a supporting reaction force of the occupant 101 is created which is wider than the occupant restraining surface 105c can be secured. In addition, when the occupant 101 moves diagonally forward in the vehicle longitudinal direction while rotating so that the body of the occupant 101 tilts diagonally or when a rotation of the body of the occupant 101 occurs due to being caught by the occupant restraining surface 105c, a rotating action in which the airbag 105 attempts to rotate together with the movement of the occupant 101 can be appropriately prevented by receiving a supporting reaction force from the instrument panel 102 and the like with the sub airbag sections 111. As a result, even in the present modification, a similar working effect to the first embodiment described earlier can be secured.

Figure 23:
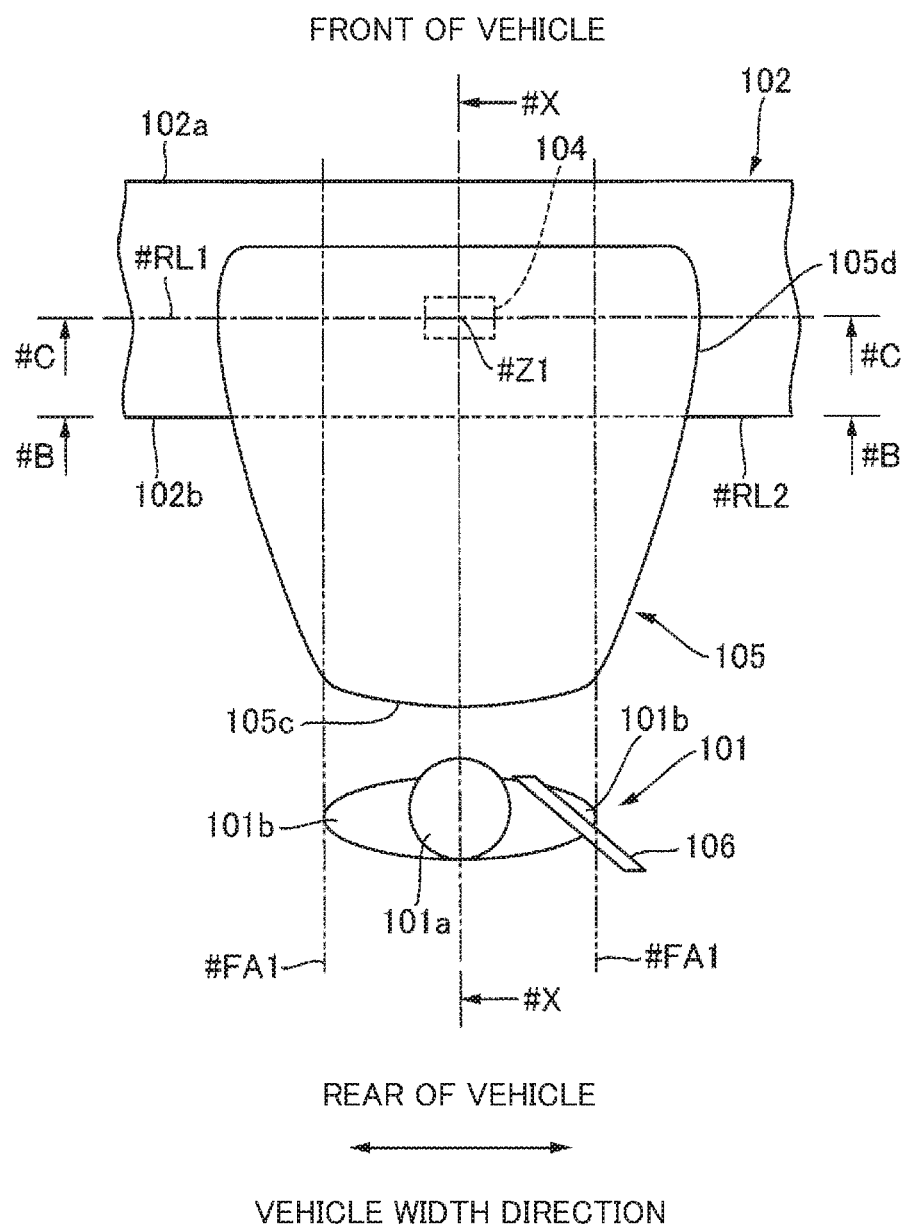
FIG. 23 is a plan view of an airbag representing a fifth embodiment of a vehicular airbag device according to the present invention.
Figure 24:
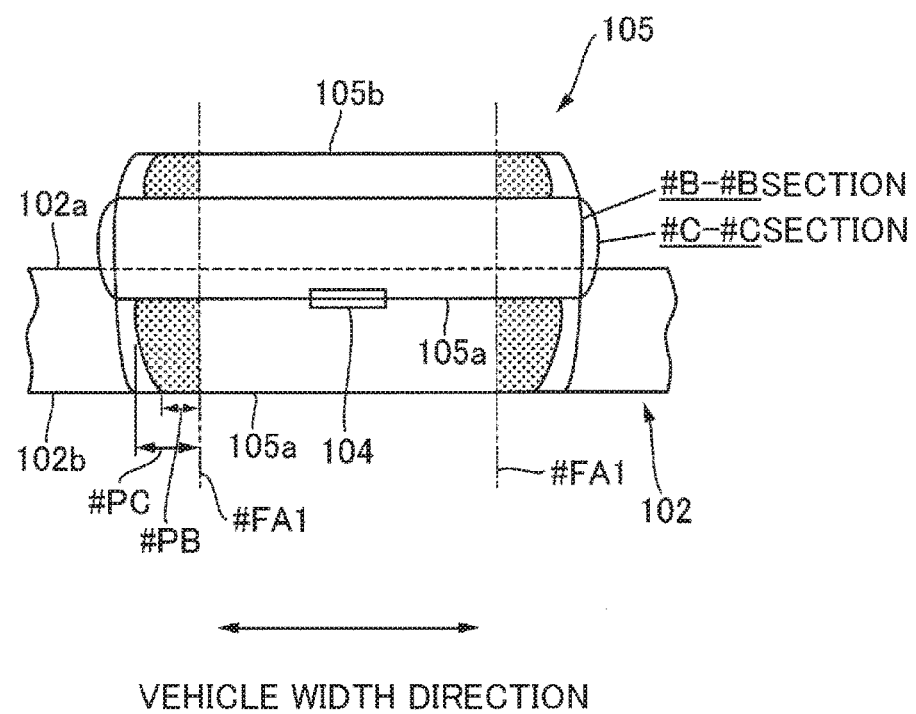
FIG. 24 is an explanatory diagram depicting sections of the airbag shown in FIG. 23 at the respective positions including a position of line B-B and a position of line C-C illustrated in FIGS. 17 and 18 in an overlapping manner when viewing forward from rearward in the vehicle longitudinal direction.

FIGS. 23 and 24 show the airbag 105 of a vehicular airbag device according to the fifth embodiment. Regarding an outer shape of the airbag 105, the fact that a width dimension of the outer shape in the vehicle width direction is greatest at the line C-C position, smaller at the line B-B position, and smallest at the line A-A position (WC>WB>WA) and that the outer shape is formed so as to be line-symmetrical with respect to the center line of the opening 104 in the vehicle left-right width direction (the X-X line) is similar to the airbag 105 of the vehicular airbag device according to the fourth embodiment.

FIG. 23 is a plan view of the airbag 105, and FIG. 24 is an explanatory diagram depicting sections of the airbag 105 at the respective positions including the line B-B position and the line C-C position illustrated earlier in FIGS. 17 and 18 in an overlapping manner when viewing forward from rearward in the vehicle longitudinal direction.

The fifth embodiment is similar to the second embodiment in that the first longitudinal direction vertical plane FA1 which passes in the vehicle longitudinal direction through the shoulder 101b of the occupant 101 sitting on a front seat is used as a reference. In a similar manner to FIG. 13, the plan view in FIG. 23 shows a pair of left and right first longitudinal direction vertical planes FA1 in correspondence with the right shoulder 101b and the left shoulder 101b of the occupant 101.

Regarding the outer shape of the fully deployed and expanded airbag 105, as shown in FIG. 24, the airbag 105 is formed with a size which protrudes more outward than the occupant 101 in the vehicle width direction from the first longitudinal direction vertical plane FA1 at least at the line B-B position and the line C-C position. A protrusion dimension PC in the vehicle width direction at the line C-C position is set greater than a protrusion dimension PB in the vehicle width direction at the line B-B position which is more rearward in the vehicle longitudinal direction than the line C-C position.

Accordingly, when looking downward from above the vehicle, the outer shape of the fully deployed and expanded airbag 105 is formed so as to be wider in the vehicle width direction on a side of the front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction.

In the fifth embodiment, the outer shape of the airbag 105 is formed with a size which protrudes more outward than the occupant 101 in the vehicle width direction from the first longitudinal direction vertical plane FA1 at least at the line B-B position and the line C-C position. In addition, the protrusion dimension PC in the vehicle width direction at the line C-C position is set greater than the protrusion dimension PB in the vehicle width direction at the line B-B position. Due to such a configuration, even in the fifth embodiment, a similar working effect to the first embodiment can be secured.

Figure 25:
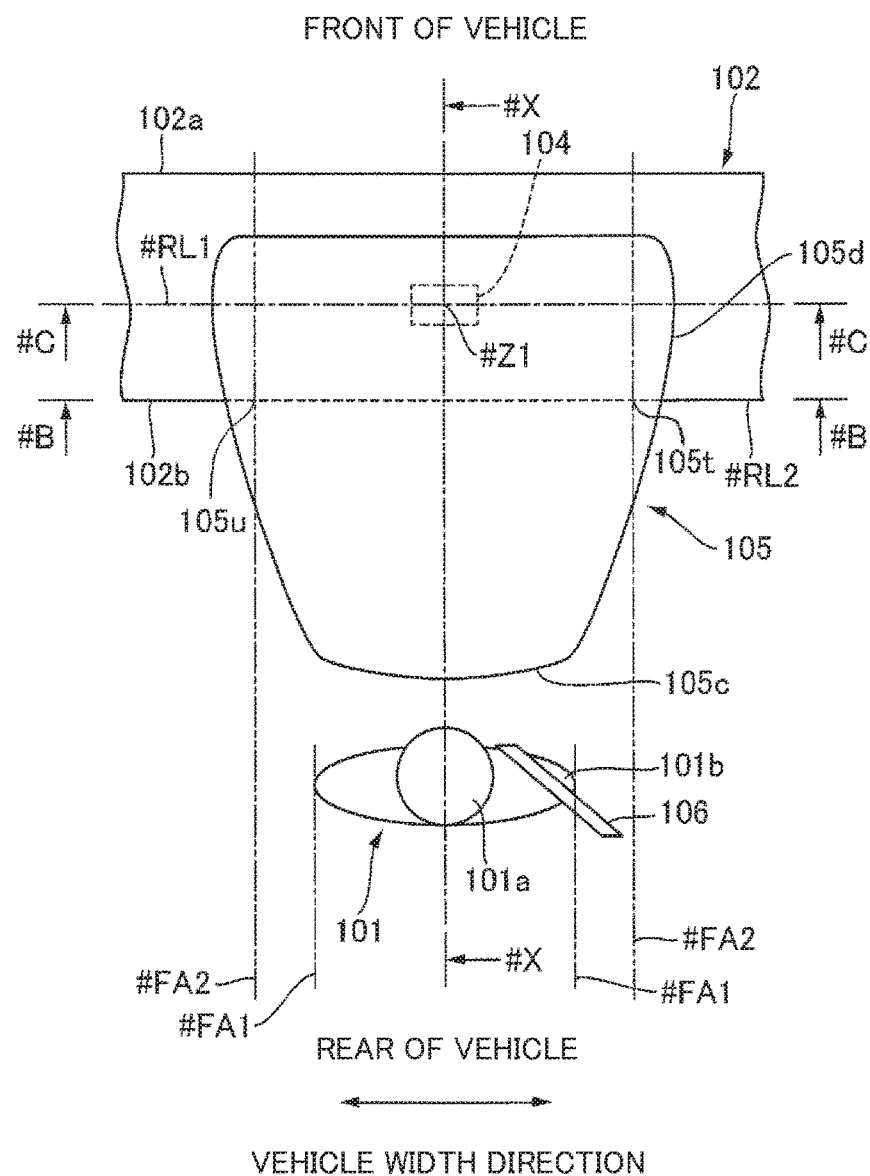
FIG. 25 is a plan view of an airbag representing a sixth embodiment of a vehicular airbag device according to the present invention.
Figure 26:
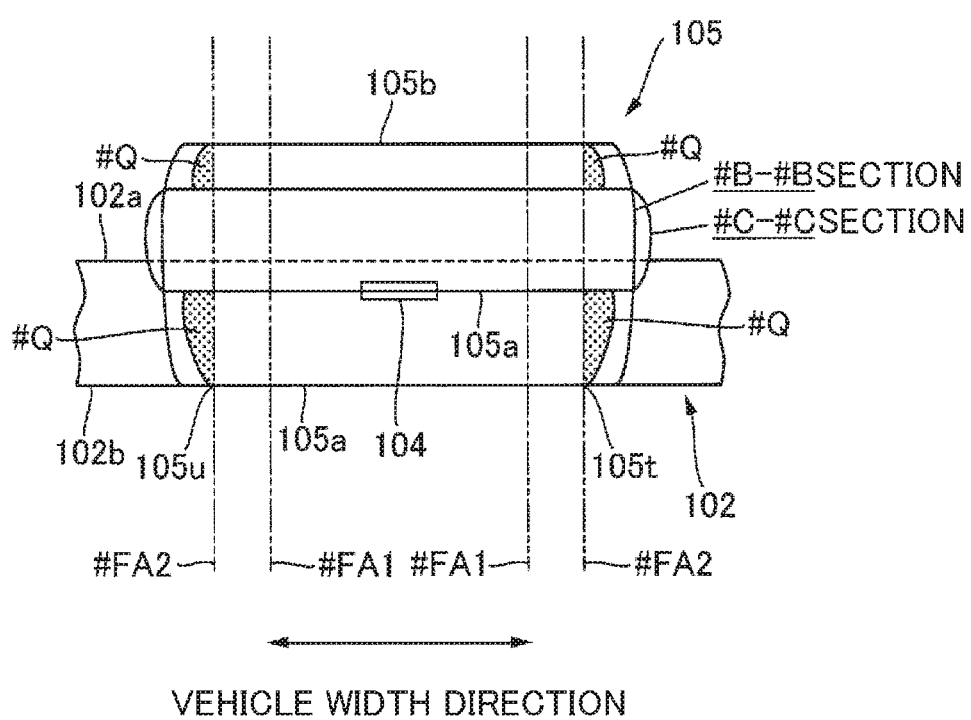
FIG. 26 is an explanatory diagram depicting sections of the airbag shown in FIG. 25 at the respective positions including the position of line B-B and the position of line C-C illustrated in FIGS. 17 and 18 in an overlapping manner when viewing forward from rearward in the vehicle longitudinal direction.

FIGS. 25 and 26 show the airbag 105 of a vehicular airbag device according to the sixth embodiment. Regarding an outer shape of the airbag 105, the fact that a width dimension of the outer shape in the vehicle width direction is greatest at the line C-C position, smaller at the line B-B position, and smallest at the line A-A position (WC>WB>WA) and that the outer shape is formed so as to be line-symmetrical with respect to the center line of the opening 104 in the vehicle left-right width direction (the X-X line) is similar to the airbag 105 of the vehicular airbag devices according to the fourth and fifth embodiments.

FIG. 25 is a plan view of the airbag 105, and FIG. 26 is an explanatory diagram depicting sections of the airbag 105 at the respective positions including the line B-B position and the line C-C position illustrated earlier in FIGS. 17 and 18 in an overlapping manner when viewing forward from rearward in the vehicle longitudinal direction.

The sixth embodiment is similar to the third embodiment in that an outer shape of the airbag 105 when fully deployed and expanded is configured so as to include, between a first vehicle width direction vertical plane RL1 at the line C-C position which passes through a center position Z1 of the opening 104 in the vehicle longitudinal direction and a second vehicle width direction vertical plane RL2 at the line B-B position which passes through the position of the rear edge 102b of the instrument panel 102, a region Q which comes into contact with the instrument panel 102 more outward in the vehicle width direction than a second longitudinal direction vertical plane FA2 which is on an outer side of a first longitudinal direction vertical plane FA1. In the illustrated example, the region Q is also configured with respect to the front windshield 103.

The second longitudinal direction vertical plane FA2 is a vertical plane in the vehicle longitudinal direction which passes through an end edge in the vehicle width direction of the airbag 105 in contact with the instrument panel 102 at the line B-B position. The end edge of the airbag 105 in the vehicle width direction refers to a right end 105t or a left end 105u of an outer contour of the airbag 105 at the line B-B position. The first longitudinal direction vertical plane FA1 is as described earlier in the second, third, and fifth embodiments.

Regarding the outer shape of the fully deployed and expanded airbag 105, as shown in FIG. 26, the airbag 105 includes the region Q which protrudes outward in the vehicle width direction from the second longitudinal direction vertical plane FA2 and which comes into contact with the instrument panel 102 at least between the line B-B position and the line C-C position. The airbag 105 protrudes farther in the vehicle width direction at the line C-C position than at the line B-B position.

Accordingly, when looking downward from above the vehicle, the outer shape of the fully deployed and expanded airbag 105 is formed so as to be wider in the vehicle width direction on a side of the front end 105d in a vehicle longitudinal direction on a side of the opening 104 or, in other words, near the rear end 102b of the instrument panel 102 or near the opening 104 than the occupant restraining surface 105c which is to the rear in the vehicle longitudinal direction.

In the sixth embodiment, the outer shape of the airbag 105 includes the region Q which protrudes outward in the vehicle width direction from the second longitudinal direction vertical plane FA2 and which comes into contact with the instrument panel 102 at least between the line B-B position and the line C-C position. In addition, the airbag 105 protrudes farther in the vehicle width direction at the line C-C position than at the line B-B position. Due to such a configuration, even in the sixth embodiment, a similar working effect to the first embodiment can be secured.

It is needless to say that the fifth and sixth embodiments described above can also be implemented using the airbag according to the modification shown in FIGS. 20 to 22.

Figure 27:
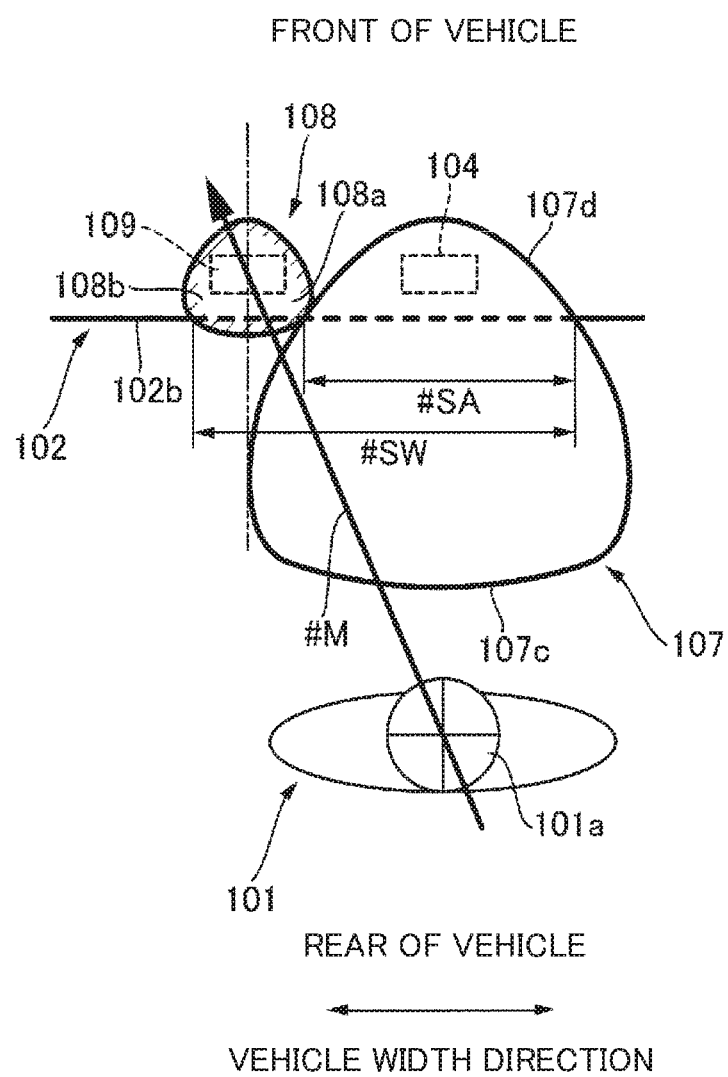
FIG. 27 is a plan view of an airbag prior to restraining an occupant which represents a seventh embodiment of a vehicular airbag device according to the present invention.
Figure 28:
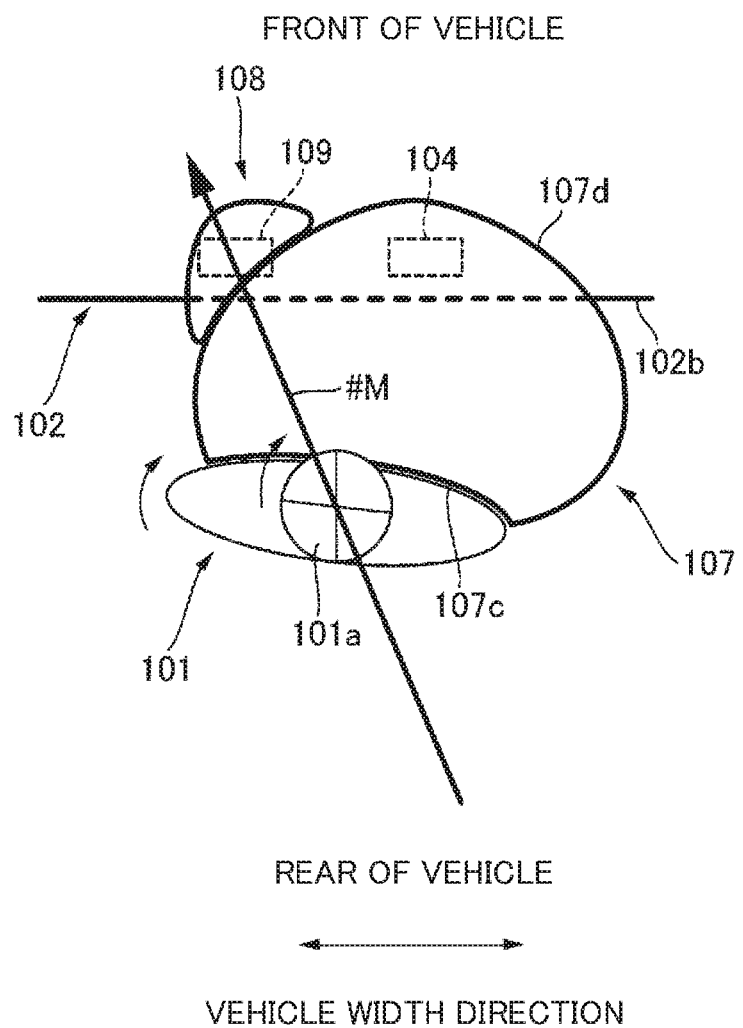
FIG. 28 is a plan view of an airbag of the vehicular airbag device shown in FIG. 27 when restraining an occupant.

FIGS. 27 and 28 show a vehicular airbag device according to the seventh embodiment. FIG. 27 is a plan view showing a state prior to restraining the occupant 101 and FIG. 28 is a plan view showing a state of restraining the occupant. The seventh embodiment is configured by providing a conventional airbag 107 with an additional airbag 108.

An opening 104 is formed on an instrument panel 102 and arranged so as to oppose a front seat occupant 101. The opening 104 is sealed by an openable airbag door. The airbag 107 is housed inside the instrument panel 102. As is conventionally known, an outer shape of the airbag 107 when fully deployed and expanded as viewed downward from above the vehicle is formed in a triangular shape or a fan-like shape in which an occupant restraining surface 107c that catches and restrains the occupant 101 is wide in a vehicle width direction and a front end 107d in the vehicle longitudinal direction on the side of the opening 104 tapers off and is narrow in the vehicle width direction.

When a collision impact is generated, the airbag 107 is inflated by inflator gas that is generated by an inflator. When inflated, the airbag 107 opens the airbag door and deploys and expands rearward in a vehicle longitudinal direction from the opening 104 toward the occupant 101 sitting on the front seat of the vehicle. Of the airbag 107 having burst out from the opening 104, a downward-facing surface deploys and expands toward the occupant 101 along the instrument panel 102 while an upward-facing surface deploys and expands toward the occupant 101 along the front windshield 103. A rearward surface of the airbag 107 in the vehicle longitudinal direction is to constitute an occupant restraining surface 107c.

When catching and restraining the occupant 101 with the occupant restraining surface 107c, the downward-facing surface of the airbag 107 abuts the instrument panel 102 and is supported by the instrument panel 102. At the same time, the upward-facing surface of the airbag 107 abuts the front windshield 103 and is supported by the front windshield 103.

The airbag 107 is configured such that, by being supported by the instrument panel 102 and the front windshield 103, the airbag 107 receives supporting reaction forces therefrom and catches and restrains the body of the occupant 101.

An additional opening 109 is formed arranged adjacent to the opening 104 at a side of the opening 104 in the vehicle width direction on the instrument panel 102. The additional opening 109 is sealed by an openable additional airbag door (not shown). An additional airbag 108 with a small capacity is housed inside the instrument panel 102 in correspondence to a position of the additional opening 109.

When a collision impact is generated, the additional airbag 108 is inflated by inflator gas that is generated by an additional inflator. When inflated, the additional airbag 108 opens the additional airbag door and deploys and expands rearward in a vehicle longitudinal direction from the additional opening 109. The additional airbag 108 is deployed and expanded in a periphery of the opening 104 of the airbag 107.

Specifically, the additional airbag 108 is deployed and expanded in an arrangement where the additional airbag 108 is sandwiched diagonally in the vehicle longitudinal direction between the airbag 107 and the instrument panel 102 at a side of a front end 107d of the airbag 107, which tapers off and is narrow, in the vehicle longitudinal direction on the side of the opening 104.

After being fully deployed and expanded and before restraining the occupant 101, the airbag 107 and the additional airbag 108 are positioned in peripheries of the opening 104 and the additional opening 109 on the instrument panel 102 and the rear edge 102b thereof so that the additional airbag 108 is nestled against the airbag 107. When considered in combination with an outer shape of the airbag 107, an outer shape of the additional airbag 108 when fully deployed and expanded is configured such that a width dimension SW in the vehicle width direction at a position of the rear edge 102b of the instrument panel 102 in the vehicle longitudinal direction is greater than a width dimension SA in the vehicle width direction in a case where only the airbag 107 is provided.

Furthermore, from a different perspective, before the fully deployed and expanded airbag 107 and additional airbag 108 restrain the occupant 101, the outer shape of the additional airbag 108 is configured so as to satisfy the two points described below. When viewing straight in front of the vehicle from the front seat, the additional airbag 108 is positioned such that, at the position of the rear edge 102b of the instrument panel 102, a part 108a of the additional airbag 108 is overlapped between the instrument panel 102 and the airbag 107 and is hidden by the airbag 107. At the same time, the remaining part 108b of the additional airbag 108 is projected so as to protrude toward a side of the airbag 107 or, in other words, outward in the vehicle width direction from the airbag 107.

The additional airbag 108 configured as described above increases a width dimension in the vehicle width direction at least at the position of the rear edge 102b of the instrument panel 102 and a periphery thereof as compared to a case where only the airbag 107 is provided and, consequently, assists in receiving supporting reaction force from the instrument panel 102 over a wide range and functions as a supporting part which supports, in a diagonal orientation in the vehicle longitudinal direction, the airbag 107 which directly catches the occupant 101.

When subjected to a force from the airbag 107, the additional airbag 108 receives a supporting reaction force from the instrument panel 102 while being supported by the instrument panel 102 and supports a periphery of the opening 104 of the airbag 107 in a diagonally rearward orientation in the vehicle longitudinal direction. In other words, the additional airbag 108 is configured to prevent the airbag 107 from moving diagonally forward in the vehicle longitudinal direction.

The vehicular airbag device according to the seventh embodiment is also formed such that, when looking downward from above the vehicle, due to the combination of the airbag 107 and the additional airbag 108, the fully deployed and expanded airbag 107 and additional airbag 108 enable a shape to be obtained which is wider in the vehicle width direction on a side of the front end 105d in a vehicle longitudinal direction on the side of the opening 104 or, in other words, near the rear end 102b of the instrument panel 102 or near the opening 104 than the occupant restraining surface 105c which is to the rear in the vehicle longitudinal direction.

Workings of the vehicular airbag device according to the seventh embodiment will be described. When a collision impact is generated, an inflator and an additional inflator are actuated and generate inflator gas, and both the airbag 107 and the additional airbag 108 are deployed and expanded rearward in the vehicle longitudinal direction.

During a diagonal collision, a force causing a diagonally forward movement in the vehicle longitudinal direction (a direction M) acts on the occupant 101. The conventional airbag 107 having caught the occupant 101 with the occupant restraining surface 107c attempts to rotate around the front end 107d in the vehicle longitudinal direction on the side of the opening 104.

At this point, the additional airbag 108 is deployed and expanded in an arrangement where the additional airbag 108 is sandwiched diagonally in the vehicle longitudinal direction between the airbag 107 and the instrument panel 102 at a periphery of the opening 104 of the airbag 107 or, in other words, at a side of the front end 107d of the airbag 107 in the vehicle longitudinal direction on the side of the opening 104.

The airbag 107 attempting to rotate presses the additional airbag 108, and the pressed additional airbag 108 receives a supporting reaction force from the instrument panel 102 and supports a periphery of the opening 104 of the airbag 107 while pressing back diagonally rearward in the vehicle longitudinal direction so as to restrict the rotation of the airbag 107.

Therefore, when the occupant 101 moves diagonally forward in the vehicle longitudinal direction while rotating so that the body of the occupant 101 tilts diagonally or when a rotation of the body of the occupant 101 occurs due to being caught by the occupant restraining surface 107c, the additional airbag 108 enables a rotating action in which the airbag 107 attempts to rotate together with the movement of the occupant 101 to be appropriately prevented by receiving a supporting reaction force from the instrument panel 102.

Accordingly, the body of the occupant 101 can be restrained from moving diagonally forward and, at the same time, the body of the occupant 101 can be prevented from rotating while tilting diagonally. As a result, the occupant 101 can be appropriately restrained and an occupant injury value can be reduced.

Furthermore, since the body of the occupant 101 can be prevented from rotating, rotation of the head 101a of the occupant 101 around the neck can also be suppressed and injury values of the head 101a and the neck of the occupant 101 can also be reduced.

By configuring the outer shapes of the airbag 107 and the additional airbag 108 when the airbag 107 and the additional airbag 108 are fully deployed and expanded such that a width dimension SW in the vehicle width direction at the position of the rear edge 102b of the instrument panel 102 is greater than in a case where only the airbag 107 is provided, a rotating action of the airbag 107 can be restricted more reliably.

By configuring the outer shape of the additional airbag 108 when the airbag 107 and the additional airbag 108 are fully deployed and expanded in a size such that a part 108a is positioned overlapped between the instrument panel 102 and the airbag 107 at the position of the rear edge 102b of the instrument panel 102 and the remaining part 108b protrudes outward in the vehicle width direction from the airbag 107, the additional airbag 108 can support the airbag 107 from diagonally forward in the vehicle longitudinal direction and receive the movement-causing force M described earlier and, at the same time, a rotating action of the airbag 107 can be restricted more reliably.

It is needless to say that the vehicular airbag device according to the seventh embodiment is also capable of demonstrating occupant protection performance comparable to that of conventional devices with respect to head-on collisions in addition to diagonal collisions in a similar manner to the first embodiment.

Figure 29:
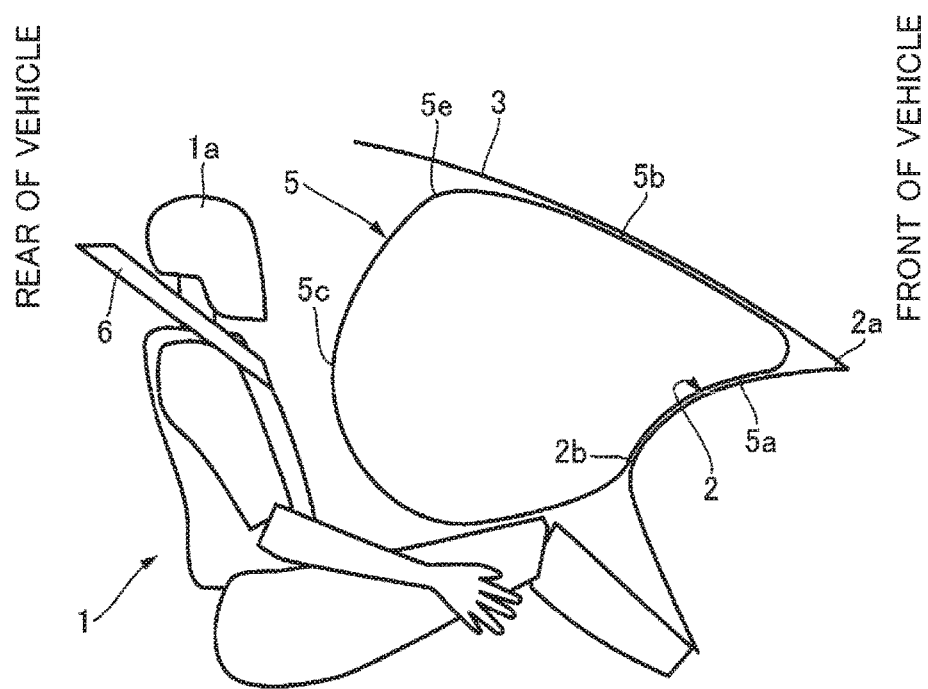
FIG. 29 is a schematic side view of a periphery of a front seat of a vehicle to which a vehicular airbag device according to the present invention is mounted in relation to eighth to nineteenth embodiments.
Figure 30:
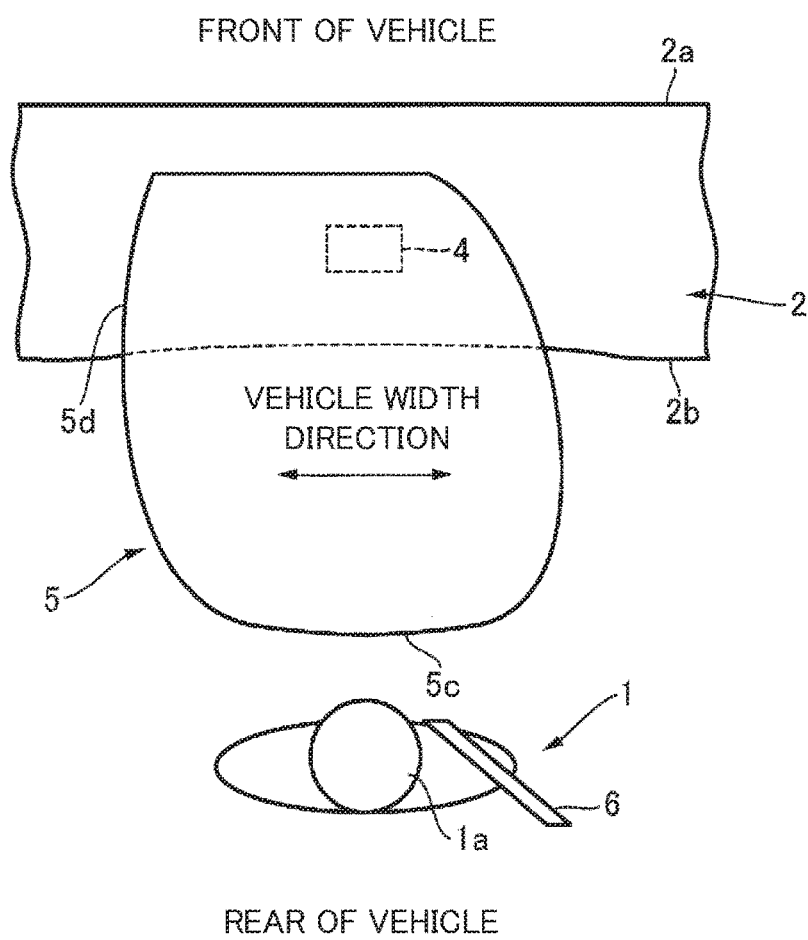
FIG. 30 is a schematic plan view of the periphery of the front seat of the vehicle shown in FIG. 29.
Figure 31:
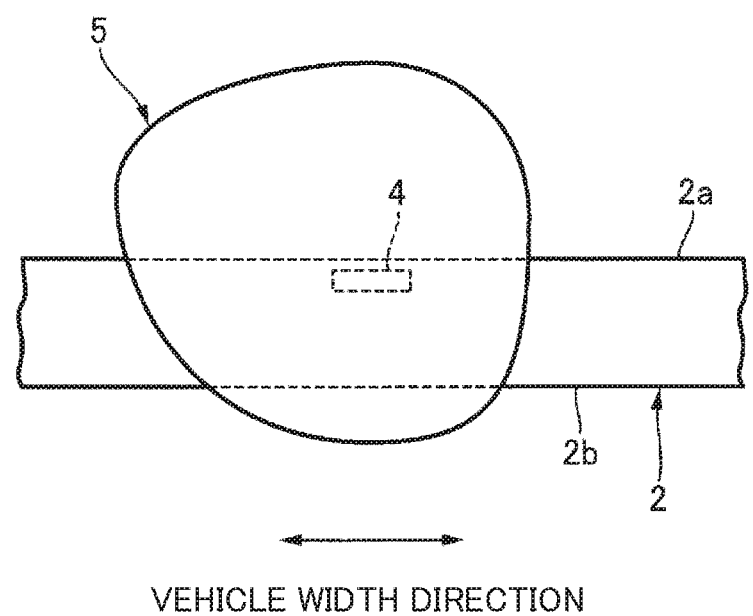
FIG. 31 is a schematic front view of the periphery of the front seat of the vehicle shown in FIG. 29 when viewing forward from rearward in a longitudinal direction of the vehicle.

FIG. 29 is a schematic side view of a periphery of a front seat of a vehicle to which a vehicular airbag device according to the present invention is mounted in relation to eighth to nineteenth embodiments that concern an asymmetric airbag, FIG. 30 is a schematic plan view of the periphery of the front seat of the vehicle shown in FIG. 29, and FIG. 31 is a schematic front view of the periphery of the front seat shown in FIG. 29 when viewing forward from rearward in a longitudinal direction of the vehicle.

An instrument panel 2 is installed in front in a vehicle longitudinal direction of an occupant 1 (represented by a dummy in the drawing) sitting on a front seat of a vehicle so as to face the occupant 1. A front end 2a of the instrument panel 2 in the vehicle longitudinal direction is positioned farthest from the occupant 1 while the rear end 2b in the vehicle longitudinal direction is positioned nearest to the occupant 1.

As shown in FIG. 29, generally, a side section of the instrument panel 2 is formed by a curved surface that gently declines from the front end 2a toward the rear end 2b. The instrument panel 2 is formed in a vehicle width direction so as to spread leftward and rightward in a band shape. A front windshield 3 is installed between A pillars of the vehicle so as to gradually rise from a periphery of the front end 2a of the instrument panel 2 toward the rear in the vehicle longitudinal direction.

An opening 4 is formed on the instrument panel 2 and arranged so as to oppose a front seat or, in other words, arranged so as to oppose the front seat occupant 1 sitting on the front seat. The opening 4 is sealed by an openable airbag door (not shown). An airbag 5 is housed inside the instrument panel 2.

When a collision impact is generated, the airbag 5 is inflated by inflator gas that is generated by an inflator. When inflated, the airbag 5 opens the airbag door and deploys and expands rearward in a vehicle longitudinal direction from the opening 4 toward the occupant 1 sitting on the front seat of the vehicle.

Of the airbag 5 having burst out from the opening 4, a downward-facing surface 5a deploys and expands toward the occupant 1 along the instrument panel 2 while an upward-facing surface 5b deploys and expands toward the occupant 1 along the front windshield 3. A rearward surface of the airbag 5 in the vehicle longitudinal direction is to constitute an occupant restraining surface 5c.

When catching and restraining the occupant 1 with the occupant restraining surface 5c, the downward-facing surface 5a of the airbag 5 abuts the instrument panel 2. Accordingly, the airbag 5 is supported by the instrument panel 2. At the same time, the upward-facing surface 5b of the airbag 5 abuts the front windshield 3 and, accordingly, the airbag 5 is supported by the front windshield 3.

The airbag 5 is configured such that, by being supported by the instrument panel 2 and the front windshield 3, the airbag 5 receives supporting reaction forces therefrom and catches and restrains the body of the occupant 1. In the drawing, reference numeral 6 denotes a seatbelt.

Figure 32:
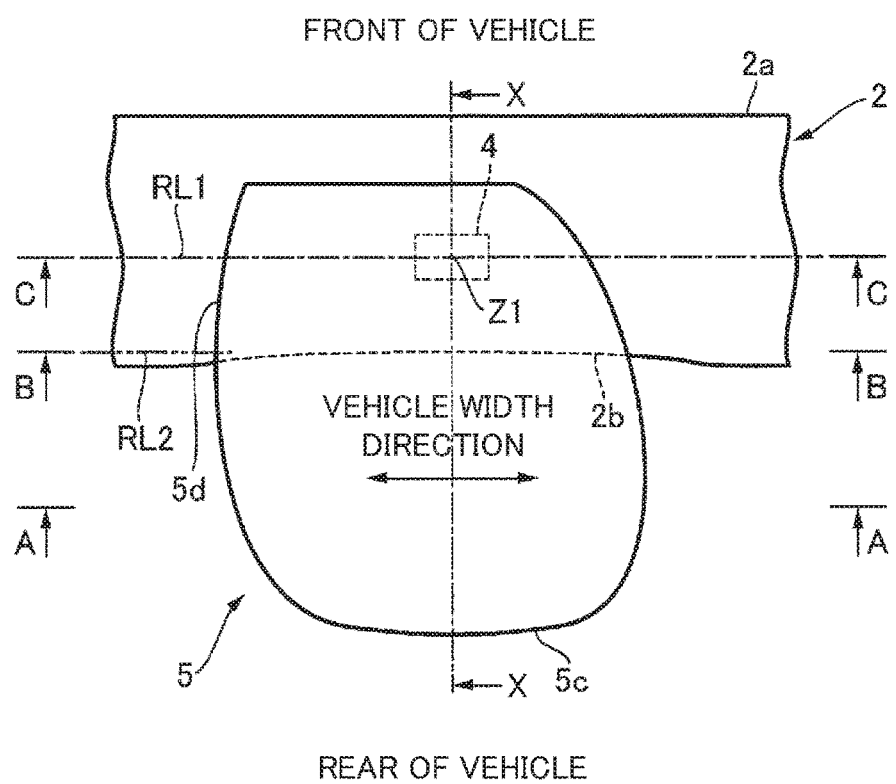
FIG. 32 is a plan view of an airbag representing an eighth embodiment of a vehicular airbag device according to the present invention.

As shown in FIG. 32 and subsequent drawings, the vehicular airbag device according to the present invention is basically formed such that, when looking downward from above the vehicle, with a center line of the opening 4 in a vehicle left-right width direction (in the drawing, a line X-X) as a reference, an outer shape of the fully deployed and expanded airbag 5 (in a case where an additional airbag 8 to be described later is provided, an entire combination of an airbag 7 and the additional airbag 8) on a vehicle interior side of the center line (the line X-X) is wider in the vehicle width direction on a side of a front end 5d in a vehicle longitudinal direction on a side of the opening 4 or, in other words, near the rear end 2b of the instrument panel 2 or near the opening 4 than the occupant restraining surface 5c which is to the rear in the vehicle longitudinal direction.

A vehicle interior side refers to a left side from the perspective of the occupant 1 sitting on a right side of the front seat and to a right side from the perspective of the occupant 1 sitting on a left side of the front seat. Hereinafter, a description will be given with respect to a case where the occupant 1 is sitting on the right side of the front seat. Therefore, "wider" in the description above implies a comparison of a dimension in the vehicle width direction of a portion of the airbag on a left side of the center line (the line X-X). An outer shape of the airbag 5 on a vehicle exterior side of the center line (the line X-X) may be any shape as long as ordinary occupant restraining performance can be produced.

Figure 33:
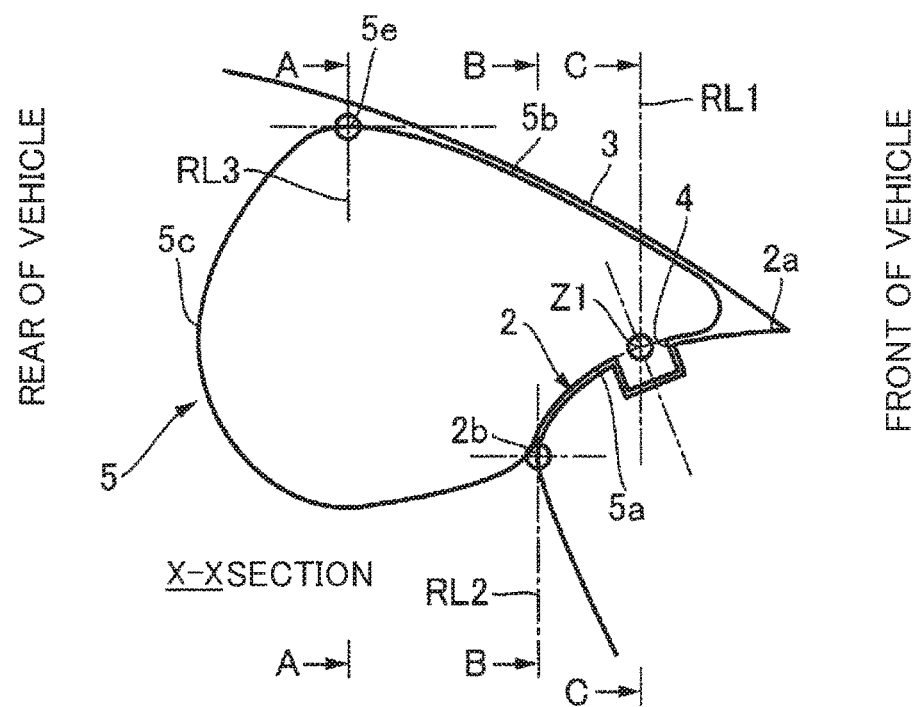
FIG. 33 is a sectional view taken along line X-X in FIG. 32.
Figure 34:
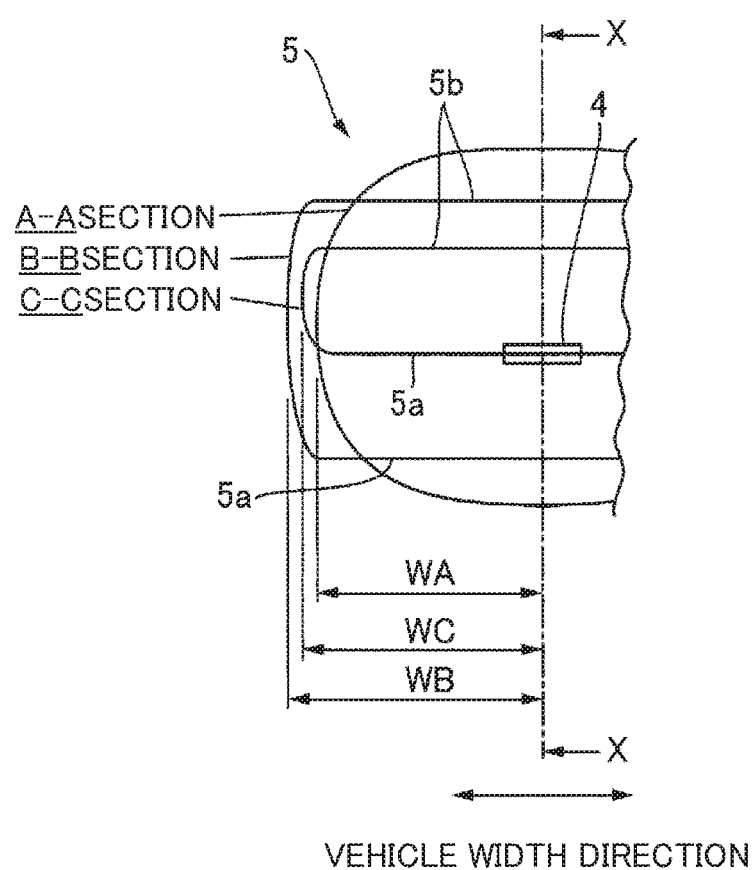
FIG. 34 is an explanatory diagram depicting sections of an airbag at respective positions including a position of line A-A, a position of line B-B, and a position of line C-C illustrated in FIGS. 32 and 33 in an overlapping manner when viewing forward from rearward in the vehicle longitudinal direction.

FIGS. 32 to 34 show the airbag 5 of a vehicular airbag device according to the eighth embodiment. FIG. 32 is a plan view of the airbag 5, FIG. 33 is a sectional view taken along the line X-X in FIG. 32, and FIG. 34 is an explanatory diagram depicting sections of the airbag 5 at respective positions including a line A-A position, a line B-B position, and a line C-C position illustrated in FIGS. 32 and 33 in an overlapping manner when viewing forward from rearward in the vehicle longitudinal direction (the vehicle exterior side (a right side) of the center line (the line X-X) has been omitted).

As described earlier, the line X-X is a center line oriented in the vehicle longitudinal direction of the opening 4 in the vehicle left-right width direction. A line C-C is a center line oriented in the vehicle left-right width direction of the opening 4 in the vehicle longitudinal direction and indicates a position of a center Z1 of the opening 4 in the vehicle longitudinal direction (hereinafter, referred to as a line C-C position). In addition, a section taken along the line C-C is a first vehicle width direction vertical plane RL1 which passes through the position of the center Z1 of the opening 4 in the vehicle longitudinal direction (which includes the position of the center Z1 of the opening 4 in the vehicle longitudinal direction).

A line B-B is oriented in the vehicle left-right width direction and indicates a position of a rear edge 2b of the instrument panel 2 in the vehicle longitudinal direction (hereinafter, referred to as a line B-B position). In addition, a section taken along the line B-B is a second vehicle width direction vertical plane RL2 which passes through the position of the rear edge 2b of the instrument panel 2 in the vehicle longitudinal direction (which includes the position of the rear edge 2b of the instrument panel 2 in the vehicle longitudinal direction). In the illustrated example, a position most forward in the vehicle when looking down on the instrument panel 2 from above the vehicle is set as the position of the rear edge 2b of the instrument panel 2 in the vehicle longitudinal direction.

A line A-A is oriented in the vehicle left-right width direction and indicates a position of an apex 5e of the fully deployed and expanded airbag 5 (hereinafter, referred to as a line A-A position). In addition, a section taken along the line A-A is a vertical section RL3 which includes the position of the apex 5e of the airbag 5. The line C-C position is more forward in the vehicle longitudinal direction than the line B-B position. The line A-A position is more rearward in the vehicle longitudinal direction than the line B-B position and the line C-C position.

Regarding an outer shape of the fully deployed and expanded airbag 5, as shown in FIGS. 32 to 34, with the center line (the line X-X) as a reference, the outer shape of the airbag 5 on the vehicle interior side of the center line is configured such that a dimension WB in the vehicle width direction from the center line (the line X-X) to an outer contour of the airbag 5 at the line B-B position is greater than a dimension WC in the vehicle width direction from the center line (the line X-X) to the outer contour of the airbag 5 at the line C-C position which is more forward in the vehicle longitudinal direction than the line B-B position.

Furthermore, both the dimension WB in the vehicle width direction at the line B-B position and the dimension WC in the vehicle width direction at the line C-C position which is more forward in the vehicle longitudinal direction than the line B-B position are set greater than a maximum dimension WA in the vehicle width direction from the center line (the line X-X) on the vehicle interior side of the center line (the line X-X) on the vertical section RL3 at the line A-A position which is more rearward in the vehicle longitudinal direction than the line B-B position.

These dimensions in the vehicle width direction are, in other words, dimensions from the center line (the line X-X) to the outer contour of a left-side portion of the airbag 5 at the line A-A position, the line B-B position, and the line C-C position, and a similar description applies hereafter.

Figure 69:
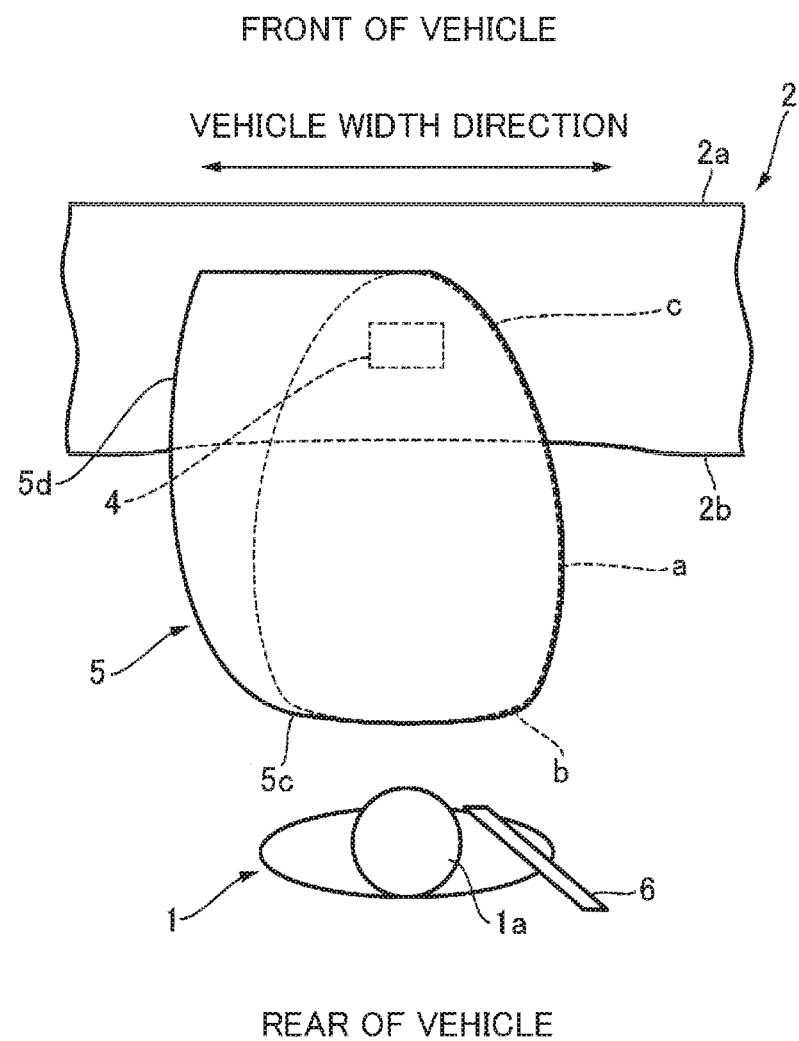
FIG. 69 is an explanatory diagram illustrating, by comparison, an asymmetric airbag in accordance with conventional art and an airbag according to the eighth embodiment.

Accordingly, as demonstrated by a comparison with an asymmetric airbag (a dotted line a) in accordance with background art concepts shown in FIG. 69, when looking downward from above the vehicle, the outer shape of the vehicle interior side (left side) of the fully deployed and expanded airbag 5 is formed so as to be wider with respect to the vehicle interior side in the vehicle width direction on a side of the front end 5d in a vehicle longitudinal direction on a side of the opening 4 or, in other words, near the rear end 2b of the instrument panel 2 or near the opening 4 than the occupant restraining surface 5c which is to the rear in the vehicle longitudinal direction.

Figure 35:
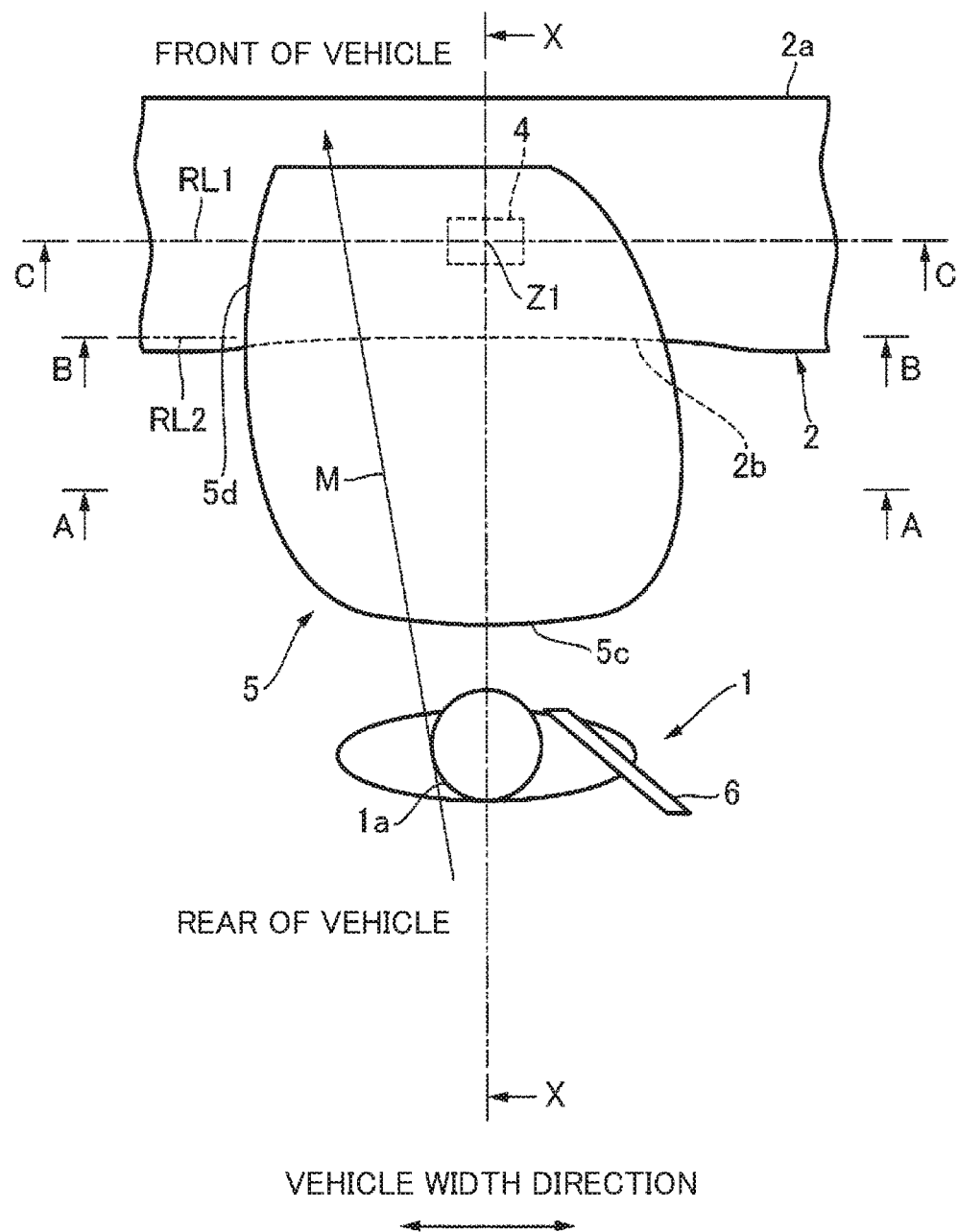
FIG. 35 is a plan view showing a relationship between a direction in which an occupant moves during a diagonal collision and an outer shape of a fully deployed and expanded airbag in relation to a vehicular airbag device according to the present invention.
Figure 36:
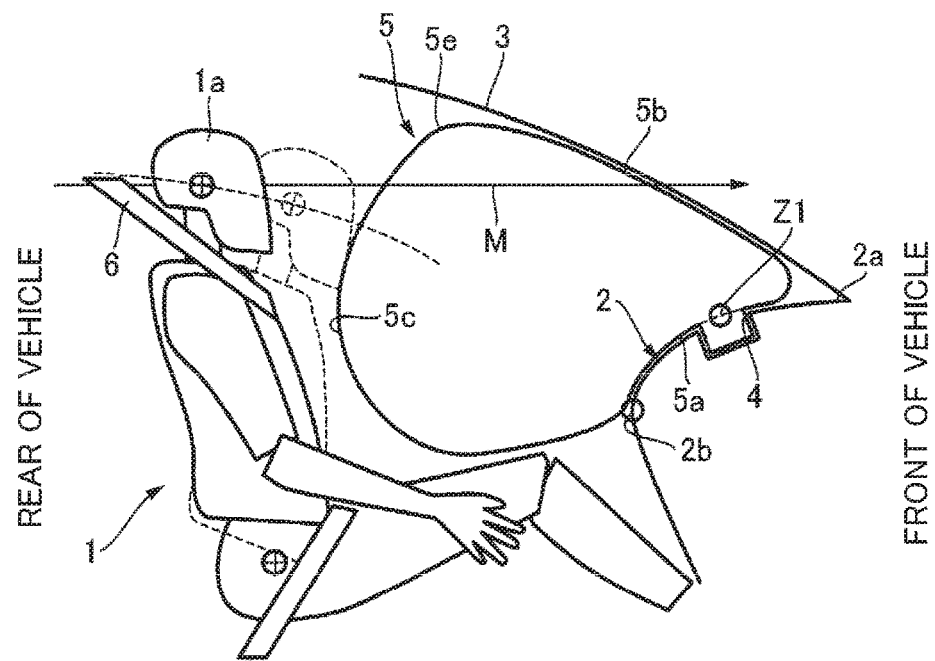
FIG. 36 is a side view showing a relationship between a direction in which an occupant moves during a diagonal collision and an outer shape of a fully deployed and expanded airbag in relation to a vehicular airbag device according to the present invention.
Figure 37:
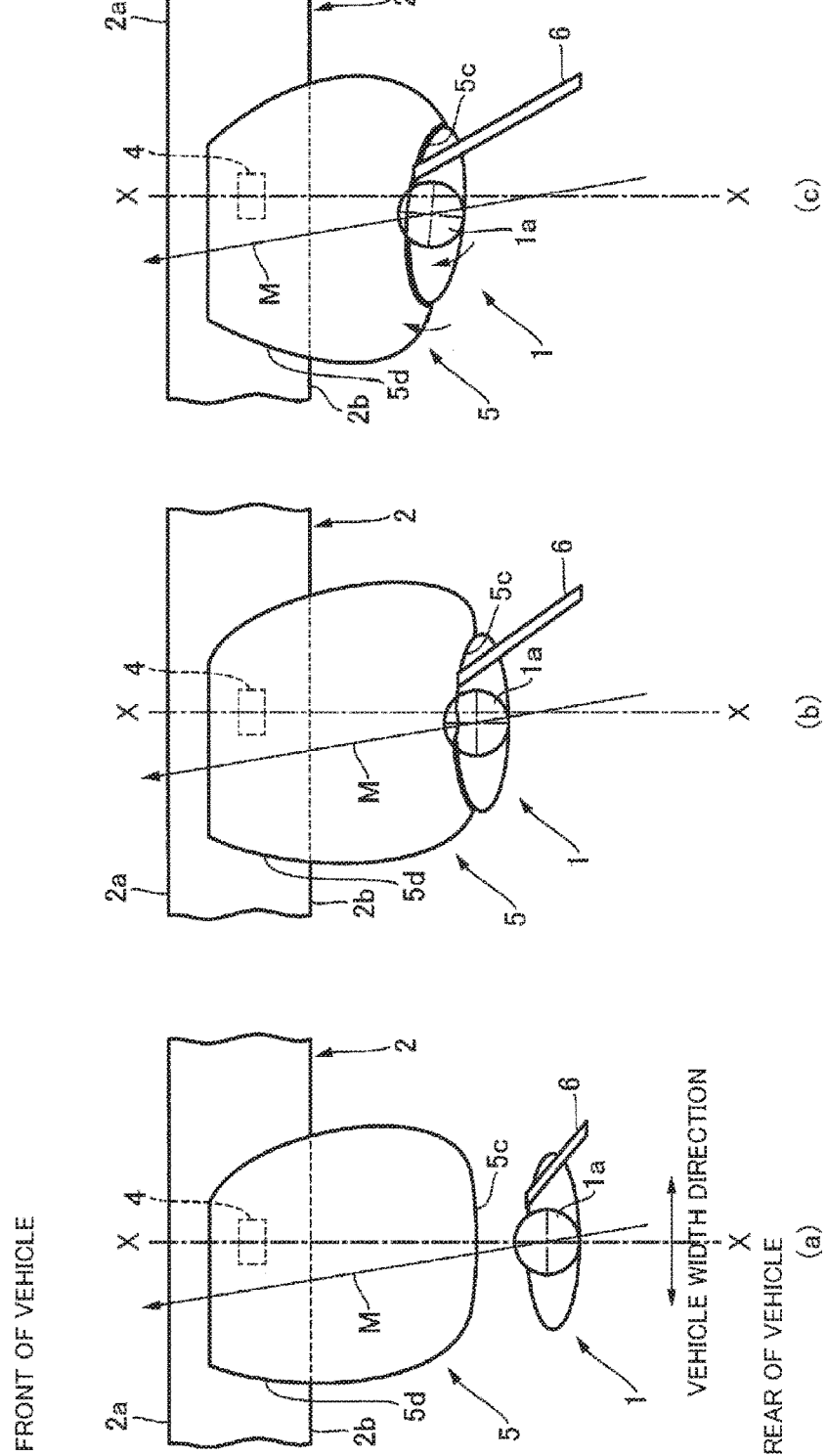
FIG. 37 is an explanatory diagram illustrating how the airbag of the vehicular airbag device shown in FIG. 32 restrains an occupant during a diagonal collision.

Next, workings of the vehicular airbag device according to the eighth embodiment will be described. FIG. 35 is a plan view showing a relationship between a direction M in which the occupant 1 moves during a diagonal collision and an outer shape of the fully deployed and expanded airbag 5, FIG. 36 is a side view thereof, and FIG. 37 is an explanatory diagram illustrating how the airbag 5 of the vehicular airbag device according to the eighth embodiment restrains the occupant 1 during a diagonal collision.

During a diagonal collision, a force causing a diagonally forward left movement in the vehicle longitudinal direction (a direction M) acts on the occupant 1 sitting on a right-side front seat. In the eighth embodiment, the dimension in the vehicle width direction which defines the outer shape of the vehicle interior side (the left side) of the airbag 5 is set greater than the maximum dimension WA in the vehicle width direction on the vertical section RL3 at the line A-A position and, at the same time, greater at the line B-B position than at the line C-C position (WB>WC>WA).

Due to this configuration, a range in which the airbag 5 is supported by the instrument panel 2 and the front windshield 3 to generate a supporting reaction force of the occupant 1 can be secured such that the range is wider than the occupant restraining surface 5c on the vehicle interior side (the left side).

Therefore, as shown in FIG. 37(b), when the occupant 1 moves diagonally forward left in the vehicle longitudinal direction while rotating so that the body of the occupant 1 tilts diagonally or when a rotation of the body of the occupant 1 occurs due to being caught by the occupant restraining surface 5c, the configuration of the outer shape on the vehicle interior side of the airbag 5 described above enables a rotating action in which the airbag 5 attempts to rotate together with the movement of the occupant 1 to be appropriately prevented by receiving a supporting reaction force from the instrument panel 2 and the like.

Accordingly, as shown in FIG. 37(c), the airbag 5 can restrain the body of the occupant 1 from moving diagonally forward left and, at the same time, prevent the body of the occupant 1 from rotating while tilting diagonally. As a result, the occupant 1 can be appropriately restrained and an occupant injury value can be reduced. Furthermore, since the body of the occupant 1 can be prevented from rotating, rotation of the head 1a of the occupant 1 around the neck can also be suppressed. Therefore, injury values of the head 1a and the neck of the occupant 1 can also be reduced.

It is needless to say that the vehicular airbag device according to the eighth embodiment is capable of demonstrating occupant protection performance comparable to that of conventional devices with respect to head-on collisions in addition to diagonal collisions.

Figure 38:
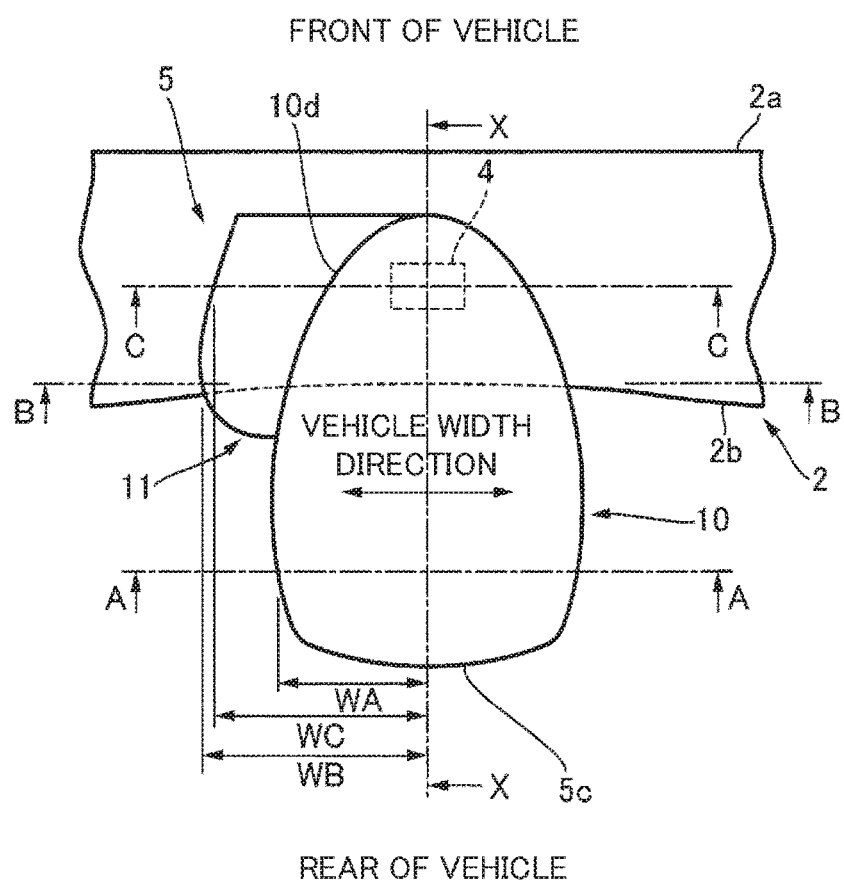
FIG. 38 is a plan view of an airbag in a periphery of a front seat of a vehicle which represents a modification of the eighth embodiment of a vehicular airbag device according to the present invention.
Figure 39:
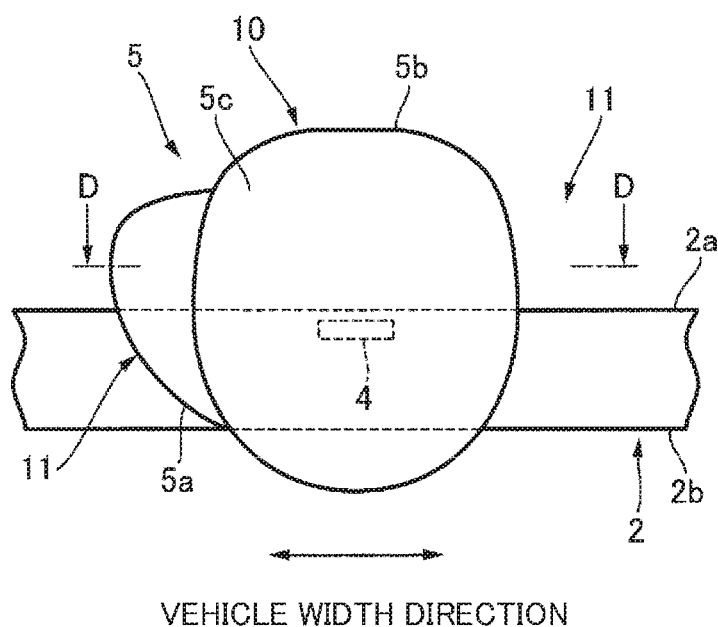
FIG. 39 is a schematic front view of the periphery of the front seat shown in FIG. 38 when viewing forward from rearward in a longitudinal direction of the vehicle.
Figure 40:
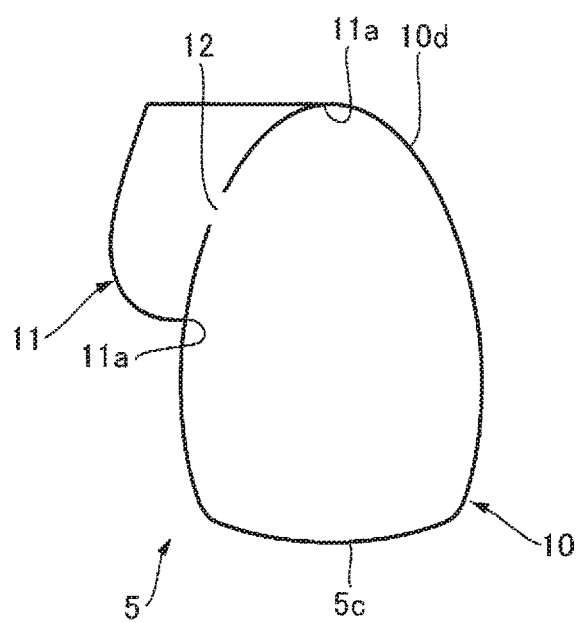
FIG. 40 is a sagittal sectional view taken along line D-D in FIG. 39.

FIGS. 38 to 40 show a modification of the vehicular airbag device according to the eighth embodiment. FIG. 38 is a plan view of an airbag in a periphery of a front seat of a vehicle, FIG. 39 is a schematic front view of the periphery of the front seat shown in FIG. 38 when viewing forward from rearward in a longitudinal direction of the vehicle, and FIG. 40 is a sagittal sectional view taken along line D-D in FIG. 39.

In this modification, as shown in FIGS. 38 to 40, when fully deployed and expanded, the airbag 5 is configured to include a main airbag section 10 positioned so as to oppose the opening 4 and a sub airbag section 11 positioned on the vehicle interior side (the left side) in the vehicle width direction with respect to the main airbag section 10. The main airbag section 10 and the sub airbag section 11 are deployed and expanded by inflator gas.

When the airbag 5 catches and restrains the occupant 1 with the occupant restraining surface 5c, a downward-facing surface 5a of the airbag 5 constituted by the main airbag section 10 and the sub airbag section 11 abuts the instrument panel 2. Accordingly, the airbag 5 is supported by the instrument panel 2. At the same time, an upward-facing surface 5b of the airbag 5 abuts the front windshield 3 and, accordingly, the airbag 5 is supported by the front windshield 3.

A capacity of the main airbag section 10 is set larger than a capacity of the sub airbag section 11. The sub airbag section 11 is a bag body having an annular opening and is provided such that a peripheral edge 11a of the annular opening is joined to an outer surface of the main airbag section 10 by various joining means such as sewing. Accordingly, the sub airbag section 11 is integrally formed with the main airbag section 10 so as to partially cover the outer surface of the main airbag section 10.

As shown in FIG. 40, the main airbag section 10 and the sub airbag section 11 are allowed to communicate with each other by a communication hole 12 formed in a portion of the main airbag section 10 which is covered by the sub airbag section 11. Inflator gas is first introduced into the main airbag section 10 and subsequently flows into the sub airbag section 11 through the communication hole 12 from the main airbag section 10. The inflow of inflator gas causes the main airbag section 10 to deploy and expand and, in addition, each sub airbag section 11 deploys and expands so as to bulge outward from the outer surface of the expanded main airbag section 10.

In a similar manner to an asymmetric airbag (a dotted line a in FIG. 69) in accordance with background art concepts shown in FIG. 69, an outer shape of the main airbag section 10 when fully deployed and expanded as viewed downward from above the vehicle is formed in a triangular shape or a fan-like shape in which an occupant restraining surface b that catches and restrains the occupant 1 is wide in a vehicle width direction and a front end 10*d* in the vehicle longitudinal direction on the side of the opening 4 tapers off and is narrow in the vehicle width direction.

As shown in FIG. 38, when viewed downward from above the vehicle, a planar outer shape of the sub airbag section 11 when fully deployed and expanded is formed so as to increase a dimension toward the vehicle interior side (the left side) in the vehicle width direction with respect to the main airbag section 10 on the instrument panel 2 where the front end 10*d* of the main airbag section 10 in the vehicle longitudinal direction is positioned. In other words, with the airbag 5 as a whole, a dimension on the vehicle interior side in the vehicle width direction with the center line (the line X-X) as a reference is formed wider than conventional airbags.

In the illustrated example, the sub airbag section 11 is formed so as to slightly protrude toward the rear of the vehicle from the position of the rear edge 2*b* of the instrument panel 2 in the vehicle longitudinal direction. The sub airbag section 11 may be formed so as not to protrude toward the rear of the vehicle from the position of the rear edge 2*b* of the instrument panel 2 in the vehicle longitudinal direction.

As described below, the airbag 5 as a whole which is constituted by the main airbag section 10 and the sub airbag section 11 is configured in a similar manner to the eighth embodiment described above.

Specifically, with the center line (the line X-X) as a reference, as shown in FIG. 38, an outer shape of the fully deployed and expanded airbag 5 on the vehicle interior side of the center line is configured such that a dimension WB in the vehicle width direction from the center line (the line X-X) to an outer contour of the sub airbag section 11 (the airbag 5) at the line B-B position is greater than a dimension WC in the vehicle width direction from the center line (the line X-X) to the outer contour of the sub airbag section 11 (the airbag 5) at the line C-C position which is more forward in the vehicle longitudinal direction than the line B-B position.

Furthermore, both the dimension WB in the vehicle width direction at the line B-B position and the dimension WC in the vehicle width direction at the line C-C position which is more forward in the vehicle longitudinal direction than the line B-B position are set greater than a maximum dimension WA in the vehicle width direction from the center line (the line X-X) on the vehicle interior side of the center line (the line X-X) on the vertical section RL3 at the line A-A position which is more rearward in the vehicle longitudinal direction than the line B-B position.

Accordingly, even in the present modification, in a similar manner to the eighth embodiment described above, with respect to a vehicle interior side in the vehicle width direction relative to the center line (the line X-X), the outer shape of the fully deployed and expanded airbag 5 when looking downward from above the vehicle is formed so as to be wider on a side of the opening 4 or, in other words, near the rear end 2*b* of the instrument panel 2 or near the opening 4 than the occupant restraining surface 5*c* which is to the rear in the vehicle longitudinal direction.

The sub airbag section 11 of the airbag 5 configured as described above is deployed and expanded while abutting the instrument panel 2 and, accordingly, supported by the instrument panel 2. As a result, a periphery of the opening 4 of the main airbag section 11 is supported by the sub airbag section 11.

Even in the present modification, a range in which a supporting reaction force of the occupant 1 is created which is wider than the occupant restraining surface 5*c* can be secured on the vehicle interior side (the left side). In addition, when the occupant 1 moves diagonally forward left in the vehicle longitudinal direction while rotating so that the body of the occupant 1 tilts diagonally or when a rotation of the body of the occupant 1 occurs due to being caught by the occupant restraining surface 5*c*, a rotating action in which the airbag 5 attempts to rotate together with the movement of the occupant 1 can be appropriately prevented by receiving a supporting reaction force from the instrument panel 2 and the like with the sub airbag section 11. As a result, even in the present modification, a similar working effect to the eighth embodiment described above can be secured.

Figure 41:
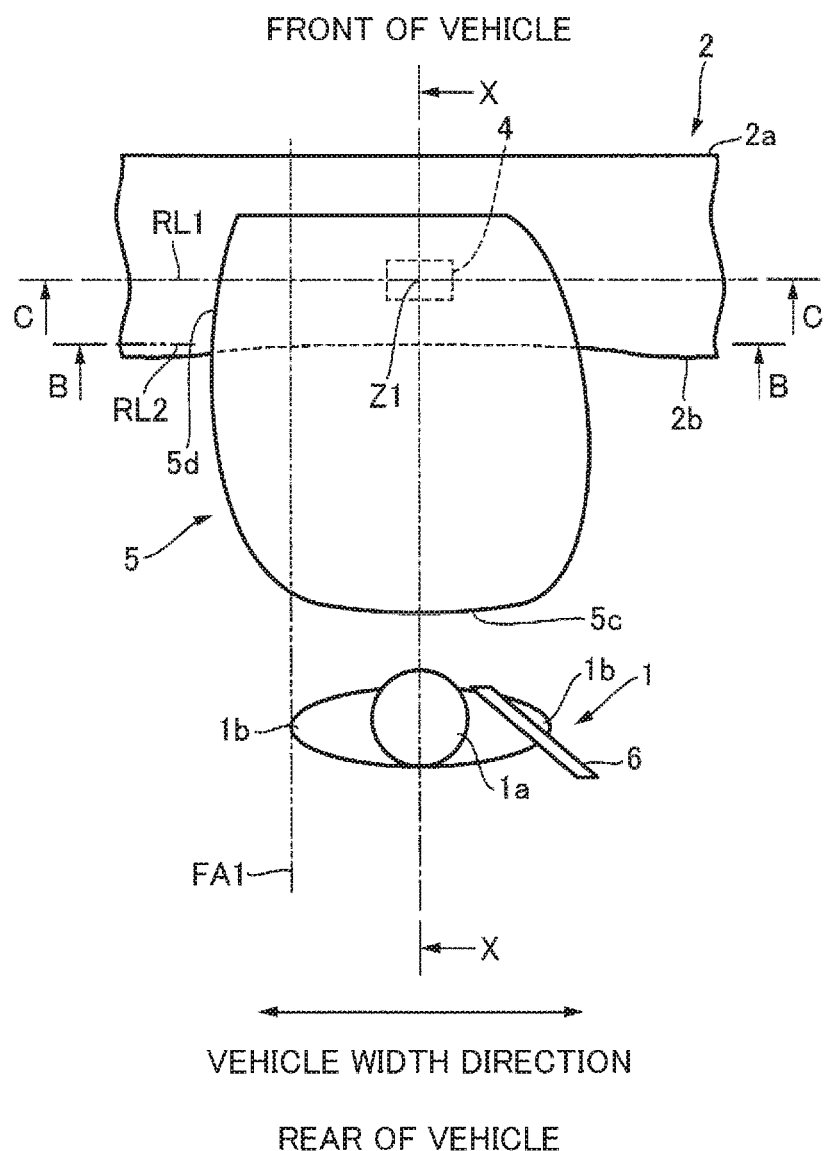
FIG. 41 is a plan view of an airbag representing a ninth embodiment of a vehicular airbag device according to the present invention.
Figure 42:
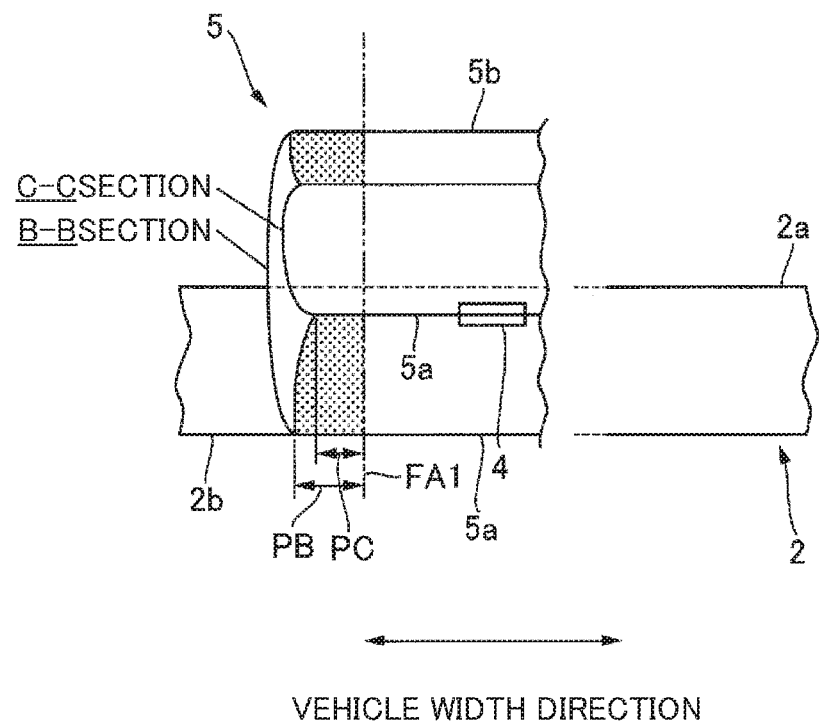
FIG. 42 is an explanatory diagram depicting sections of the airbag shown in FIG. 41 at the respective positions including the position of line B-B and the position of line C-C illustrated in FIGS. 32 and 33 in an overlapping manner when viewing forward from rearward in the vehicle longitudinal direction.

FIGS. 41 and 42 show the airbag 5 of a vehicular airbag device according to the ninth embodiment. Regarding an outer shape of the airbag 5, the fact that a dimension in the vehicle width direction toward the vehicle interior side (the left side) with the center line (the line X-X) as a reference is greatest at the line B-B position, smaller at the line C-C position, and smallest at the line A-A position (WB>WC>WA) is similar to the airbag 5 of the vehicular airbag device described in the eighth embodiment.

FIG. 41 is a plan view of the airbag 5, and FIG. 42 is an explanatory diagram depicting sections of the airbag 5 at the respective positions including a line B-B position and a line C-C position illustrated earlier in FIGS. 32 and 33 in an overlapping manner when viewing forward from rearward in the vehicle longitudinal direction (the vehicle exterior side (the right side) of the center line (the line X-X) has been omitted).

In the ninth embodiment, a first longitudinal direction vertical plane FA1 which passes in the vehicle longitudinal direction through a left shoulder 1*b*, which is positioned on the vehicle interior side (the left side), of the occupant 1 sitting on a front seat is taken into consideration. Since the occupant 1 may have various physiques which cannot be specified, a dummy is assumed as the occupant 1. A position anticipating a prescribed tissue thickness on an outer side of a joint bolt (which corresponds to a shoulder joint) that is implanted at a tip of a collar bone of the dummy is assumed to be a position of the shoulder 1*b*.

Regarding the outer shape of the fully deployed and expanded airbag 5, as shown in FIG. 42, with the center line (the line X-X) as a reference, the airbag 5 is formed with a size which protrudes more toward the vehicle interior side in the vehicle width direction than the occupant 1 from the first longitudinal direction vertical plane FA1 at least at the line B-B position and the line C-C position. A protrusion dimension PB in the vehicle width direction at the line B-B position is set greater than a protrusion dimension PC in the vehicle width direction at the line C-C position which is more forward in the vehicle longitudinal direction than the line B-B position.

Accordingly, when looking downward from above the vehicle, with respect to the vehicle interior side in the vehicle width direction relative to the center line (the line X-X), the outer shape of the fully deployed and expanded airbag 5 is formed so as to be wider on a side of the front end 5*d* in a vehicle longitudinal direction on a side of the opening 4 or, in other words, near the rear end 2*b* of the instrument panel 2 or near the opening 4 than the occupant restraining surface 5*c* which is to the rear in the vehicle longitudinal direction. Even with the ninth embodiment configured as described above, it is needless to say that a similar working effect to the eighth embodiment can be secured.

Figure 43:
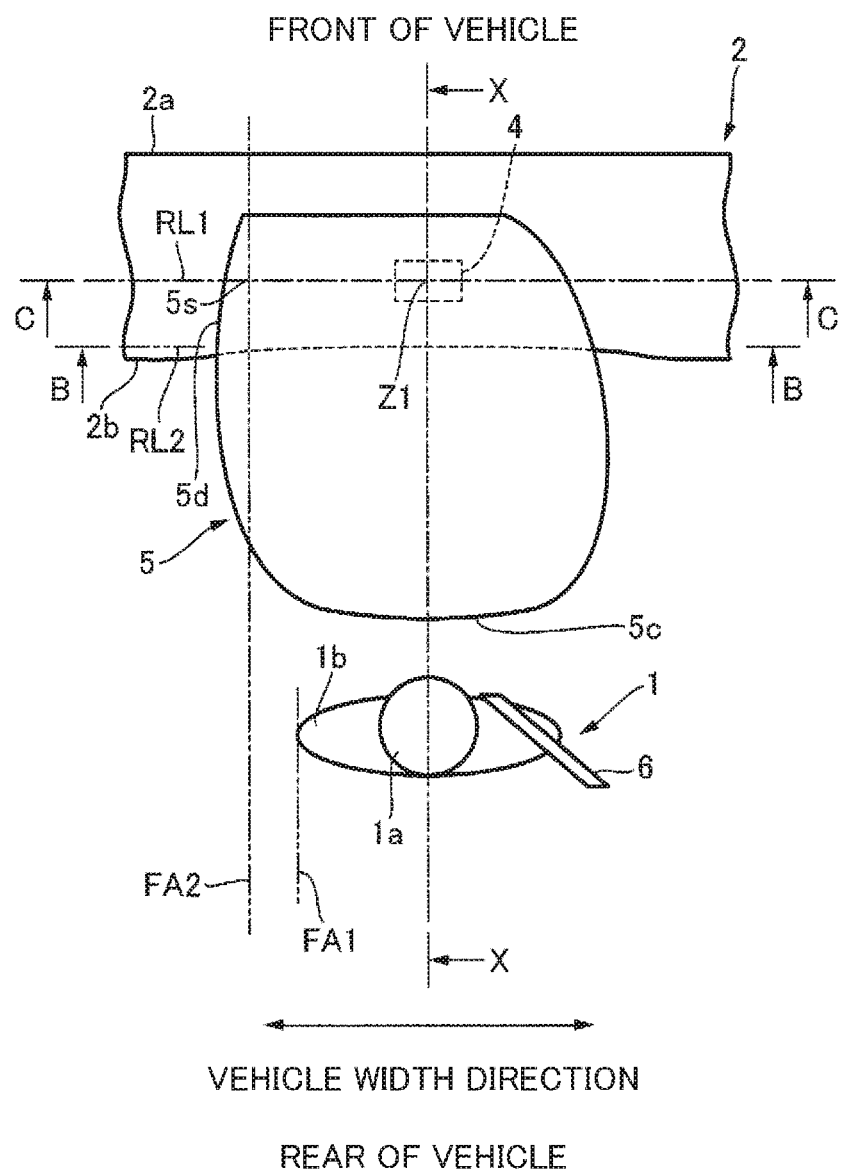
FIG. 43 is a plan view of an airbag representing a tenth embodiment of a vehicular airbag device according to the present invention.
Figure 44:
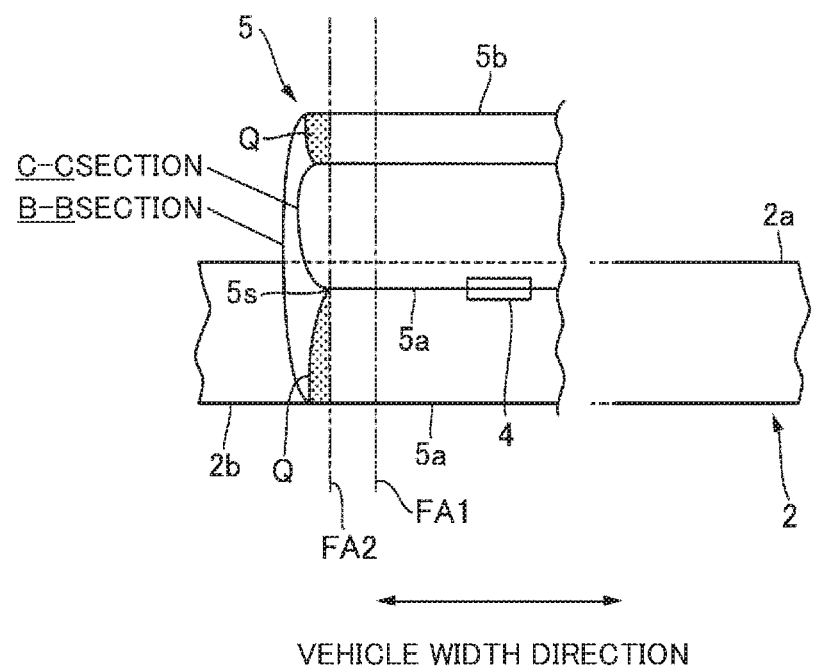
FIG. 44 is an explanatory diagram depicting sections of the airbag shown in FIG. 43 at the respective positions including the position of line B-B and the position of line C-C illustrated in FIGS. 32 and 33 in an overlapping manner when viewing forward from rearward in the vehicle longitudinal direction.

FIGS. 43 and 44 show the airbag 5 of a vehicular airbag device according to the tenth embodiment. Regarding an outer shape of the airbag 5, the fact that a dimension in the vehicle width direction toward the vehicle interior side (the left side) with the center line (the line X-X) as a reference is greatest at the line B-B position, smaller at the line C-C position, and smallest at the line A-A position (WB>WC>WA) is similar to the airbag 5 of the vehicular airbag devices described in the eighth and ninth embodiments.

FIG. 43 is a plan view of the airbag 5, and FIG. 44 is an explanatory diagram depicting sections of the airbag 5 at the respective positions including the line B-B position and the line C-C position illustrated earlier in FIGS. 32 and 33 in an overlapping manner when viewing forward from rearward in the vehicle longitudinal direction (the vehicle exterior side (the right side) of the center line (the line X-X) has been omitted).

In the tenth embodiment, with the center line (the X-X line) of the opening 4 in the vehicle left-right width direction as a reference, an outer shape of the airbag 5 on the vehicle interior side of the center line when the airbag 5 is fully deployed and expanded is configured so as to include, between a first vehicle width direction vertical plane RL1 at the line C-C position which passes through a position of a center Z1 of the opening 4 in the vehicle longitudinal direction and a second vehicle width direction vertical plane RL2 at the line B-B position which passes through the position of the rear edge 2*b* of the instrument panel 2, a region Q which comes into contact with the instrument panel 2 more to the vehicle interior side (the left side) in the vehicle width direction than a second longitudinal direction vertical plane FA2 which is more to the vehicle interior side (the left side) than a first longitudinal direction vertical plane FA1. In the illustrated example, the region Q is also configured with respect to the front windshield 3.

The second longitudinal direction vertical plane FA2 is a vertical plane in the vehicle longitudinal direction which passes through an end edge in the vehicle width direction of the airbag 5 in contact with the instrument panel 2 at the line C-C position. The end edge of the airbag 5 in the vehicle width direction refers to a left end 5*s* of an outer contour of the airbag 5 at the line C-C position. The first longitudinal direction vertical plane FA1 is as described earlier in the ninth embodiment.

Regarding the outer shape of the fully deployed and expanded airbag 5, as shown in FIG. 44 with the center line (the X-X line) as a reference, the airbag 5 includes the region Q which protrudes toward the vehicle interior side (the left side) in the vehicle width direction from the second longitudinal direction vertical plane FA2 and which comes into contact with the instrument panel 2 at least between the line B-B position and the line C-C position. The airbag 5 protrudes farther toward the vehicle interior side at the line B-B position than at the line C-C position.

Accordingly, when looking downward from above the vehicle, with respect to the vehicle interior side in the vehicle width direction relative to the center line (the line X-X), the outer shape of the fully deployed and expanded airbag 5 is formed so as to be wider on a side of the front end 5*d* in a vehicle longitudinal direction on a side of the opening 4 or, in other words, near the rear end 2*b* of the instrument panel 2 or near the opening 4 than the occupant restraining surface 5*c* which is to the rear in the vehicle longitudinal direction. Even with the tenth embodiment configured as described above, it is needless to say that a similar working effect to the eighth embodiment can be secured.

It is needless to say that the ninth and tenth embodiments described above can also be implemented using the airbag according to the modification shown in FIGS. 38 to 40.

Figure 45:
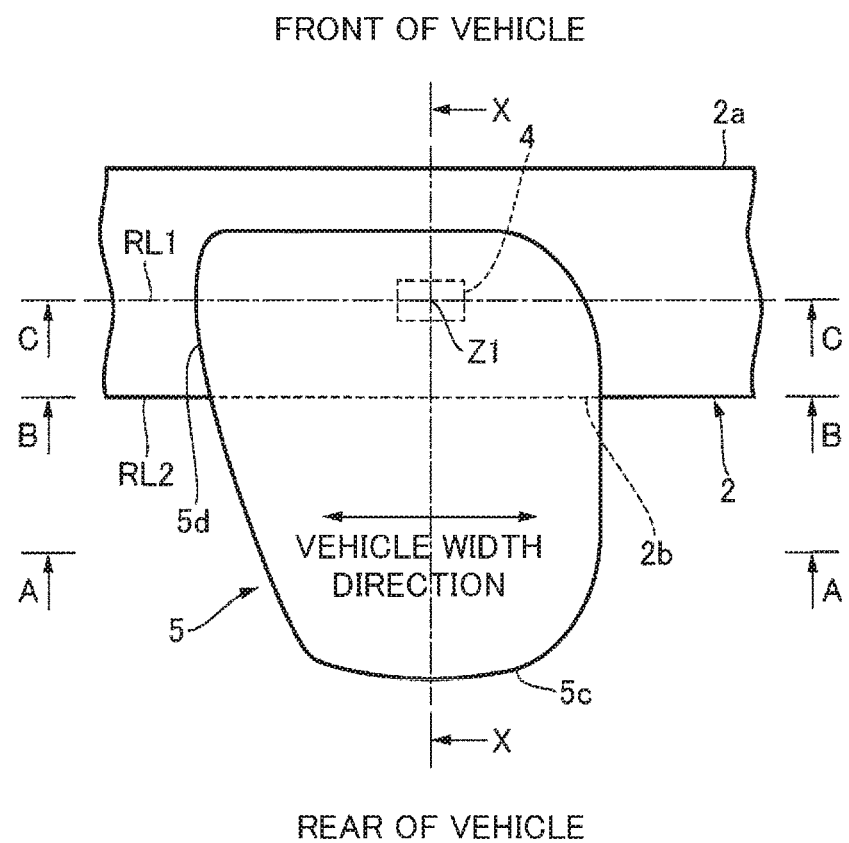
FIG. 45 is a plan view of an airbag representing an eleventh embodiment of a vehicular airbag device according to the present invention.
Figure 46:
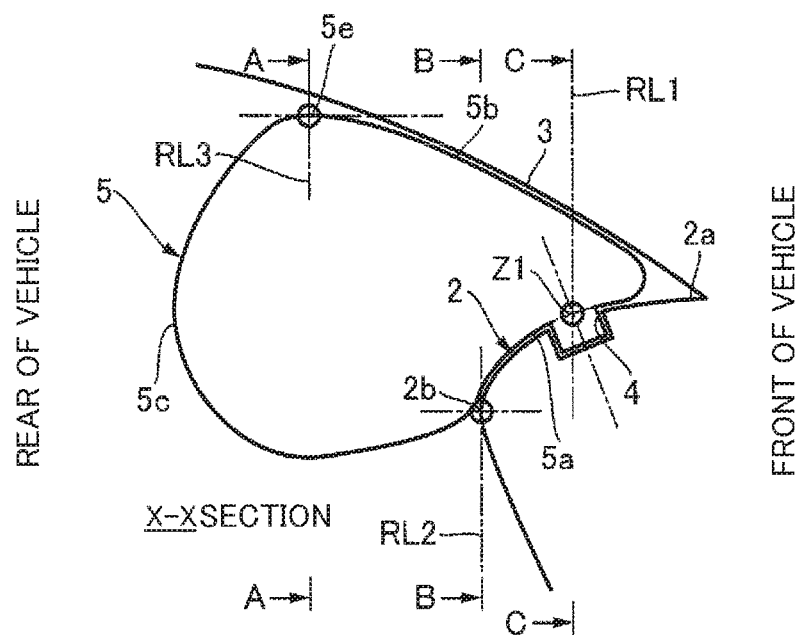
FIG. 46 is a sectional view taken along line X-X in FIG. 45.
Figure 47:
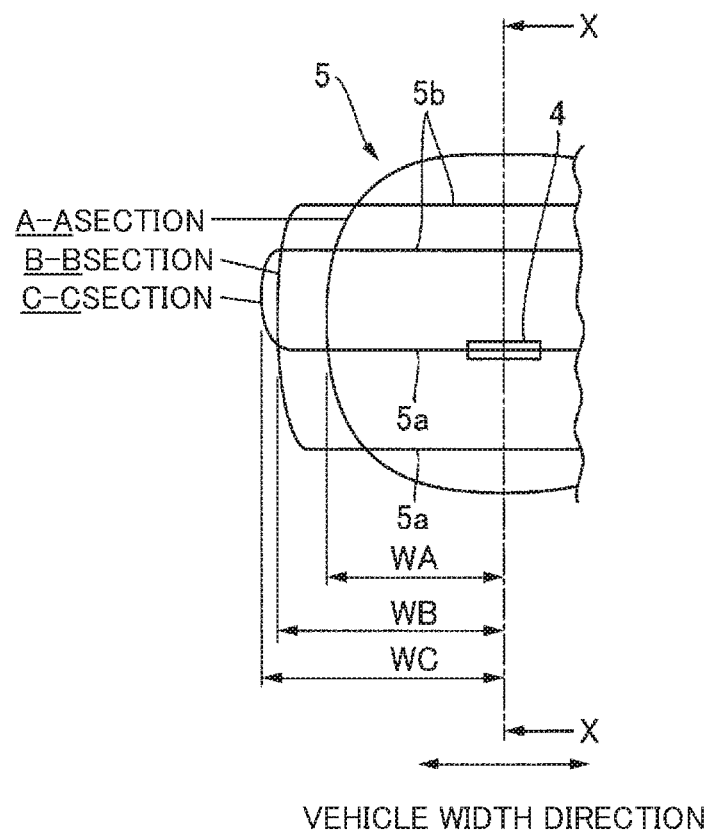
FIG. 47 is an explanatory diagram depicting sections of an airbag at respective positions illustrated in FIGS. 45 and 46 in an overlapping manner when viewing forward from rearward in the vehicle longitudinal direction.

FIGS. 45 to 47 show the airbag 5 of a vehicular airbag device according to the eleventh embodiment. FIG. 45 is a plan view of the airbag 5, FIG. 46 is a sectional view taken along the line X-X in FIG. 45, and FIG. 47 is an explanatory diagram depicting sections of the airbag 5 at the respective positions illustrated in FIGS. 45 and 46 in an overlapping manner when viewing forward from rearward in the vehicle longitudinal direction (the vehicle exterior side (the right side) of the center line (the line X-X) has been omitted). The line X-X, the line A-A, the line B-B, and the line C-C in the drawings are similar to those in FIGS. 32 and 33 described above in the eighth to tenth embodiments.

Regarding an outer shape of the fully deployed and expanded airbag 5, as shown in FIGS. 45 to 47, with the center line (the line X-X) as a reference, the outer shape of the airbag 5 on the vehicle interior side of the center line is configured such that a dimension WC in the vehicle width direction from the center line (the line X-X) to an outer contour of the airbag 5 at the line C-C position is greater than a dimension WB in the vehicle width direction from the center line (the line X-X) to the outer contour of the airbag 5 at the line B-B position which is more rearward in the vehicle longitudinal direction than the line C-C position.

Furthermore, both the dimension WC in the vehicle width direction at the line C-C position and the dimension WB in the vehicle width direction at the line B-B position which is more rearward in the vehicle longitudinal direction than the line C-C position are set greater than a maximum dimension WA in the vehicle width direction from the center line (the line X-X) on the vehicle interior side of the center line (the line X-X) on the vertical section RL3 at the line A-A position which is more rearward in the vehicle longitudinal direction than the line B-B position.

Accordingly, when looking downward from above the vehicle, with respect to the vehicle interior side in the vehicle width direction relative to the center line (the line X-X), the outer shape of the airbag 5 on the vehicle interior side (the left side) when the airbag 5 is fully deployed and expanded is formed so as to be wider on a side of the front end 5*d* in a vehicle longitudinal direction on a side of the opening 4 or, in other words, near the rear end 2*b* of the instrument panel 2 or near the opening 4 than the occupant restraining surface 5*c* which is to the rear in the vehicle longitudinal direction.

In the eleventh embodiment, the dimension in the vehicle width direction which defines the outer shape of the vehicle interior side (the left side) of the airbag 5 is set greater than the maximum dimension WA in the vehicle width direction on the vertical section RL3 at the line A-A position and, at the same time, greater at the line C-C position than at the line B-B position (WC>WB>WA). Due to this configuration, a range in which the airbag 5 is supported by the instrument panel 2 and the front windshield 3 to generate a supporting reaction force of the occupant 1 can be secured such that the range is wider than the occupant restraining surface 5*c* on the vehicle interior side (the left side) and a similar working effect to the eighth embodiment can be secured.

Figure 48:
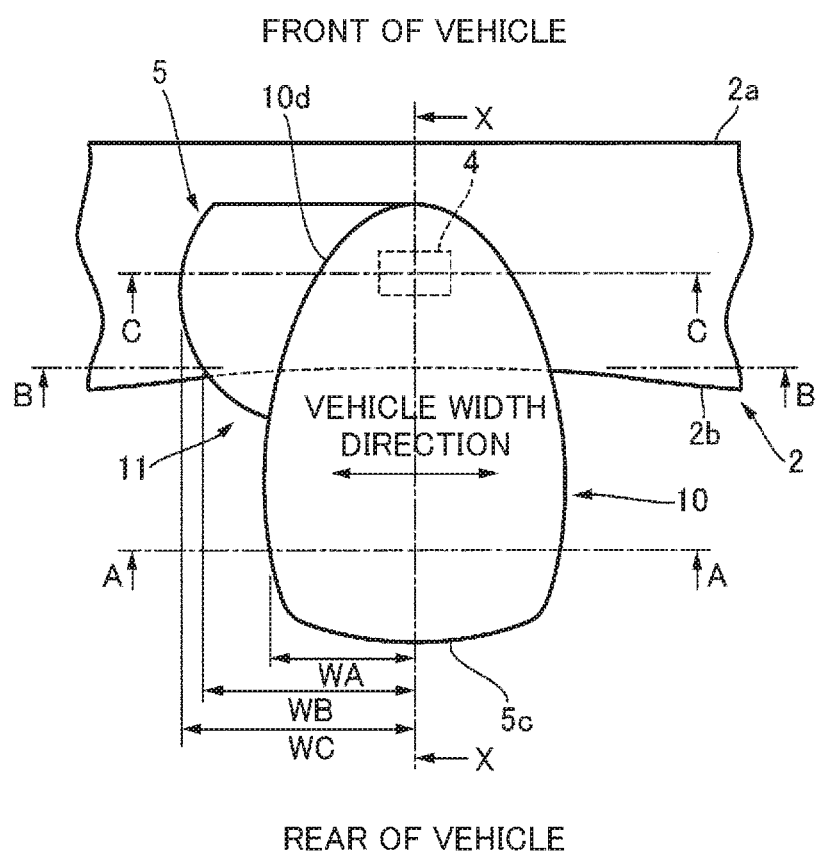
FIG. 48 is a plan view of an airbag in a periphery of a front seat of a vehicle which represents a modification of the eleventh embodiment of a vehicular airbag device according to the present invention.
Figure 49:
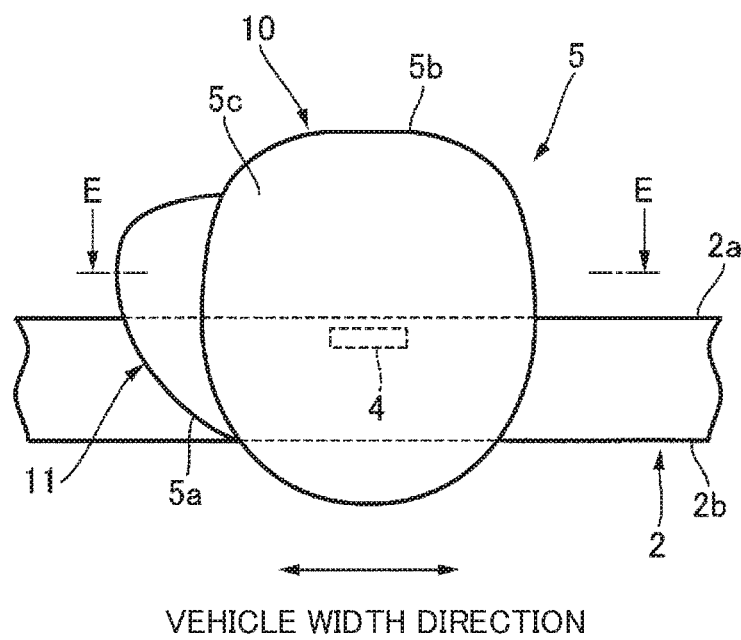
FIG. 49 is a schematic front view of the periphery of the front seat shown in FIG. 48 when viewing forward from rearward in a longitudinal direction of the vehicle.
Figure 50:
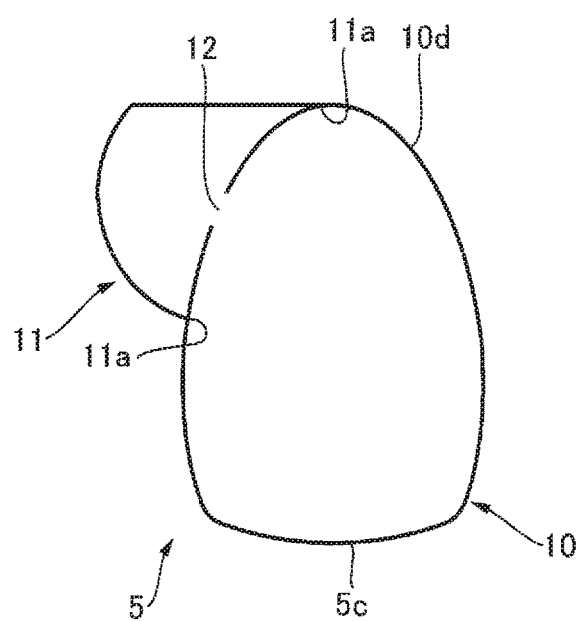
FIG. 50 is a sagittal sectional view taken along line E-E in FIG. 49.

FIGS. 48 to 50 show a modification of the vehicular airbag device according to the eleventh embodiment. FIG. 48 is a plan view of an airbag in a periphery of a front seat of a vehicle, FIG. 49 is a schematic front view of the periphery of the front seat shown in FIG. 48 when viewing forward from rearward in a longitudinal direction of the vehicle, and FIG. 50 is a sagittal sectional view taken along line E-E in FIG. 49.

This modification is basically similar to the modification of the eighth embodiment described earlier. As shown in FIG. 50, the main airbag section 10 and the sub airbag section 11 are allowed to communicate with each other by a communication hole 12 formed in a portion of the main airbag section 10 which is covered by the sub airbag section 11.

The present modification differs from the modification shown in FIGS. 38 to 40 in that, in the present modification, with the center line (the line X-X) as a reference, as shown in FIG. 48, an outer shape of the fully deployed and expanded airbag 5 on the vehicle interior side of the center line is configured such that a dimension WB in the vehicle width direction from the center line (the line X-X) to an outer contour of the sub airbag section 11 (the airbag 5) at the line B-B position is greater than a dimension WC in the vehicle width direction from the center line (the line X-X) to the outer contour of the sub airbag section 11 (the airbag 5) at the line C-C position which is more forward in the vehicle longitudinal direction than the line B-B position.

Furthermore, both the dimension WC in the vehicle width direction at the line C-C position and the dimension WB in the vehicle width direction at the line B-B position which is more rearward in the vehicle longitudinal direction than the line C-C position are set greater than a maximum dimension WA in the vehicle width direction from the center line (the line X-X) on the vehicle interior side of the center line (the line X-X) on the vertical section RL3 at the line A-A position which is more rearward in the vehicle longitudinal direction than the line B-B position.

Accordingly, even in the present modification, in a similar manner to the eleventh embodiment described above, with respect to a vehicle interior side in the vehicle width direction relative to the center line (the line X-X), the outer shape of the fully deployed and expanded airbag 5 when looking downward from above the vehicle is formed so as to be wider on a side of the opening 4 or, in other words, near the rear end 2b of the instrument panel 2 or near the opening 4 than the occupant restraining surface 5c which is to the rear in the vehicle longitudinal direction.

The sub airbag section 11 of the airbag 5 configured as described above is deployed and expanded while abutting the instrument panel 2 and, accordingly, supported by the instrument panel 2. As a result, a periphery of the opening 4 of the main airbag section 11 is supported by the sub airbag section 11.

Even in the present modification, a range in which a supporting reaction force of the occupant 1 is created which is wider than the occupant restraining surface 5c can be secured on the vehicle interior side (the left side). In addition, when the occupant 1 moves diagonally forward left in the vehicle longitudinal direction while rotating so that the body of the occupant 1 tilts diagonally or when a rotation of the body of the occupant 1 occurs due to being caught by the occupant restraining surface 5c, a rotating action in which the airbag 5 attempts to rotate together with the movement of the occupant 1 can be appropriately prevented by receiving a supporting reaction force from the instrument panel 2 and the like with the sub airbag section 11. As a result, even in the present modification, a similar working effect to the eighth embodiment described earlier can be secured.

Figure 51:
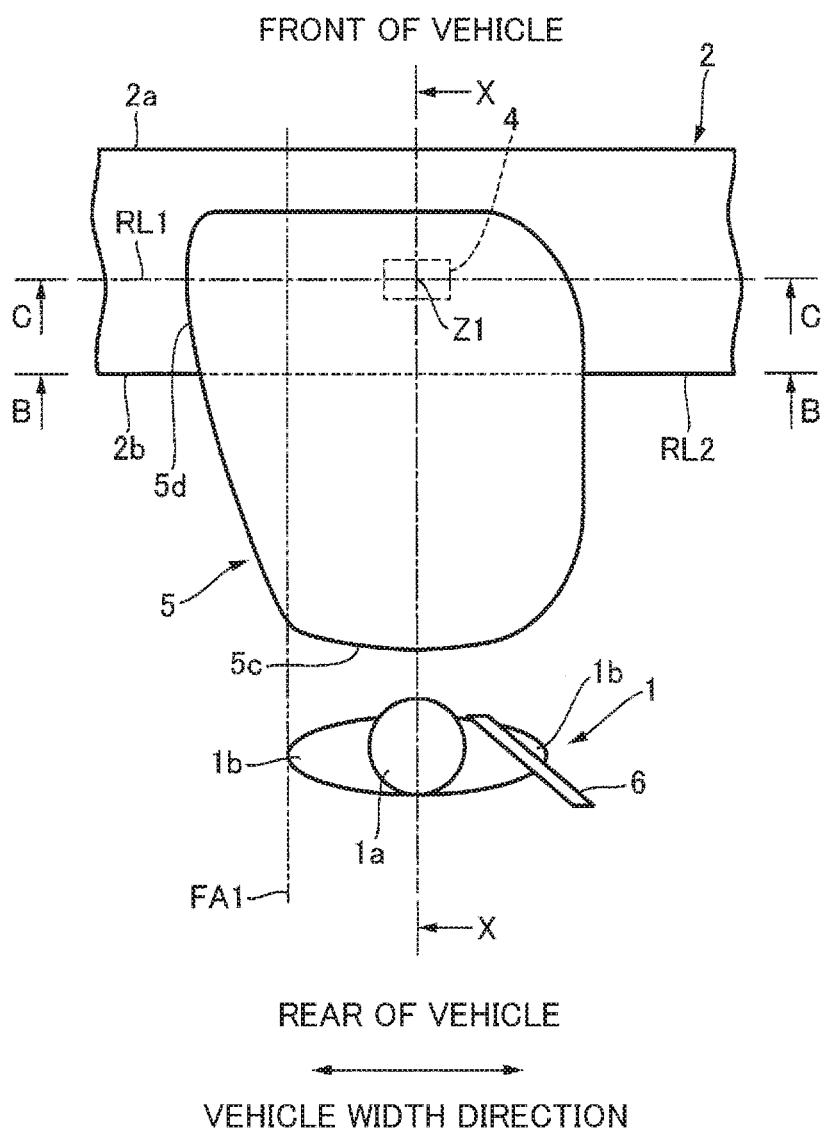
FIG. 51 is a plan view of an airbag representing a twelfth embodiment of a vehicular airbag device according to the present invention.
Figure 52:
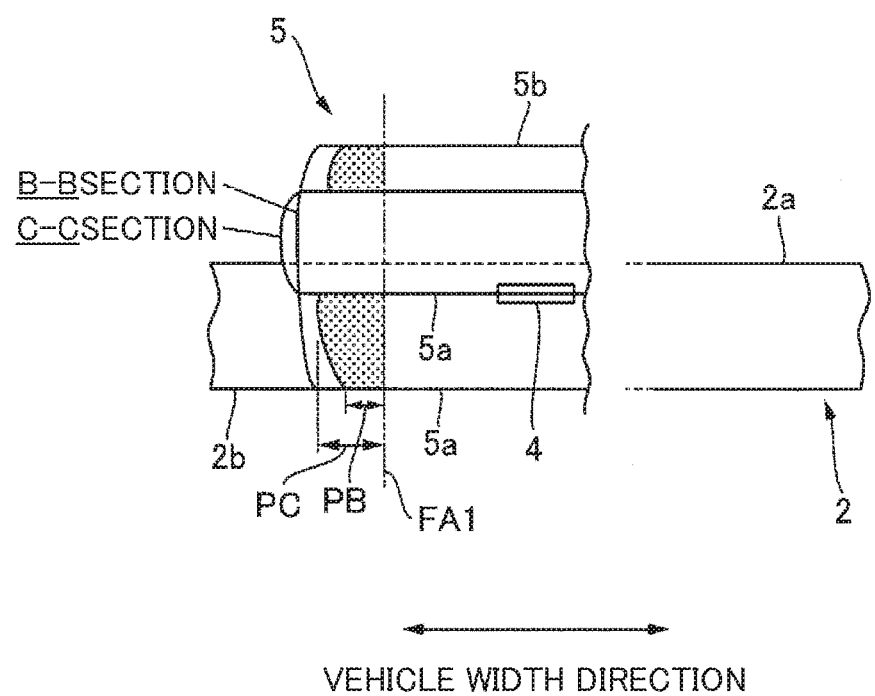
FIG. 52 is an explanatory diagram depicting sections of the airbag shown in FIG. 51 at the respective positions including a position of line B-B and a position of line C-C illustrated in FIGS. 45 and 46 in an overlapping manner when viewing forward from rearward in the vehicle longitudinal direction.

FIGS. 51 and 52 show the airbag 5 of a vehicular airbag device according to the twelfth embodiment. Regarding an outer shape of the airbag 5, the fact that a dimension in the vehicle width direction toward the vehicle interior side (the left side) with the center line (the line X-X) as a reference is greatest at the line C-C position, smaller at the line B-B position, and smallest at the line A-A position (WC>WB>WA) is similar to the airbag 5 of the vehicular airbag device according to the eleventh embodiment.

FIG. 51 is a plan view of the airbag 5, and FIG. 52 is an explanatory diagram depicting sections of the airbag 5 at the respective positions including the line B-B position and the line C-C position illustrated earlier in FIGS. 45 and 46 in an overlapping manner when viewing forward from rearward in the vehicle longitudinal direction (the vehicle exterior side (the right side) of the center line (the line X-X) has been omitted).

The twelfth embodiment is similar to the ninth embodiment in that a first longitudinal direction vertical plane FA1 that passes in the vehicle longitudinal direction through a left shoulder 1b, which is positioned on the vehicle interior side (the left side), of the occupant 1 sitting on a front seat is taken into consideration.

Regarding the outer shape of the fully deployed and expanded airbag 5, as shown in FIG. 52, the airbag 5 is formed with a size which protrudes more toward the vehicle interior side in the vehicle width direction than the occupant 1 from the first longitudinal direction vertical plane FA1 at least at the line B-B position and the line C-C position. A protrusion dimension PC in the vehicle width direction at the line C-C position is set greater than a protrusion dimension PB in the vehicle width direction at the line B-B position which is more rearward in the vehicle longitudinal direction than the line C-C position.

Accordingly, when looking downward from above the vehicle, with respect to the vehicle interior side in the vehicle width direction relative to the center line (the line X-X), the outer shape of the fully deployed and expanded airbag 5 is formed so as to be wider on a side of the front end 5d in a vehicle longitudinal direction on a side of the opening 4 or, in other words, near the rear end 2b of the instrument panel 2 or near the opening 4 than the occupant restraining surface 5c which is to the rear in the vehicle longitudinal direction.

In the twelfth embodiment, with the center line (the line X-X) as a reference, the outer shape of the airbag 5 is formed with a size which protrudes more toward the vehicle interior side than the occupant 1 from the first longitudinal direction vertical plane FA1 at least at the line B-B position and the line C-C position. In addition, the protrusion dimension PC in the vehicle width direction at the line C-C position is set greater than the protrusion dimension PB in the vehicle width direction at the line B-B position. Due to such a configuration, even in the twelfth embodiment, a similar working effect to the eighth embodiment can be secured.

Figure 53:
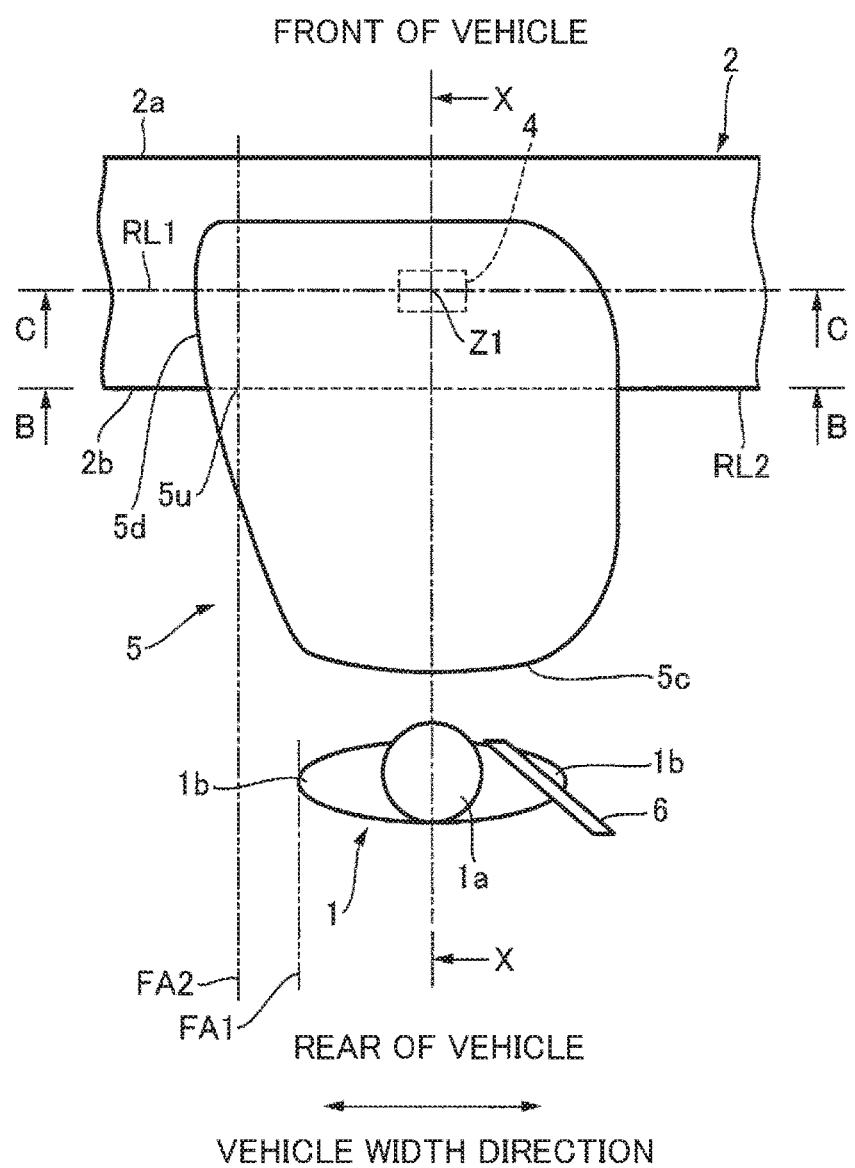
FIG. 53 is a plan view of an airbag representing a thirteenth embodiment of a vehicular airbag device according to the present invention.
Figure 54:
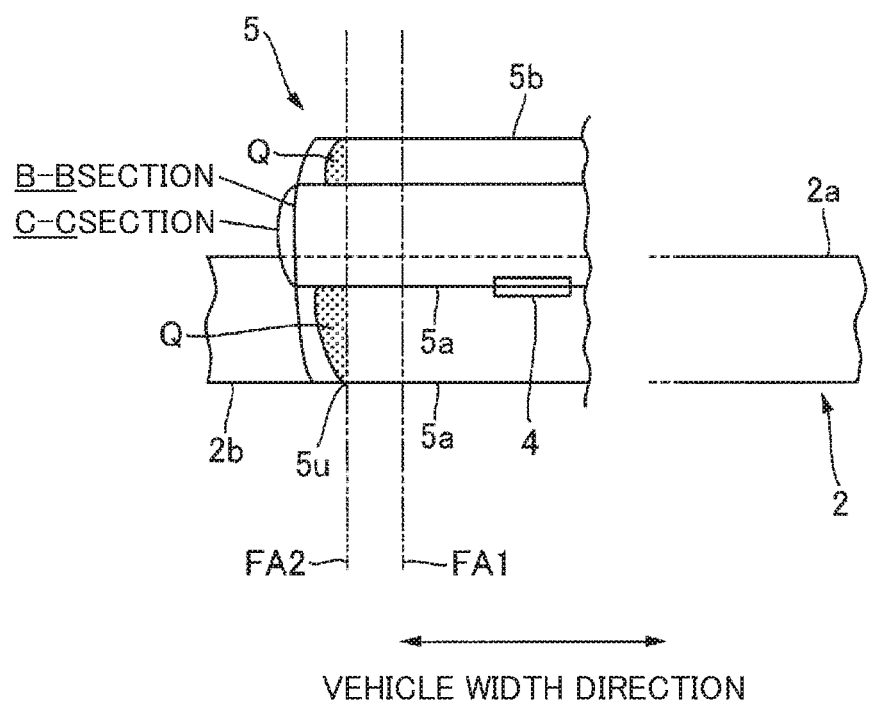
FIG. 54 is an explanatory diagram depicting sections of the airbag shown in FIG. 53 at the respective positions including the position of line B-B and the position of line C-C illustrated in FIGS. 45 and 46 in an overlapping manner when viewing forward from rearward in the vehicle longitudinal direction.

FIGS. 53 and 54 show the airbag 5 of a vehicular airbag device according to the thirteenth embodiment. Regarding an outer shape of the airbag 5, the fact that a dimension in the vehicle width direction toward the vehicle interior side (the left side) with the center line (the line X-X) as a reference is greatest at the line C-C position, smaller at the line B-B position, and smallest at the line A-A position (WC>WB>WA) is similar to the airbag 5 of the vehicular airbag devices according to the eleventh and twelfth embodiments.

FIG. 53 is a plan view of the airbag 5, and FIG. 54 is an explanatory diagram depicting sections of the airbag 5 at the respective positions including the line B-B position and the line C-C position illustrated earlier in FIGS. 45 and 46 in an overlapping manner when viewing forward from rearward in the vehicle longitudinal direction (the vehicle exterior side (the right side) of the center line (the line X-X) has been omitted).

The thirteenth embodiment is similar to the tenth embodiment in that, with the center line (the X-X line) of the opening 4 in the vehicle left-right width direction as a reference, an outer shape of the airbag 5 on the vehicle interior side of the center line when the airbag 5 is fully deployed and expanded is configured so as to include, between a first vehicle width direction vertical plane RL1 at the line C-C position which passes through a position of a center Z1 of the opening 4 in the vehicle longitudinal direction and a second vehicle width direction vertical plane RL2 at the line B-B position which passes through the position of the rear edge 2b of the instrument panel 2, a region Q which comes into contact with the instrument panel 2 on the vehicle interior side (the left side) in the vehicle width direction of a second longitudinal direction vertical plane FA2 which is more toward the vehicle interior side (the left side) than a first longitudinal direction vertical plane FA1. In the illustrated example, the region Q is also configured with respect to the front windshield 3.

The second longitudinal direction vertical plane FA2 is a vertical plane in the vehicle longitudinal direction which passes through an end edge in the vehicle width direction of the airbag 5 in contact with the instrument panel 2 at the line B-B position. The end edge of the airbag 5 in the vehicle width direction refers to a left end 5u of an outer contour of the airbag 5 at the line B-B position. The first longitudinal direction vertical plane FA1 is as described earlier in the ninth, tenth, and twelfth embodiments.

Regarding the outer shape of the fully deployed and expanded airbag 5, as shown in FIG. 54, the airbag 5 includes the region Q which protrudes toward the vehicle interior side (the left side) in the vehicle width direction from the second longitudinal direction vertical plane FA2 and which comes into contact with the instrument panel 2 at least between the line B-B position and the line C-C position. The airbag 5 protrudes farther toward the vehicle interior side at the line C-C position than at the line B-B position.

Accordingly, when looking downward from above the vehicle, with respect to the vehicle interior side in the vehicle width direction relative to the center line (the line X-X), the outer shape of the fully deployed and expanded airbag 5 is formed so as to be wider on a side of the front end 5d in a vehicle longitudinal direction on a side of the opening 4 or, in other words, near the rear end 2b of the instrument panel 2 or near the opening 4 than the occupant restraining surface 5c which is to the rear in the vehicle longitudinal direction.

In the thirteenth embodiment, with the center line (the line X-X) as a reference, the outer shape of the airbag 5 includes the region Q which protrudes toward the vehicle interior side (the left side) from the second longitudinal direction vertical plane FA2 and which comes into contact with the instrument panel 2 at least between the line B-B position and the line C-C position. In addition, the airbag 5 protrudes farther toward the vehicle interior side at the line C-C position than at the line B-B position. Due to such a configuration, even in the thirteenth embodiment, a similar working effect to the eighth embodiment can be secured.

It is needless to say that the twelfth and thirteenth embodiments described above can also be implemented using the airbag according to the modification shown in FIGS. 48 to 50.

Figure 55:
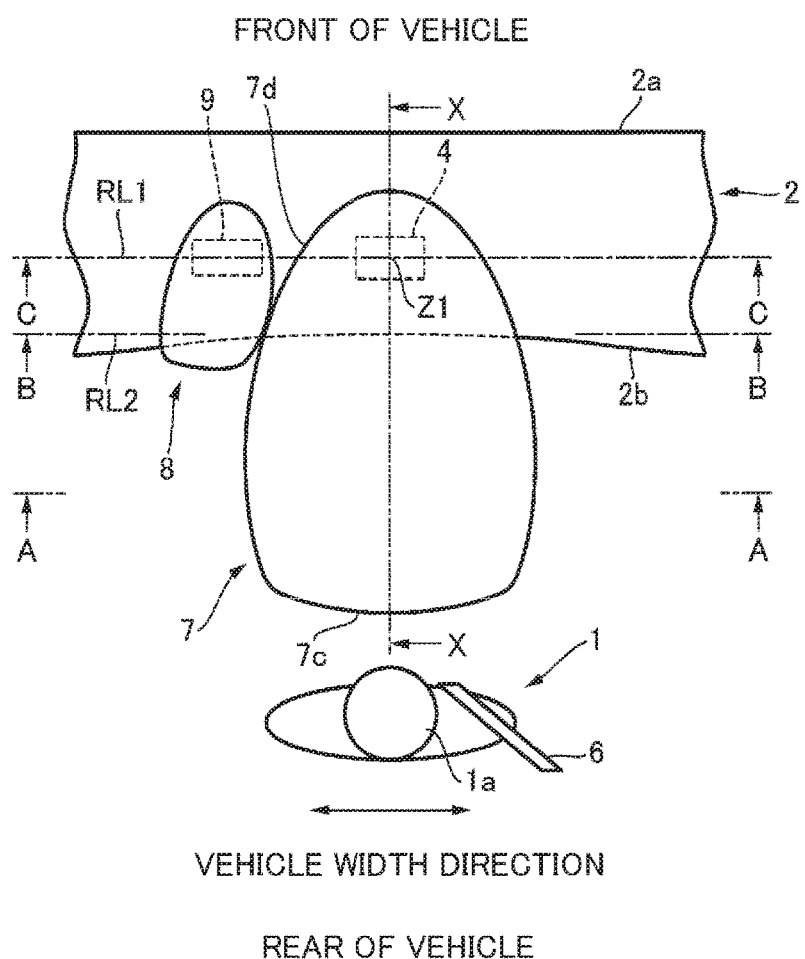
FIG. 55 is a plan view of an airbag representing a fourteenth embodiment of a vehicular airbag device according to the present invention.
Figure 56:
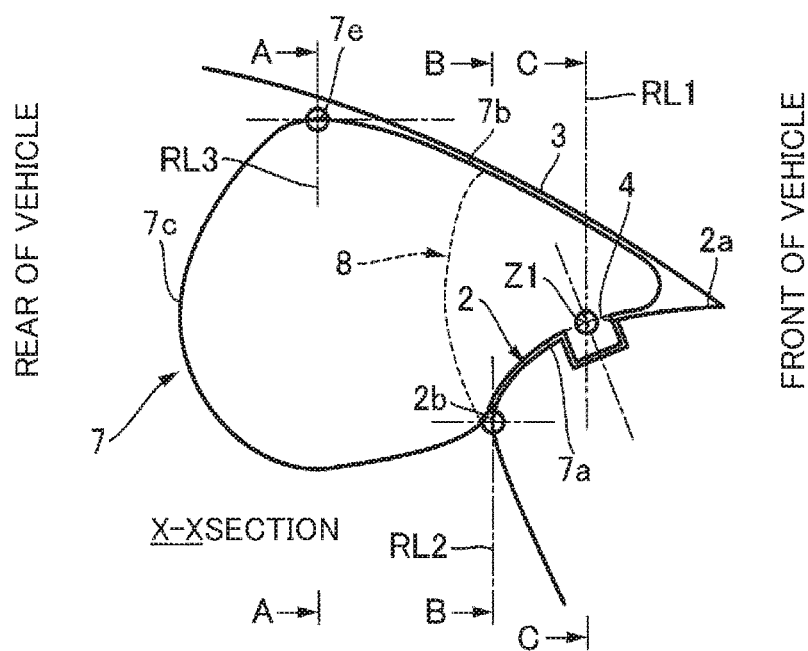
FIG. 56 is a sectional view taken along line X-X in FIG. 55.
Figure 57:
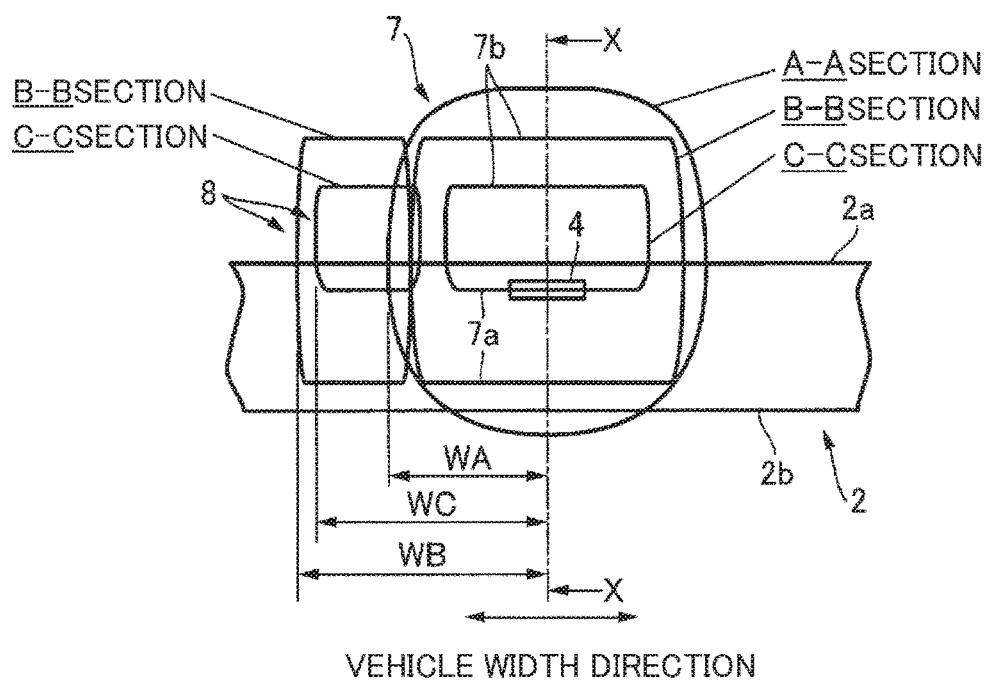
FIG. 57 is an explanatory diagram depicting sections of an airbag at respective positions illustrated in FIGS. 55 and 56 in an overlapping manner when viewing forward from rearward in the vehicle longitudinal direction.

FIGS. 55 to 58 show a vehicular airbag device according to the fourteenth embodiment. FIG. 55 is a plan view of the vehicular airbag device according to the fourteenth embodiment, FIG. 56 is a sectional view taken along line X-X in FIG. 55, and FIG. 57 is an explanatory diagram depicting sections of an airbag and an additional airbag at the respective positions illustrated in FIGS. 55 and 56 in an overlapping manner when viewing forward from rearward in the vehicle longitudinal direction. The fourteenth embodiment is configured by providing a conventional airbag 7 with an additional airbag 8.

An opening 4 is formed on an instrument panel 2 and arranged so as to oppose a front seat or, in other words, arranged so as to oppose the front seat occupant 1 sitting on the front seat. The opening 4 is sealed by an openable airbag door. The airbag 7 is housed inside the instrument panel 2. As is conventionally known, an outer shape of the airbag 7 when fully deployed and expanded as viewed downward from above the vehicle is formed in a triangular shape or a fan-like shape in which an occupant restraining surface 7c that catches and restrains the occupant 1 is wide in a vehicle width direction and a front end 7d in the vehicle longitudinal direction on the side of the opening 4 tapers off and is narrow in the vehicle width direction.

When a collision impact is generated, the airbag 7 is inflated by inflator gas that is generated by an inflator. When inflated, the airbag 7 opens the airbag door and deploys and expands rearward in a vehicle longitudinal direction from the opening 4 toward the occupant 1 sitting on the front seat of the vehicle. Of the airbag 7 having burst out from the opening 4, a downward-facing surface 7a deploys and expands toward the occupant 1 along the instrument panel 2 while an upward-facing surface 7b deploys and expands toward the occupant 1 along the front windshield 3. A rearward surface of the airbag 7 in the vehicle longitudinal direction is to constitute an occupant restraining surface 7c.

When catching and restraining the occupant 1 with the occupant restraining surface 7c, the downward-facing surface of the airbag 7 abuts the instrument panel 2 and is supported by the instrument panel 2. At the same time, the upward-facing surface of the airbag 7 abuts the front windshield 3 and is supported by the front windshield 3.

The airbag 7 is configured such that, by being supported by the instrument panel 2 and the front windshield 3, the airbag 7 receives supporting reaction forces therefrom and catches and restrains the body of the occupant 1.

An additional opening 9 is formed arranged adjacent to the opening 4 on the vehicle interior side (the left side) of the opening 4 in the vehicle width direction on the instrument panel 2. The additional opening 9 is sealed by an openable additional airbag door (not shown). An additional airbag 8 with a small capacity is housed inside the instrument panel 2 in correspondence to a position of the additional opening 9. In the present embodiment, an outer shape of the fully deployed and expanded additional airbag 8 is configured such that a forward side in the vehicle longitudinal direction is wider than a rearward side.

When a collision impact is generated, the additional airbag 8 is inflated by inflator gas that is generated by an additional inflator. When inflated, the additional airbag 8 opens the additional airbag door and deploys and expands rearward in the vehicle longitudinal direction from the additional opening 9. The additional airbag 8 is deployed and expanded in a periphery of the opening 4 of the airbag 7.

Specifically, the additional airbag 8 is deployed and expanded in an arrangement where the additional airbag 8 is sandwiched from diagonally rearward right to diagonally forward left in the vehicle longitudinal direction between the airbag 7 and the instrument panel 2 at a side of the front end 7*d* of the airbag 7, which tapers off and is narrow, in the vehicle longitudinal direction on the side of the opening 4.

After being fully deployed and expanded and before restraining the occupant 1, the airbag 7 and the additional airbag 8 are positioned in peripheries of the opening 4 and the additional opening 9 on the instrument panel 2 and the rear edge 2*b* thereof so that the additional airbag 8 is nestled against the airbag 7. When "positioned so that the additional airbag 8 is nestled against the airbag 7", the airbag 7 and the additional airbag 8 may or may not be in contact with each other. When considered in combination of an outer shape of the fully deployed and expanded airbag 7, with the center line (the line X-X) of the opening 4 in the vehicle left-right width direction as a reference, an outer shape of the fully deployed and expanded additional airbag 8 on the vehicle interior side of the center line is configured such that a dimension WB in the vehicle width direction from the center line (the line X-X) to an outer contour of the additional airbag 8 at the position of the rear edge 2*b* of the instrument panel 2 in the vehicle longitudinal direction (the line B-B position) is greater than a dimension WC in the vehicle width direction from the center line (the line X-X) to the outer contour of the additional airbag 8 at the center position of the opening 4 in the vehicle longitudinal direction (the line C-C position) which is more forward in the vehicle longitudinal direction than the line B-B position.

Furthermore, both the dimension WB in the vehicle width direction at the line B-B position and the dimension WC in the vehicle width direction at the line C-C position which is more forward in the vehicle longitudinal direction than the line B-B position are set greater than a maximum dimension WA in the vehicle width direction from the center line (the line X-X) on the vehicle interior side of the center line (the line X-X) on the vertical section RL3 (a vertical section including a position of an apex 7*e* of the airbag 7) at the line A-A position which is more rearward in the vehicle longitudinal direction than the line B-B position.

These dimensions in the vehicle width direction are, in other words, dimensions from the center line (the line X-X) to the outer contour of a vehicle interior-side (left-side) portion of the additional airbag 8 at the line A-A position, the line B-B position, and the line C-C position, and a similar description applies hereafter.

In other words, with the center line (the line X-X) as a reference, in an outer shape formed by a combination of the airbag 7 and the additional airbag 8 on the vehicle interior side of the center line when the airbag 7 and the additional airbag 8 are fully deployed and expanded, the fact that a dimension in the vehicle width direction is greatest at the line B-B position, smaller at the line C-C position, and smallest at the line A-A position (WB>WC>WA) is similar to the vehicular airbag devices described in the eighth to tenth embodiments.

The vehicular airbag device according to the fourteenth embodiment is also configured such that, with respect to the vehicle interior side in the vehicle width direction relative to the center line (the line X-X) when looking downward from above the vehicle, an outer shape on the vehicle interior side (the left side) which is formed by the combination of the airbag 7 and the additional airbag 8 when the airbag 7 and the additional airbag 8 are fully deployed and expanded enables a shape to be obtained which is wider on a side of the front end 5*d* in a vehicle longitudinal direction on the side of the opening 4 or, in other words, near the rear end 2*b* of the instrument panel 2 or near the opening 4 than the occupant restraining surface 7*c* which is to the rear in the vehicle longitudinal direction.

In addition, when subjected to a force from the airbag 7 having caught the occupant 1, the additional airbag 8 receives a supporting reaction force from the instrument panel 2 while being supported by the instrument panel 2 and supports a periphery of the opening 4 of the airbag 7 from diagonally forward left to diagonally rearward right in the vehicle longitudinal direction. In other words, the additional airbag 8 is configured to prevent the airbag 7 from moving diagonally forward left in the vehicle longitudinal direction.

Figure 58:
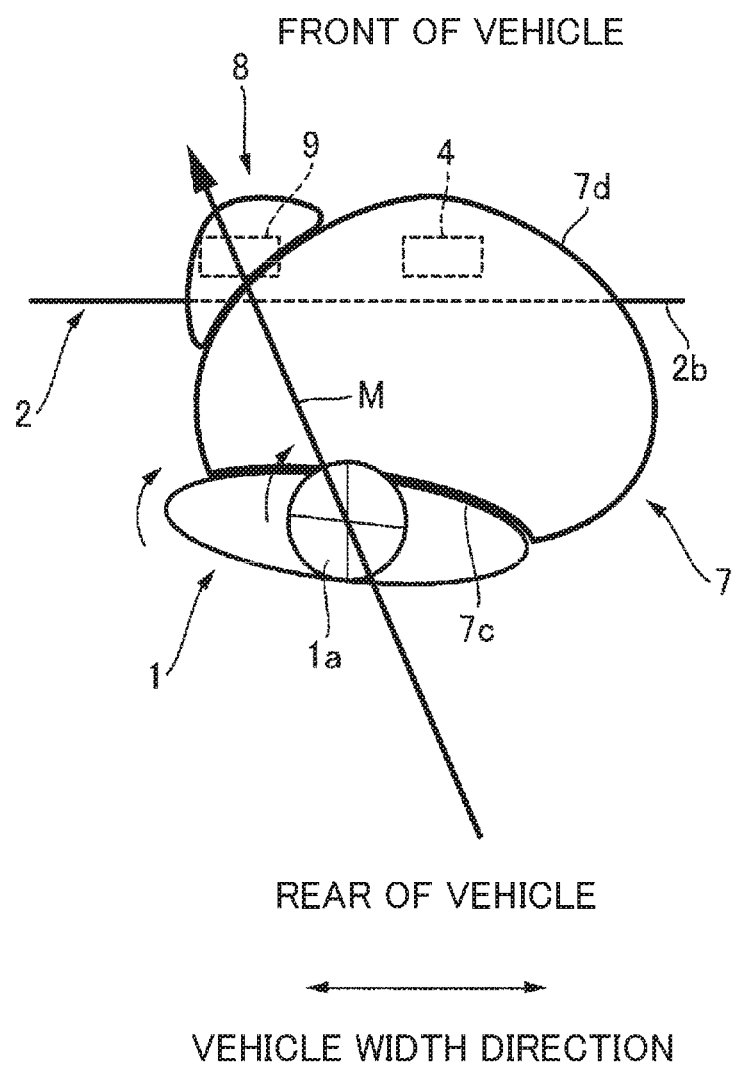
FIG. 58 is an explanatory diagram illustrating how the vehicular airbag device shown in FIG. 55 restrains an occupant during a diagonal collision.

Next, workings of the vehicular airbag device according to the fourteenth embodiment will be described. FIG. 58 is an explanatory diagram illustrating how the airbag 7 and the additional airbag 8 of the vehicular airbag device according to the fourteenth embodiment restrain the occupant 1 during a diagonal collision.

When a collision impact is generated, an inflator and an additional inflator are actuated and generate inflator gas, and both the airbag 7 and the additional airbag 8 are deployed and expanded rearward in the vehicle longitudinal direction. During a diagonal collision, a force causing a diagonally forward left movement in the vehicle longitudinal direction (a direction M) acts on the occupant 1 sitting on a right-side front seat. The conventional airbag 7 having caught the occupant 1 with the occupant restraining surface 7*c* attempts to rotate around the front end 7*d* in the vehicle longitudinal direction on the side of the opening 4.

At this point, the additional airbag 8 is deployed and expanded in a positional relationship of being sandwiched between the airbag 7 and the instrument panel 2 at a periphery of the opening 4 of the airbag 7.

The airbag 7 attempting to rotate presses the additional airbag 8, and the pressed additional airbag 8 receives a supporting reaction force from the instrument panel 2 and supports a periphery of the opening 4 of the airbag 7 while pressing back diagonally rearward right in the vehicle longitudinal direction so as to restrict the rotation of the airbag 7.

In the fourteenth embodiment, the dimension in the vehicle width direction which defines the outer shape of the vehicle interior side (the left side) which is formed by the airbag 7 and the additional airbag 8 is set greater than the maximum width dimension WA in the vehicle width direction on the vertical section RL3 at the line A-A position and, at the same time, greater at the line B-B position than at the line C-C position (WB>WC>WA).

Due to this configuration, a range in which the airbag 7 and the additional airbag 8 are supported by the instrument panel 2 and the front windshield 3 to generate a supporting reaction force of the occupant 1 can be secured such that the range is wider than the occupant restraining surface 5*c* on the vehicle interior side (the left side).

Therefore, when the occupant 1 moves diagonally forward left in the vehicle longitudinal direction while rotating so that the body of the occupant 1 tilts diagonally or when a rotation of the body of the occupant 1 occurs due to being caught by the occupant restraining surface 7*c*, the additional airbag 8 enables a rotating action in which the airbag 7 attempts to rotate together with the movement of the occupant 1 to be appropriately prevented by receiving a supporting reaction force from the instrument panel 2.

Accordingly, the body of the occupant 1 can be restrained from moving diagonally forward and, at the same time, the body of the occupant 1 can be prevented from rotating while tilting diagonally. As a result, the occupant 1 can be appropriately restrained and an occupant injury value can be reduced. Furthermore, since the body of the occupant 1 can be prevented from rotating, rotation of the head 1*a* of the occupant 1 around the neck can also be suppressed and injury values of the head 1*a* and the neck of the occupant 1 can also be reduced.

It is needless to say that the vehicular airbag device according to the fourteenth embodiment is also capable of demonstrating occupant protection performance comparable to that of conventional devices with respect to head-on collisions in addition to diagonal collisions in a similar manner to the eighth embodiment.

Figure 59:
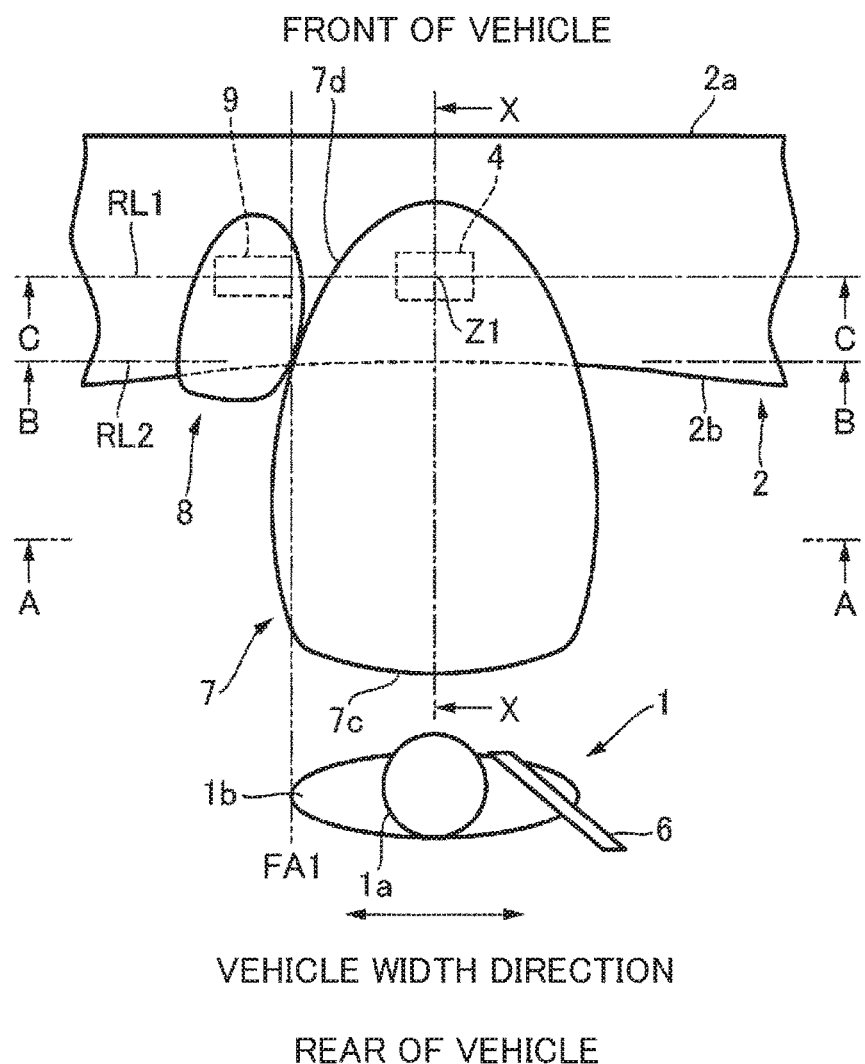
FIG. 59 is a plan view of an airbag representing a fifteenth embodiment of a vehicular airbag device according to the present invention.
Figure 60:
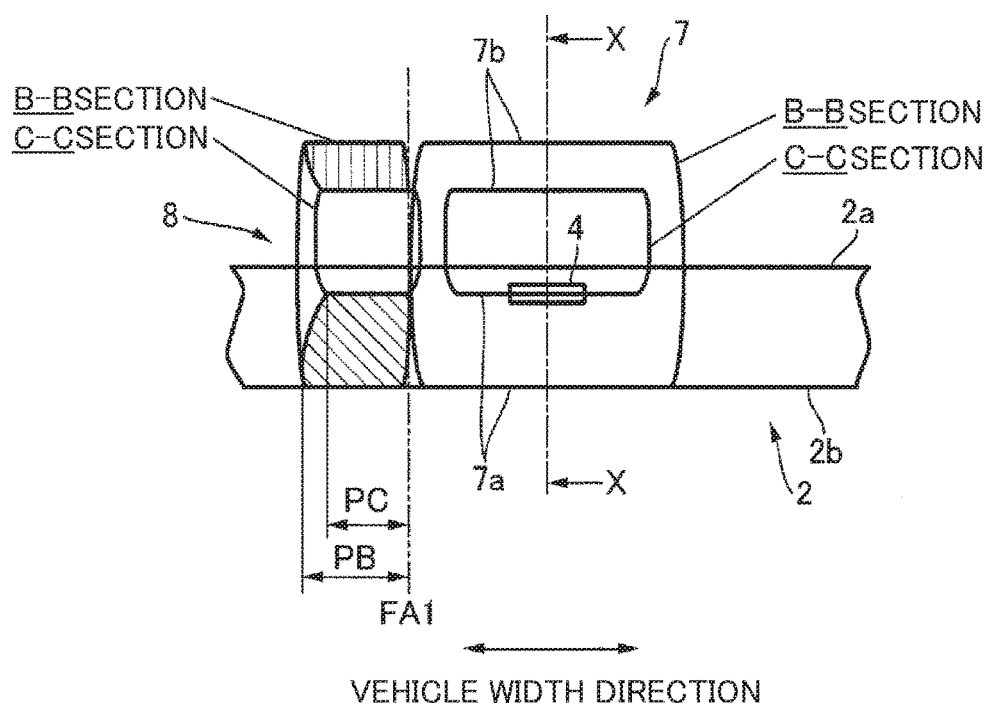
FIG. 60 is an explanatory diagram depicting sections of the airbag shown in FIG. 36 at the respective positions including a position of line B-B and a position of line C-C illustrated in FIGS. 55 and 56 in an overlapping manner when viewing forward from rearward in the vehicle longitudinal direction.

FIGS. 59 and 60 show a vehicular airbag device according to the fifteenth embodiment. The fifteenth embodiment represents an application of the configurations of the airbag 7 and the additional airbag 8 described in the fourteenth embodiment to the vehicular airbag device according to the ninth embodiment described earlier.

With the center line (the line X-X) as a reference, in an outer shape formed by a combination of the airbag 7 and the additional airbag 8 on the vehicle interior side of the center line when the airbag 7 and the additional airbag 8 are fully deployed and expanded, the fact that a dimension in the vehicle width direction is greatest at the line B-B position, smaller at the line C-C position, and smallest at the line A-A position (WB>WC>WA) is similar to the vehicular airbag devices described in the eighth to tenth embodiments.

FIG. 59 is a plan view of the vehicular airbag device according to the fifteenth embodiment and FIG. 60 is an explanatory diagram depicting sections of the airbag 7 and the additional airbag 8 at the respective positions including a line B-B position and a line C-C position shown in FIG. 59 in an overlapping manner when viewing forward from rearward in the vehicle longitudinal direction.

In the fifteenth embodiment, a first longitudinal direction vertical plane FA1 that passes in the vehicle longitudinal direction through a left shoulder 1*b*, which is positioned on the vehicle interior side (the left side), of the occupant 1 sitting on a front seat is taken into consideration in a similar manner to the ninth embodiment.

Regarding the outer shape created by a combination of the airbag 7 and the additional airbag 8 when fully deployed and expanded, as shown in FIG. 60, with the center line (the line X-X) as a reference, the additional airbag 8 is formed with a size which protrudes more toward the vehicle interior side in the vehicle width direction than the occupant 1 from the first longitudinal direction vertical plane FA1 at least at the line B-B position and the line C-C position. A protrusion dimension PB in the vehicle width direction at the line B-B position is set greater than a protrusion dimension PC in the vehicle width direction at the line C-C position which is more forward in the vehicle longitudinal direction than the line B-B position.

Accordingly, when looking downward from above the vehicle, with respect to the vehicle interior side in the vehicle width direction relative to the center line (the line X-X), the outer shape created by the combination of the airbag 7 and the additional airbag 8 when fully deployed and expanded is formed so as to be wider on a side of the front end 5*d* in a vehicle longitudinal direction on a side of the opening 4 or, in other words, near the rear end 2*b* of the instrument panel 2 or near the opening 4 than the occupant restraining surface 7*c* which is to the rear in the vehicle longitudinal direction. Even with the fifteenth embodiment configured as described above, it is needless to say that a similar working effect to the eighth embodiment can be secured.

Figure 61:
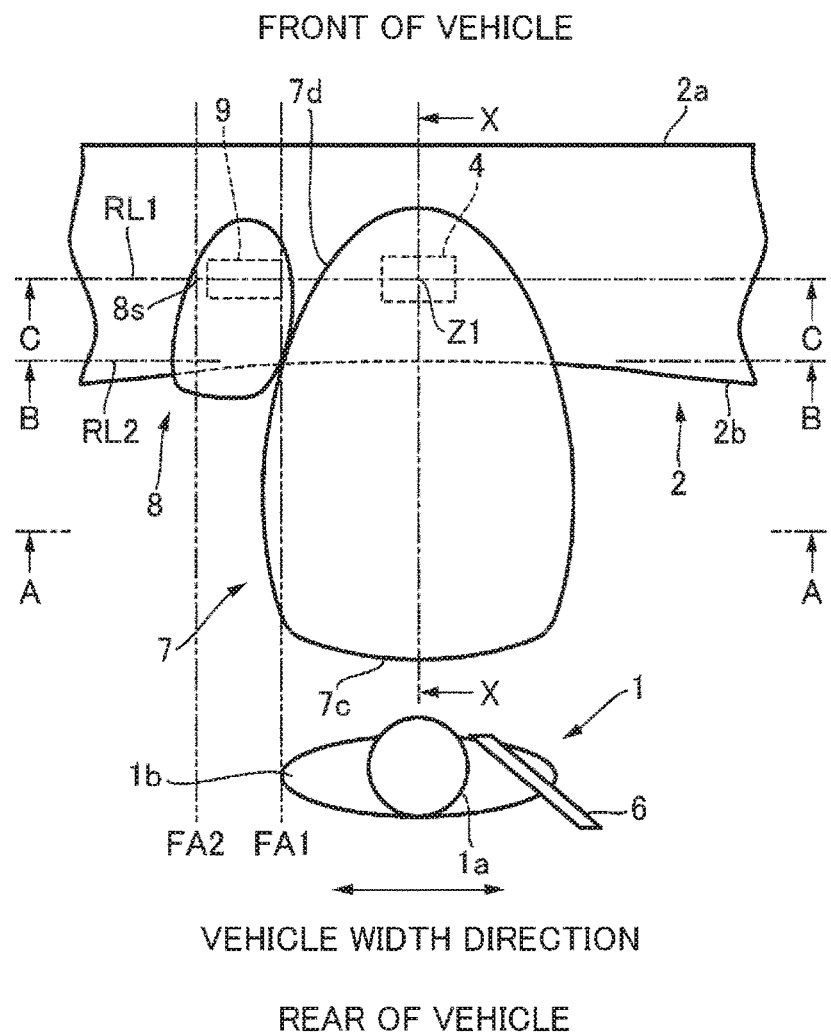
FIG. 61 is a plan view of an airbag representing a sixteenth embodiment of a vehicular airbag device according to the present invention.
Figure 62:
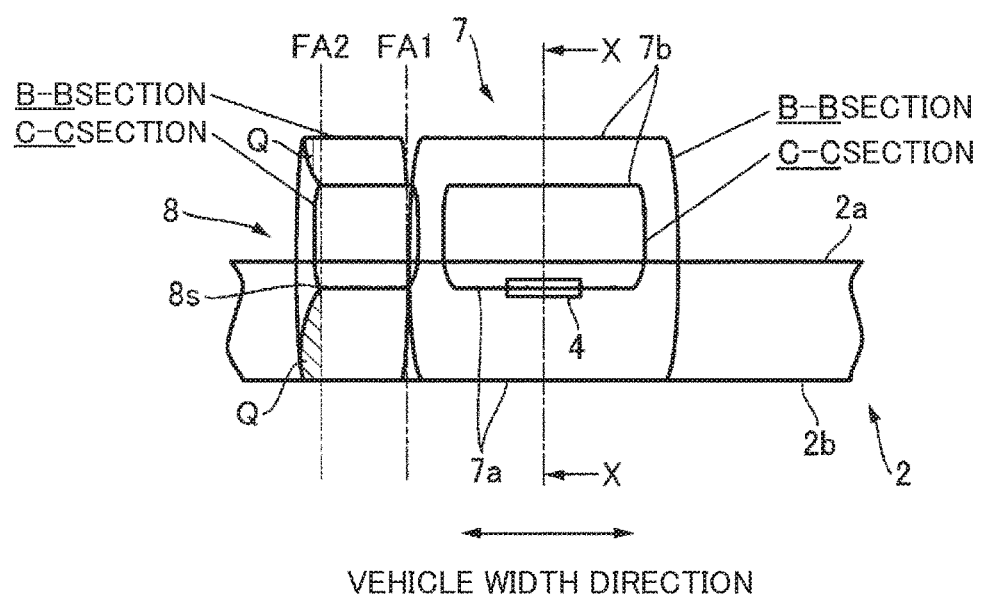
FIG. 62 is an explanatory diagram depicting sections of the airbag shown in FIG. 61 at the respective positions including the position of line B-B and the position of line C-C illustrated in FIGS. 55 and 56 in an overlapping manner when viewing forward from rearward in the vehicle longitudinal direction.

FIGS. 61 and 62 show a vehicular airbag device according to the sixteenth embodiment. The sixteenth embodiment represents an application of the configurations of the airbag 7 and the additional airbag 8 described in the fourteenth embodiment to the vehicular airbag device according to the tenth embodiment described earlier.

With the center line (the line X-X) as a reference, in an outer shape formed by a combination of the airbag 7 and the additional airbag 8 on the vehicle interior side of the center line when the airbag 7 and the additional airbag 8 are fully deployed and expanded, the fact that a dimension in the vehicle width direction is greatest at the line B-B position, smaller at the line C-C position, and smallest at the line A-A position (WB>WC>WA) is similar to the vehicular airbag devices described in the eighth to tenth embodiments.

FIG. 61 is a plan view of the vehicular airbag device according to the sixteenth embodiment and FIG. 62 is an explanatory diagram depicting sections of the airbag 7 and the additional airbag 8 at the respective positions including a line B-B position and a line C-C position shown in FIG. 61 in an overlapping manner when viewing forward from rearward in the vehicle longitudinal direction.

The sixteenth embodiment is similar to the tenth embodiment in that, with the center line (the X-X line) of the opening 4 in the vehicle left-right width direction as a reference, an outer shape constituted by the airbag 7 and the additional airbag 8 on the vehicle interior side (the left size) of the center line when the airbag 7 and the additional airbag 8 are fully deployed and expanded is configured so as to include, between a first vehicle width direction vertical plane RL1 at the line C-C position which passes through a position of a center Z1 of the opening 4 in the vehicle longitudinal direction and a second vehicle width direction vertical plane RL2 at the line B-B position which passes through the position of the rear edge 2*b* of the instrument panel 2, a region Q which comes into contact with the instrument panel 2 on the vehicle interior side (the left side) in the vehicle width direction of a second longitudinal direction vertical plane FA2 which is more towards the vehicle interior side (the left side) than a first longitudinal direction vertical plane FA1. In the illustrated example, the region Q is also configured with respect to the front windshield 3.

The first longitudinal direction vertical plane FA1 is as described earlier in the ninth embodiment. The second longitudinal direction vertical plane FA2 is as described earlier in the tenth embodiment. In the sixteenth embodiment, the end edge of the airbag in the vehicle width direction refers to a left end 8*s* of an outer contour of the additional airbag 8 at the line C-C position.

As shown in FIG. 62 with the center line (the X-X line) as a reference, the outer shape that is formed by the combination of the airbag 7 and the additional airbag 8 when fully deployed and expanded includes the region Q which protrudes toward the vehicle interior side (the left side) in the vehicle width direction from the second longitudinal direction vertical plane FA2 and which comes into contact with the instrument panel 2 at least between the line B-B position and the line C-C position. The additional airbag 8 protrudes farther toward the vehicle interior side at the line B-B position than at the line C-C position.

Accordingly, when looking downward from above the vehicle, with respect to the vehicle interior side in the vehicle width direction relative to the center line (the line X-X), the outer shape formed by the airbag 7 and the additional airbag 8 when fully deployed and expanded is formed so as to be wider on a side of the front end 5*d* in a vehicle longitudinal direction on a side of the opening 4 or, in other words, near the rear end 2*b* of the instrument panel 2 or near the opening 4 than the occupant restraining surface 5*c* which is to the rear in the vehicle longitudinal direction. Even with the sixteenth embodiment configured as described above, it is needless to say that a similar working effect to the eighth embodiment can be secured.

Figure 63:
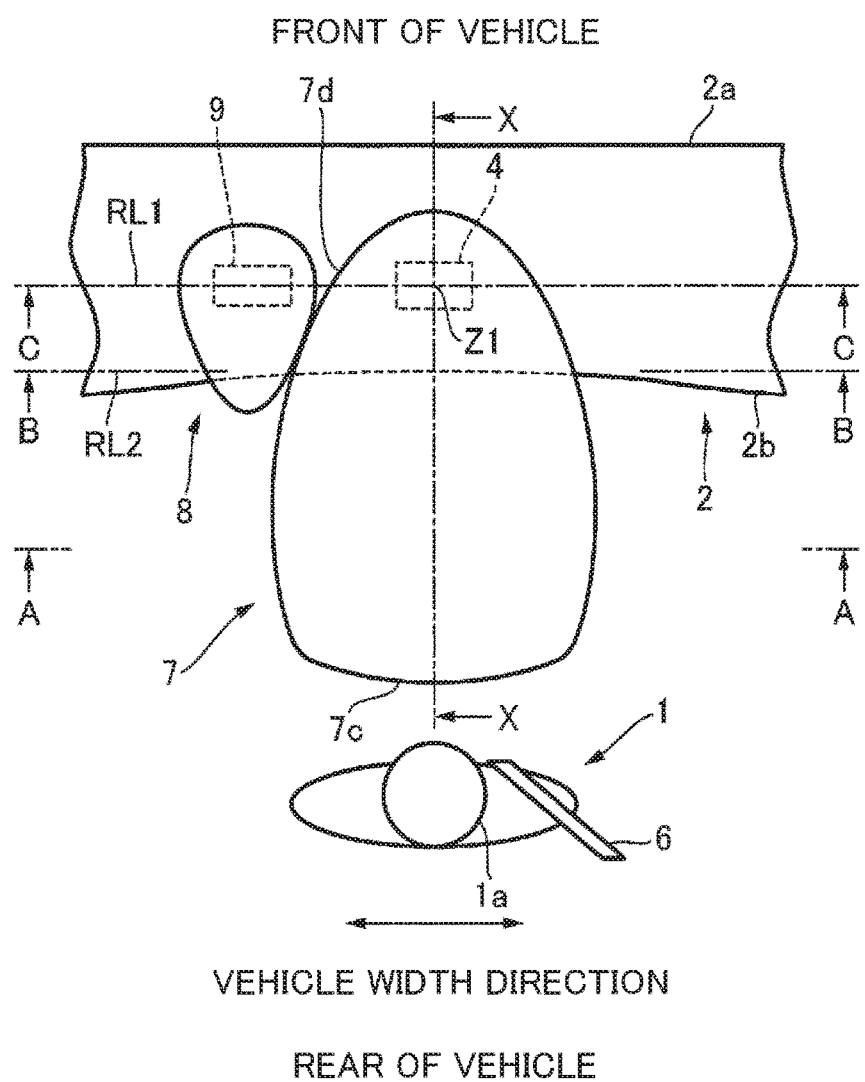
FIG. 63 is a plan view of an airbag representing a seventeenth embodiment of a vehicular airbag device according to the present invention.
Figure 64:
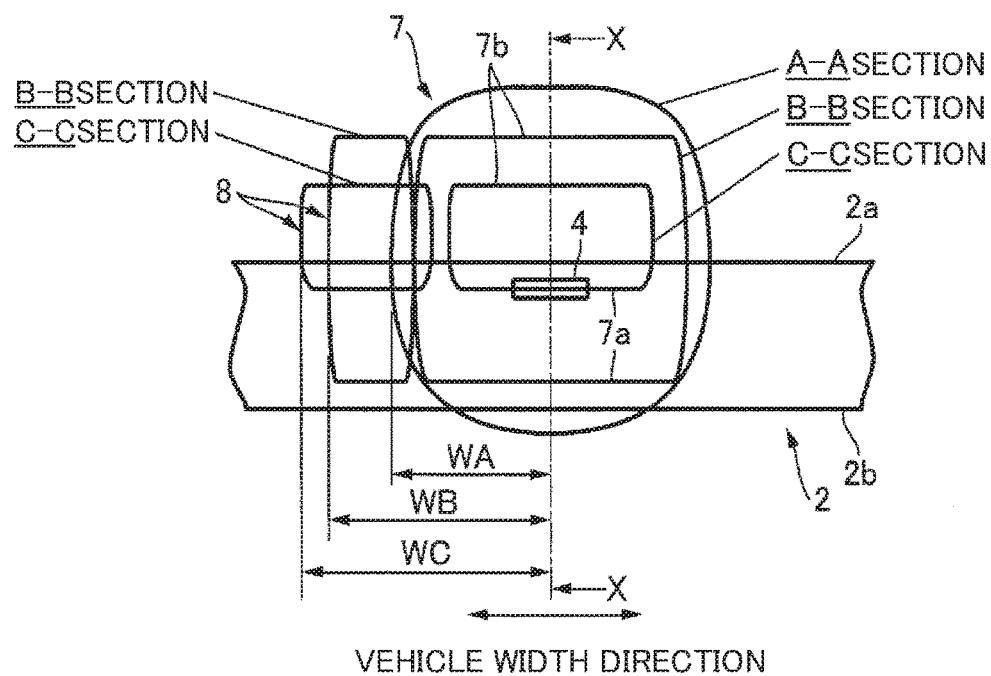
FIG. 64 is an explanatory diagram depicting sections of an airbag at respective positions including a position of line A-A, a position of line B-B, and a position of line C-C illustrated in FIG. 63 in an overlapping manner when viewing forward from rearward in the vehicle longitudinal direction.

FIGS. 63 and 64 show a vehicular airbag device according to the seventeenth embodiment. The seventeenth embodiment represents an application of the configurations of the airbag 7 and the additional airbag 8 described in the fourteenth embodiment to the vehicular airbag device according to the eleventh embodiment described earlier.

FIG. 63 is a plan view of a vehicular airbag device and FIG. 64 is an explanatory diagram depicting sections of an airbag and an additional airbag at the respective positions including a line A-A position, a line B-B position, and a line C-C position illustrated in FIG. 63 in an overlapping manner when viewing forward from rearward in the vehicle longitudinal direction.

In the present embodiment, an outer shape of the fully deployed and expanded additional airbag 8 is configured such that a rearward side in the vehicle longitudinal direction is wider than a forward side. After the airbag 7 and the additional airbag 8 have been fully deployed and expanded, with the center line (the line X-X) as a reference, an outer shape that is formed by a combination of the airbag 7 and the additional airbag 8 on the vehicle interior side of the center line is configured such that a dimension WC in the vehicle width direction from the center line (the line X-X) to an outer contour of the additional airbag 8 at the line C-C position is greater than a dimension WB in the vehicle width direction from the center line (the line X-X) to the outer contour of the additional airbag 8 at the line B-B position which is more rearward in the vehicle longitudinal direction than the line C-C position.

Furthermore, both the dimension WC in the vehicle width direction at the line C-C position and the dimension WB in the vehicle width direction at the line B-B position which is more rearward in the vehicle longitudinal direction than the line C-C position are set greater than a maximum dimension WA in the vehicle width direction from the center line (the line X-X) on the vehicle interior side of the center line (the line X-X) on the vertical section RL3 at the line A-A position which is more rearward in the vehicle longitudinal direction than the line B-B position.

In other words, with the center line (the line X-X) as a reference, in an outer shape formed by a combination of the airbag 7 and the additional airbag 8 on the vehicle interior side of the center line when the airbag 7 and the additional airbag 8 are fully deployed and expanded, the fact that a dimension in the vehicle width direction is greatest at the line C-C position, smaller at the line B-B position, and smallest at the line A-A position (WC>WB>WA) is similar to the vehicular airbag devices described in the eleventh to thirteenth embodiments.

Accordingly, when looking downward from above the vehicle, with respect to the vehicle interior side in the vehicle width direction relative to the center line (the line X-X), the outer shape formed by the airbag 7 and the additional airbag 8 when fully deployed and expanded is formed so as to be wider on a side of the front end 5*d* in a vehicle longitudinal direction on a side of the opening 4 or, in other words, near the rear end 2*b* of the instrument panel 2 or near the opening 4 than the occupant restraining surface 5*c* which is to the rear in the vehicle longitudinal direction.

Even with the seventeenth embodiment configured as described above, a range in which the airbag 7 and the additional airbag 8 are supported by the instrument panel 2 and the front windshield 3 to generate a supporting reaction force of the occupant 1 can be secured such that the range is wider than the occupant restraining surface 5*c* on the vehicle interior side (the left side) and a similar working effect to the eighth embodiment can be secured.

Figure 65:
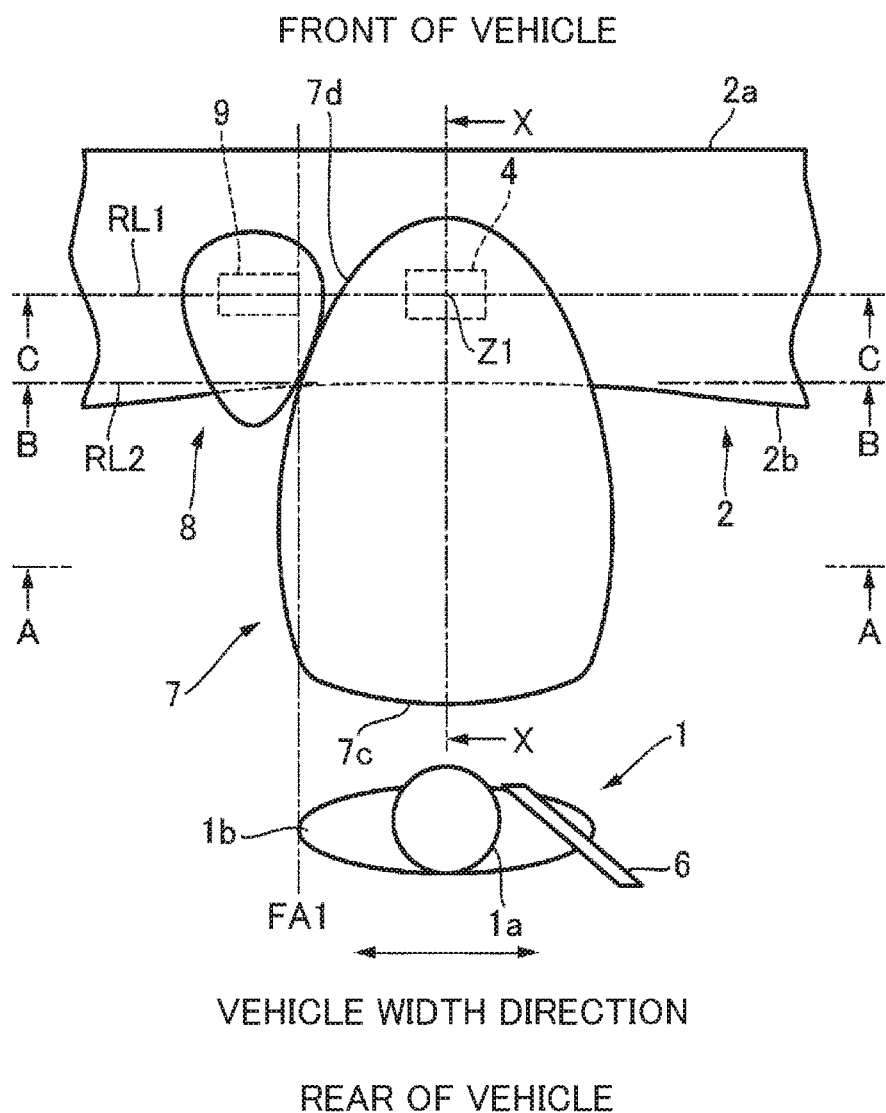
FIG. 65 is a plan view of an airbag representing an eighteenth embodiment of a vehicular airbag device according to the present invention.
Figure 66:
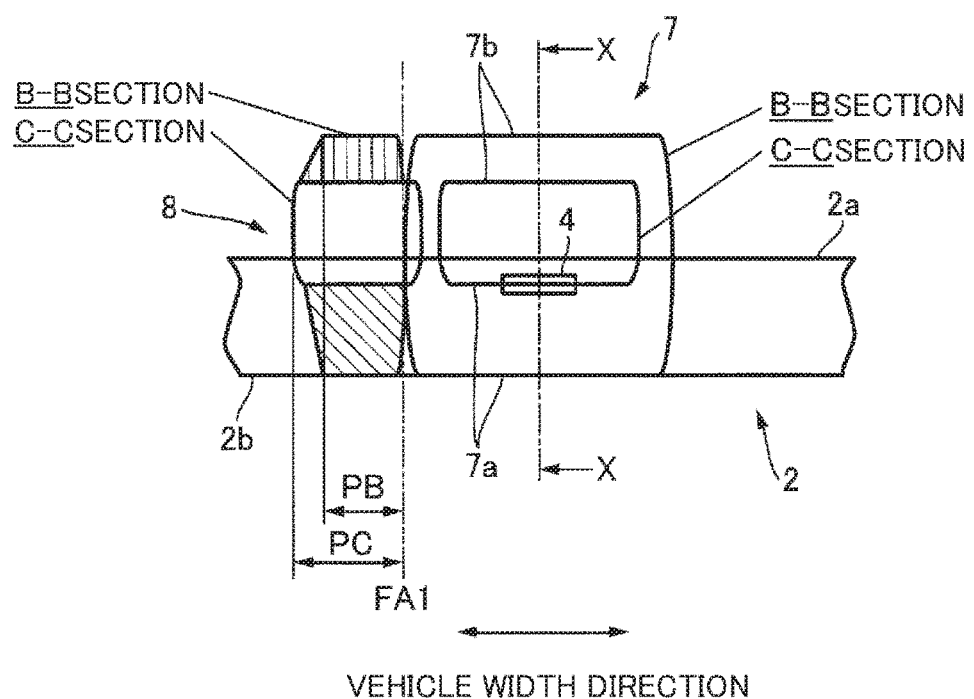
FIG. 66 is an explanatory diagram depicting sections of the airbag shown in FIG. 65 at respective positions including a position of line B-B and a position of line C-C illustrated in FIG. 65 in an overlapping manner when viewing forward from rearward in the vehicle longitudinal direction.

FIGS. 65 and 66 show a vehicular airbag device according to the eighteenth embodiment. The eighteenth embodiment represents an application of the configurations of the airbag 7 and the additional airbag 8 described in the fourteenth embodiment to the vehicular airbag device according to the twelfth embodiment described earlier.

With the center line (the line X-X) as a reference, in an outer shape formed by a combination of the airbag 7 and the additional airbag 8 on the vehicle interior side of the center line when the airbag 7 and the additional airbag 8 are fully deployed and expanded, the fact that a dimension in the vehicle width direction is greatest at the line C-C position, smaller at the line B-B position, and smallest at the line A-A position (WC>WB>WA) is similar to the vehicular airbag devices described in the eleventh to thirteenth embodiments.

FIG. 65 is a plan view of the vehicular airbag device according to the eighteenth embodiment and FIG. 66 is an explanatory diagram depicting sections of the airbag 7 and the additional airbag 8 at the respective positions including a line B-B position and a line C-C position shown in FIG. 65 in an overlapping manner when viewing forward from rearward in the vehicle longitudinal direction.

In the eighteenth embodiment, a first longitudinal direction vertical plane FA1 that passes in the vehicle longitudinal direction through a left shoulder 1*b*, which is positioned on the vehicle interior side (the left side), of the occupant 1 sitting on a front seat is taken into consideration in a similar manner to the twelfth embodiment.

Regarding the outer shape created by a combination of the airbag 7 and the additional airbag 8 when fully deployed and expanded, as shown in FIG. 66, with the center line (the line X-X) as a reference, the additional airbag 8 is formed with a size which protrudes more toward the vehicle interior side in the vehicle width direction than the occupant 1 from the first longitudinal direction vertical plane FA1 at least at the line B-B position and the line C-C position. A protrusion dimension PC in the vehicle width direction at the line C-C position is set greater than a protrusion dimension PB in the vehicle width direction at the line B-B position which is more rearward in the vehicle longitudinal direction than the line C-C position.

Accordingly, when looking downward from above the vehicle, with respect to the vehicle interior side in the vehicle width direction relative to the center line (the line X-X), the outer shape created by the combination of the airbag 7 and the additional airbag 8 when fully deployed and expanded is formed so as to be wider on a side of the front end 5*d* in a vehicle longitudinal direction on a side of the opening 4 or, in other words, near the rear end 2*b* of the instrument panel 2 or near the opening 4 than the occupant restraining surface 7*c* which is to the rear in the vehicle longitudinal direction. Even with the eighteenth embodiment configured as described above, it is needless to say that a similar working effect to the eighth embodiment can be secured.

Figure 67:
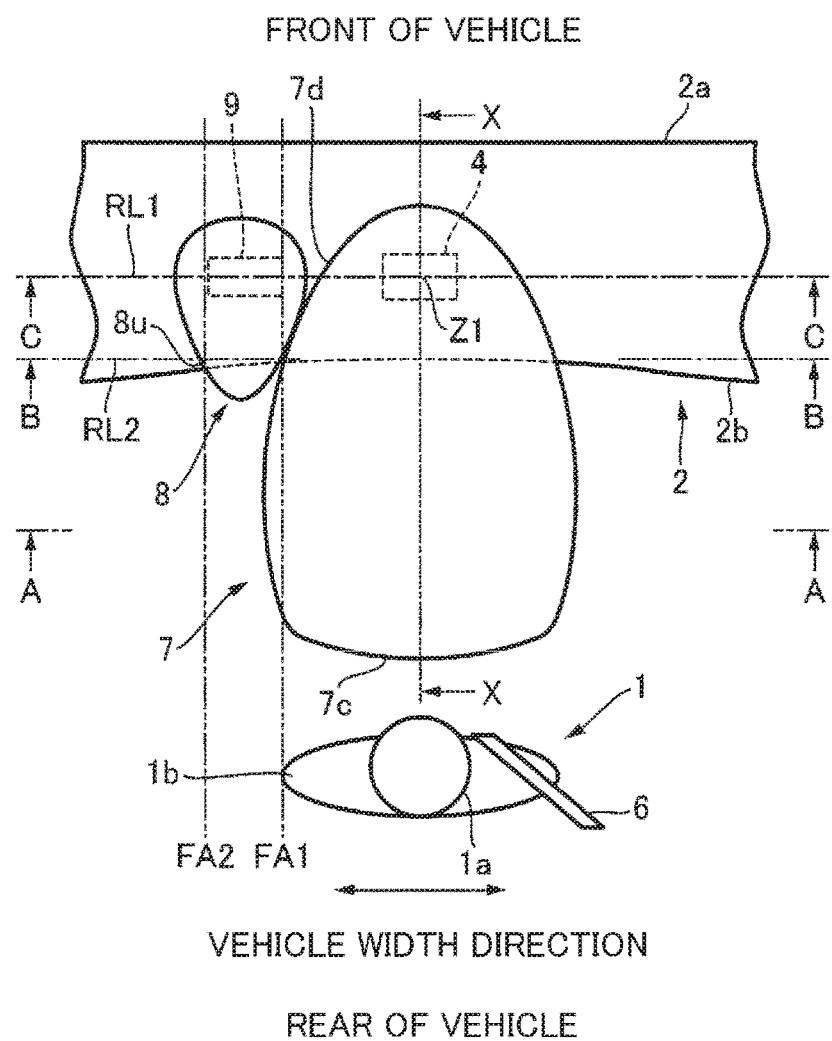
FIG. 67 is a plan view of an airbag representing a nineteenth embodiment of a vehicular airbag device according to the present invention.
Figure 68:
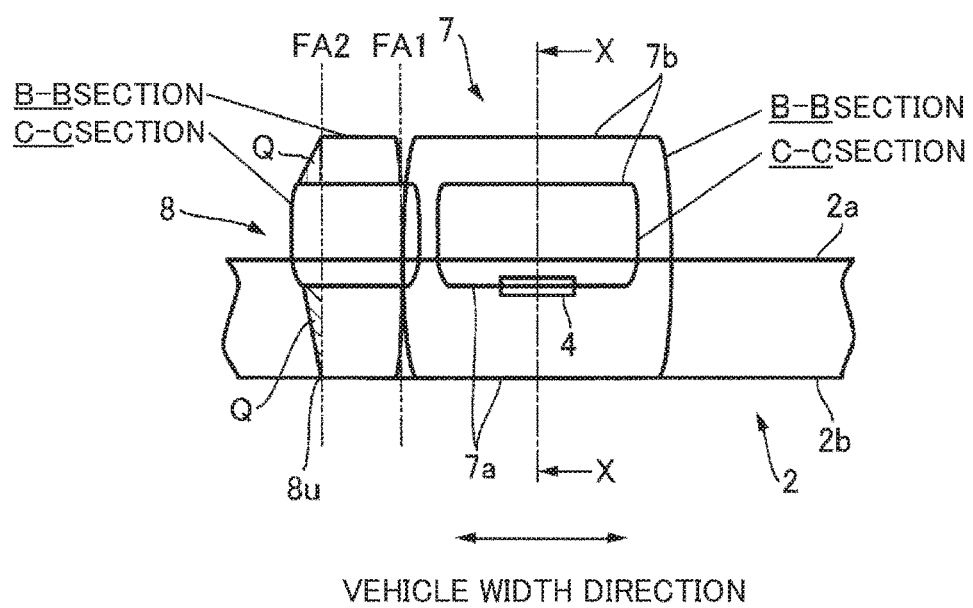
FIG. 68 is an explanatory diagram depicting sections of the airbag shown in FIG. 67 at respective positions including a position of line B-B and a position of line C-C illustrated in FIG. 67 in an overlapping manner when viewing forward from rearward in the vehicle longitudinal direction.

FIGS. 67 and 68 show a vehicular airbag device according to the nineteenth embodiment. The nineteenth embodiment represents an application of the configurations of the airbag 7 and the additional airbag 8 described in the fourteenth embodiment to the vehicular airbag device according to the thirteenth embodiment described earlier.

With the center line (the line X-X) as a reference, in an outer shape formed by a combination of the airbag 7 and the additional airbag 8 on the vehicle interior side of the center line when the airbag 7 and the additional airbag 8 are fully deployed and expanded, the fact that a dimension in the vehicle width direction is greatest at the line C-C position, smaller at the line B-B position, and smallest at the line A-A position (WC>WB>WA) is similar to the vehicular airbag devices described in the eleventh to thirteenth embodiments.

FIG. 67 is a plan view of the vehicular airbag device according to the nineteenth embodiment and FIG. 68 is an explanatory diagram depicting sections of the airbag 7 and the additional airbag 8 at the respective positions including a line B-B position and a line C-C position shown in FIG. 67 in an overlapping manner when viewing forward from rearward in the vehicle longitudinal direction.

The nineteenth embodiment is similar to the thirteenth embodiment in that, with the center line (the X-X line) of the opening 4 in the vehicle left-right width direction as a reference, an outer shape constituted by the airbag 7 and the additional airbag 8 on the vehicle interior side (the left size) of the center line when the airbag 7 and the additional airbag 8 are fully deployed and expanded is configured so as to include, between a first vehicle width direction vertical plane RL1 at the line C-C position which passes through a position of a center Z1 of the opening 4 in the vehicle longitudinal direction and a second vehicle width direction vertical plane RL2 at the line B-B position which passes through the position of the rear edge 2b of the instrument panel 2, a region Q which comes into contact with the instrument panel 2 on the vehicle interior side (the left side) in the vehicle width direction of a second longitudinal direction vertical plane FA2 which is more toward the vehicle interior side (the left side) than a first longitudinal direction vertical plane FA1. In the illustrated example, the region Q is also configured with respect to the front windshield 3.

The first longitudinal direction vertical plane FA1 is as described earlier in the ninth embodiment. The second longitudinal direction vertical plane FA2 is as described earlier in the tenth embodiment. In the nineteenth embodiment, the end edge of the airbag in the vehicle width direction refers to a left end 8u of an outer contour of the additional airbag 8 at the line B-B position.

As shown in FIG. 68 with the center line (the X-X line) as a reference, the outer shape that is formed by the combination of the airbag 7 and the additional airbag 8 when fully deployed and expanded includes the region Q which protrudes toward the vehicle interior side (the left side) in the vehicle width direction from the second longitudinal direction vertical plane FA2 and which comes into contact with the instrument panel 2 at least between the line B-B position and the line C-C position. The additional airbag 8 protrudes farther toward the vehicle interior side at the line C-C position than at the line B-B position.

Accordingly, when looking downward from above the vehicle, with respect to the vehicle interior side in the vehicle width direction relative to the center line (the line X-X), the outer shape formed by the airbag 7 and the additional airbag 8 when fully deployed and expanded is formed so as to be wider on a side of the front end 5d in a vehicle longitudinal direction on a side of the opening 4 or, in other words, near the rear end 2b of the instrument panel 2 or near the opening 4 than the occupant restraining surface 7c which is to the rear in the vehicle longitudinal direction. Even with the nineteenth embodiment configured as described above, it is needless to say that a similar working effect to the eighth embodiment can be secured.

In every embodiment from the eighth to nineteenth embodiments described above, while a shape of an airbag portion to constitute a vehicle exterior side of the center line (the line X-X) is not particularly limited, it is needless to say that the shape is selected so that an occupant protection function is secured. While cases where the sub airbag section 11 or the additional airbag 8 is provided only on the vehicle interior side (the left side) have been described in the modifications of the eighth and eleventh embodiments and in the fourteenth to nineteenth embodiments, the sub airbag section 11 or the additional airbag 8 may also be provided on the vehicle exterior side (the right side) of the main airbag section 10 or the airbag 7 to adjust an operational performance of the vehicular airbag device including balance when the main airbag section 10 or the airbag 7 is being deployed and expanded. Furthermore, when providing the additional airbag 8 described in the fourteenth to nineteenth embodiments, as long as dimensional relationships are secured as expressed by the inequality signs used above, the additional airbag 8 and the airbag 7 may be in contact with each other or may not be in contact with each other.

The vehicular airbag devices described above represent preferable examples of the present invention and other embodiments can also be performed or implemented using various methods. In particular, unless it is described in the present specification that limitations apply, the present invention is not restricted to a detailed shape, size, configuration and arrangement, and the like of components illustrated in the accompanying drawings. Furthermore, the expressions and terms in the present specification have been used for explanatory purposes and are not restrictive unless it is particularly described in the present specification that limitations apply.

While the above description constitutes the preferred embodiment of the present invention, it will be appreciated that the invention is susceptible to modification, variation and change without departing from the proper scope and fair meaning of the accompanying claims.

The invention claimed is:

1. A vehicular airbag device comprising an airbag which opens an airbag door openably sealing an opening formed on an instrument panel, which deploys and expands rearward in a vehicle longitudinal direction from the opening toward an occupant sitting on a front seat of a vehicle, and which is configured to contact the occupant while being supported by the instrument panel, wherein an outer shape of the airbag when fully deployed and expanded is line-symmetrical with respect to a center line of the opening in a vehicle left-right width direction, and a width dimension in the vehicle width direction at a rear edge position of the instrument panel in the vehicle longitudinal direction is greater than a width dimension in the vehicle width direction at a center position of the opening in the vehicle longitudinal direction which is more forward in the vehicle longitudinal direction than the rear edge position of the instrument panel, wherein the width dimension in the vehicle width direction at the rear edge position of the instrument panel and the width dimension in the vehicle width direction at the center position of the opening in the vehicle longitudinal direction which is more forward in the vehicle longitudinal direction than the rear edge position of the instrument panel are both greater than a maximum width dimension in the vehicle width direction at a vertical section including an apex position of the airbag which is more rearward in the vehicle longitudinal direction than the rear edge position of the instrument panel.

2. The vehicular airbag device according to claim 1 further comprising wherein the airbag when fully deployed and expanded includes a main airbag section positioned at center and a pair of left and right sub airbag sections positioned on both left and right sides of the main airbag section in the vehicle width direction, the main airbag section and the pair of sub airbag sections are integrally formed and the main airbag section and each sub airbag section are allowed to communicate with each other by a communication hole, and the sub airbag sections are deployed and expanded while being supported by the instrument panel in order to support an opening periphery of the main airbag section.

3. A vehicular airbag device comprising an airbag which opens an airbag door openably sealing an opening formed on an instrument panel, which deploys and expands rearward in a vehicle longitudinal direction from the opening toward an occupant sitting on a front seat of a vehicle, and which is configured to contact the occupant while being supported by the instrument panel, wherein an outer shape of the airbag when fully deployed and expanded is line-symmetrical with respect to a center line of the opening in a vehicle left-right width direction, and a width dimension in the vehicle width direction at a center position of the opening in the vehicle longitudinal direction is greater than a width dimension in the vehicle width direction at a rear edge position of the instrument panel which is more rearward in the vehicle longitudinal direction than the center position of the opening in the vehicle longitudinal direction.

4. The vehicular airbag device according to claim 3, further comprising wherein the width dimension in the vehicle width direction at the center position of the opening in the vehicle longitudinal direction and the width dimension in the vehicle width direction at the rear edge position of the instrument panel which is more rearward in the vehicle longitudinal direction than the center position of the opening in the vehicle longitudinal direction are both greater than a maximum width dimension in the vehicle width direction at a vertical section including an apex position of the airbag which is more rearward in the vehicle longitudinal direction than the rear edge position of the instrument panel.

5. The vehicular airbag device according to claim 3 further comprising wherein the airbag when fully deployed and expanded includes a main airbag section positioned at center and a pair of left and right sub airbag sections positioned on both left and right sides of the main airbag section in the vehicle width direction, the main airbag section and the pair of sub airbag sections are integrally formed and the main airbag section and each sub airbag section are allowed to communicate with each other by a communication hole, and the sub airbag sections are deployed and expanded while being supported by the instrument panel in order to support an opening periphery of the main airbag section.

* * * * *